United States Patent

Takabatake et al.

[11] Patent Number: 5,850,483
[45] Date of Patent: Dec. 15, 1998

[54] IMAGE DECOMPRESSING APPARATUS WITH EFFICIENT IMAGE DATA TRANSFER

[75] Inventors: Akihiko Takabatake; Shinichi Uramoto; Takashi Hashimoto, all of Hyogo, Japan

[73] Assignee: Mitsubishi Denki Kabushiki Kaisha, Tokyo, Japan

[21] Appl. No.: 780,369

[22] Filed: Jan. 9, 1997

[30] Foreign Application Priority Data

Mar. 21, 1996 [JP] Japan .................................... 8-064385

[51] Int. Cl.⁶ ............................... G06K 9/36; G06K 9/46
[52] U.S. Cl. ........................................... 382/233; 345/521
[58] Field of Search ............................. 382/233; 345/521

[56] References Cited

U.S. PATENT DOCUMENTS 5,379,356  1/1995  Purcell et al. ........................... 382/250
5,572,691 11/1996  Koudmani .

FOREIGN PATENT DOCUMENTS

0522835A2  1/1993  European Pat. Off. .
6-189292   7/1994  Japan .
6-189298   7/1994  Japan .
6-326997  11/1994  Japan .

OTHER PUBLICATIONS

Nikkei Electronics 1994 Mar.14, pp. 82–116.

*Primary Examiner*—Phuoc Tran
*Attorney, Agent, or Firm*—McDermott, Will & Emery

[57] ABSTRACT

A synchronous semiconductor memory device is utilized as an image data storage memory, and at most two pixels as one word are alternately stored in first and second banks of the synchronous semiconductor memory device. Respective pixel data of two types of color-difference signals as to the same pixel are stored in the same address position of the banks of the synchronous semiconductor memory device. Necessary data can be transferred by the burst length of the synchronous semiconductor memory device while suppressing overhead of page change to the minimum by alternately accessing the first and second banks.

19 Claims, 33 Drawing Sheets

FIG.4A
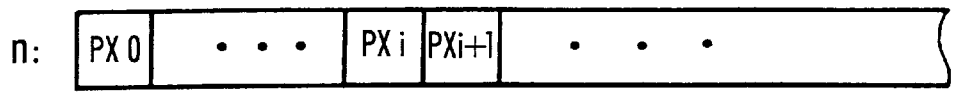
FIG.4B
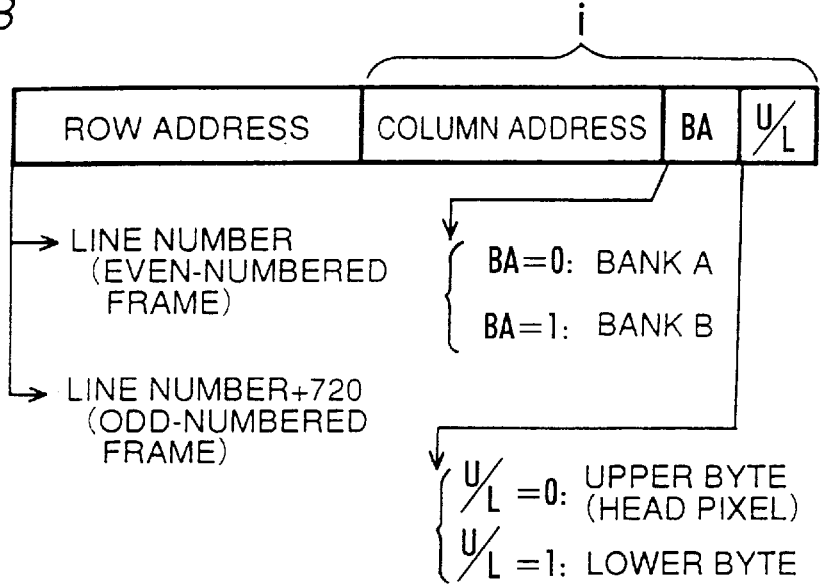
FIG.5A
$$PX248: 2^7 + 2^6 + 2^5 + 2^4 + 2^3$$
(Y)
FIG.5B
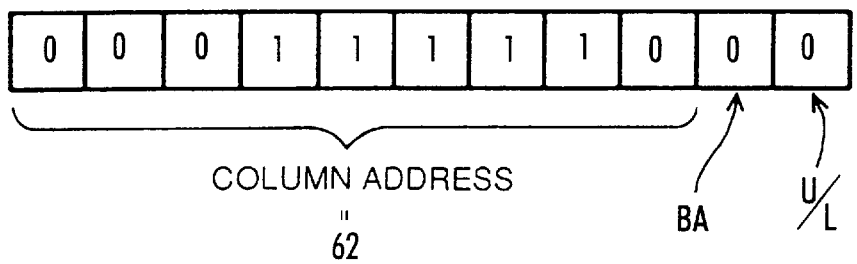
FIG.5C
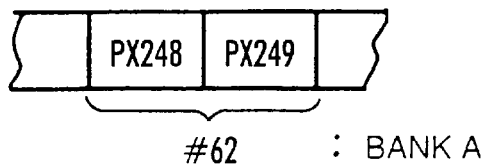

FIG.6
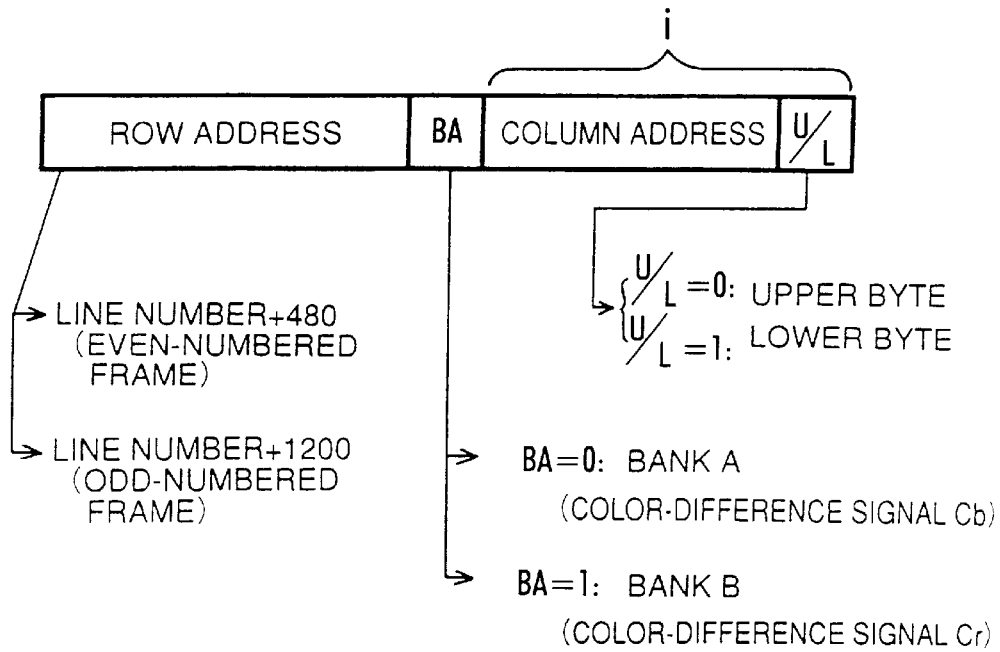
FIG.7A
PX248: $2^7 + 2^6 + 2^5 + 2^4 + 2^3$
(Cb, Cr)
FIG.7B
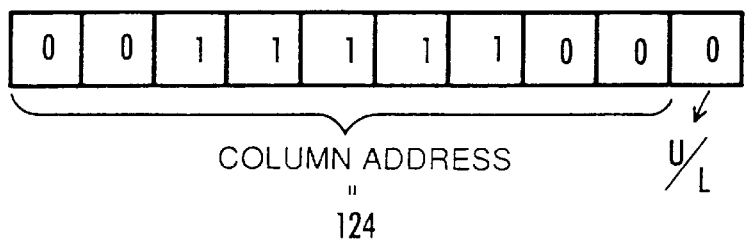
FIG.7C
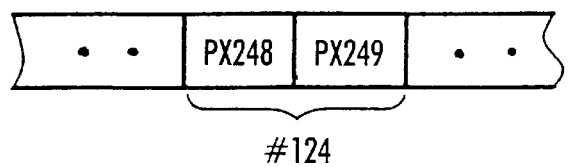

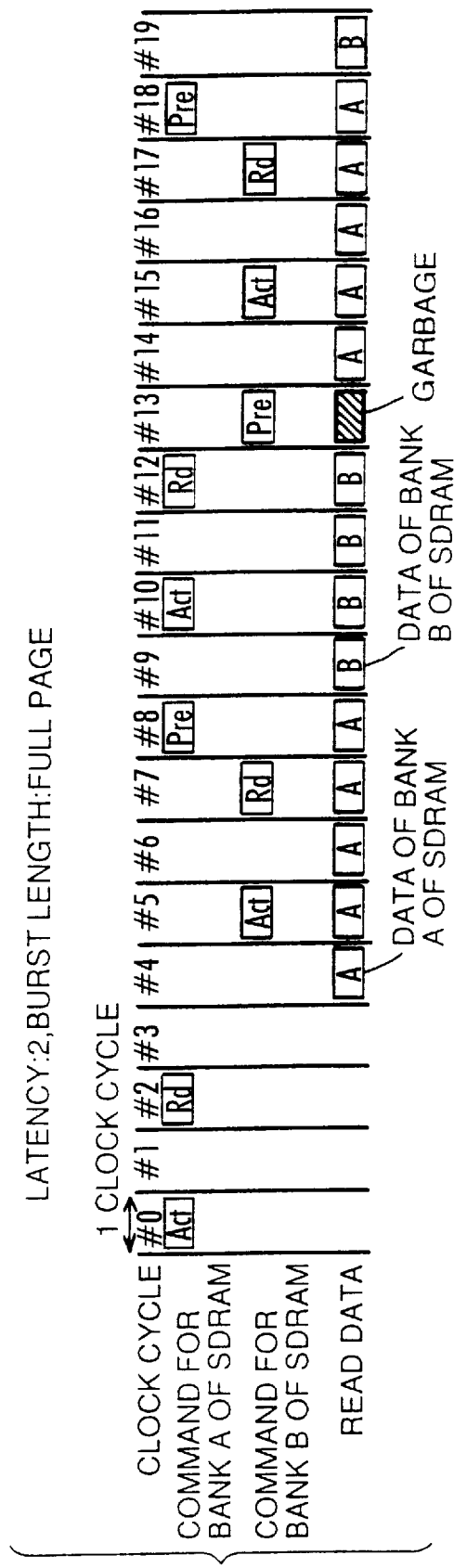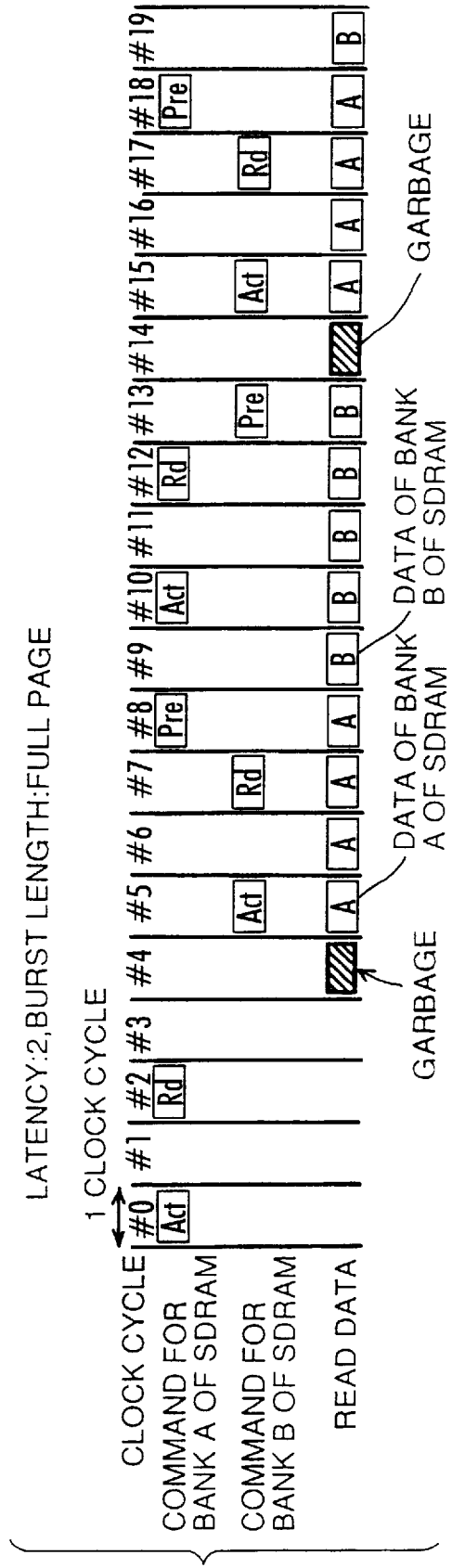
FIG.13A
FIG.13B

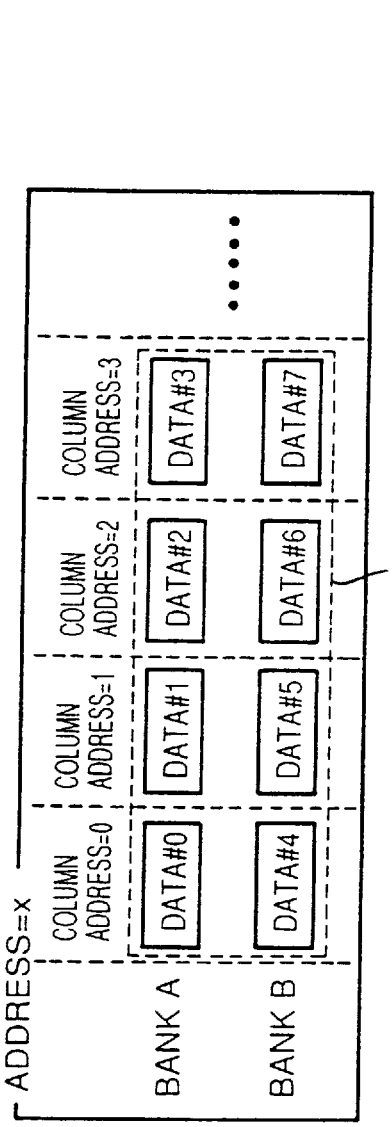
FIG.27A
FIG.27B

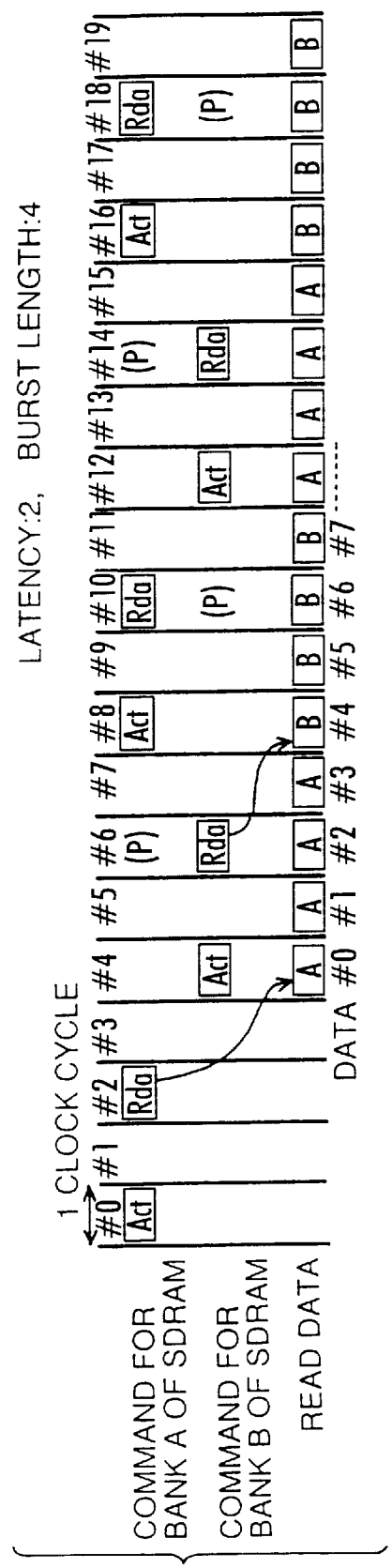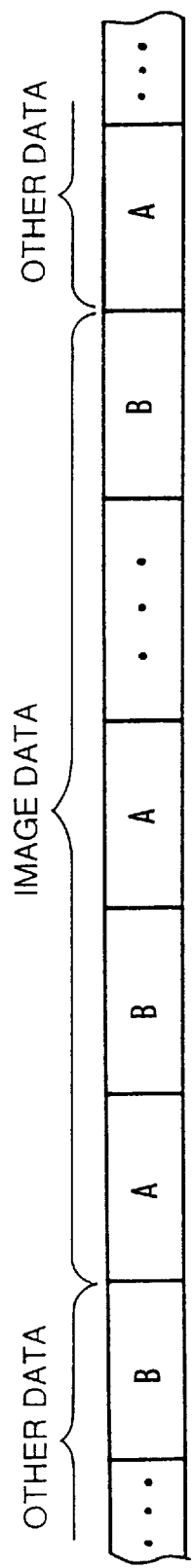

8-BIT PIXEL DATA=1 WORD OF SDRAM

LINE : ○ ◎ ○ ◎ ○ ◎ ○ ◎

| COLUMN ADDRESS | #0 | #1 | #2 |
|---|---|---|---|
| BANK A | ○ | ○ | ○ |
| BANK B | ◎ | ◎ | ◎ |

: LUMINANCE SIGNAL

| COLUMN ADDRESS | #0 | #1 | #2 | |
|---|---|---|---|---|
| BANK A | ○ | ○ | ○ | :Cb |
| BANK B | ◎ | ◎ | ◎ | Cr |

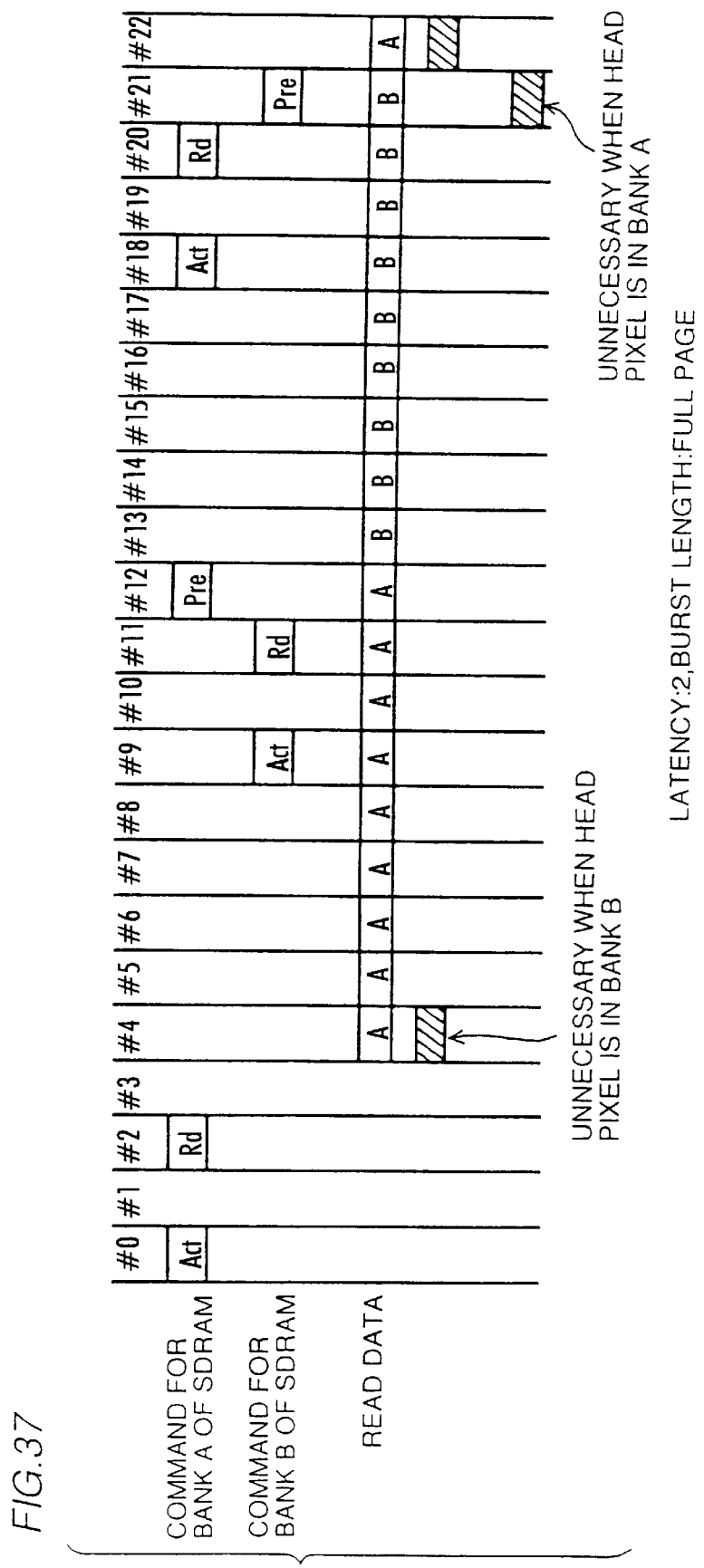

→ TIME

FIG.46A   PRIOR ART
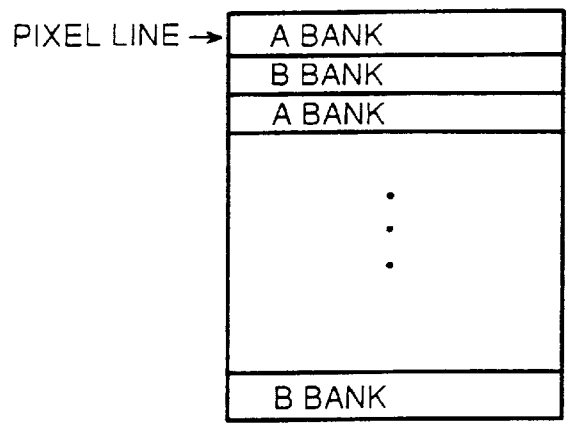
FIG.46B   PRIOR ART
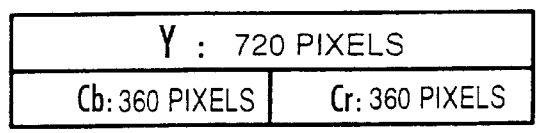
FIG.46C   PRIOR ART
{ SDRAM:COLUMN ADDRESSES 0~255
{ 720 PIXELS:360 WORDS (COLUMN)
→ UNSTORABLE IN ONE PAGE
FIG.47   PRIOR ART
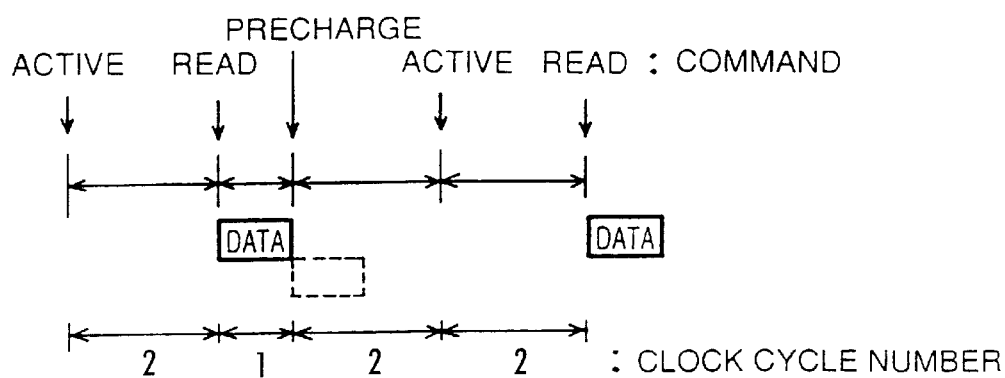

IMAGE DECOMPRESSING APPARATUS WITH EFFICIENT IMAGE DATA TRANSFER

BACKGROUND OF THE INVENTION

1. Field of the Invention

The present invention relates to an image decompressing apparatus for restoring original image data by decoding (decompressing) coded (compressed) image data, and more particularly, it relates to an image decoding and displaying apparatus for decoding coded motion image data for displaying.

2. Description of the Background Art

Inter-frame predictive coding is a technique generally employed for coding motion images having an enormous data quantity. This inter-frame predictive coding is a coding method utilizing the temporal correlation between motion images, and predicts image data (current image data) of a currently coding frame on the basis of a temporally approximate frame (reference frame) and codes the difference (prediction error) between the predicted value and the current image data. This difference is small when the reference and current image data are in strong temporal correlation to each other, whereby the quantity of data to be transmitted can be reduced and information is efficiently compressed. Both of frames (or fields) temporally precedent and subsequent to the current frame (or field) are employed as frames (or fields) for the prediction.

Such predictive coding methods include the MPEG standard, which are international standard for motion images. Methods of coding (compressing) and decoding (decompressing) image data under the MPEG standards are explained in Nikkei Electronics, Mar. 14, 1994, pp. 82 to 116, for example.

FIG. 41 illustrates inter-frame predictive coding according to the MPEG standard. Temporal (time-based) arrangement of coded and decoded images is illustrated in FIG. 41. Nine pictures G1 to G9 are representatively illustrated in FIG. 41. Referring to FIG. 41, the relations between reference images (frames or fields) and current images are indicated by arrows. Arrows start from the reference images, and end in the current images.

The image G3 is an I picture, which is coded with no inter-frame predictive coding. Namely, an I picture is an image which is subjected to intra-frame or intra-field coding and has its pixel data itself coded. The images G6 and G9 are P pictures, which are subjected to inter-frame or inter-field predictive coding with past reproduced images. The images G1, G2, G4, G5, G7 and G8 are B pictures, which are images prediction-coded with either or both of past and future reproduced images. The B pictures are prediction-coded with sets of I pictures and P pictures or those of P pictures. None of B pictures are employed as reference images in predictive coding and decoding. Referring to FIG. 41, the B pictures G1 and G2 are prediction-coded with the future image (I picture) G3 which is subsequently positioned on time-base. The B pictures G4 and G5 are prediction-coded with both of the I picture G3 which is a past reproduced image precedently positioned on time-base and the P picture G6 which is a future reproduced image subsequently positioned on time-base. The B pictures G7 and G8 are prediction-coded with the P picture G6 which is a past reproduced image and the P picture G9 which is a future reproduced image.

FIG. 42 schematically illustrates the structure of a single picture. The structure of an NTSC size picture is illustrated in FIG. 42. The single NTSC size picture includes 720 pixels in a horizontal direction and 480 pixels in a vertical direction as to a luminance signal (Y), and includes 360 horizontally arranged pixels and 240 vertically arranged pixels as to each of two types of color-difference signals Cb and Cr. The term "pixel" indicates a sampling point of an "image signal". The term "image" indicates data of the whole of a single picture.

As shown in FIG. 42 in an enlarged manner, sampling positions (indicated by the marks of white circles) of the luminance signal (Y) are horizontally aligned with each other on a picture screen, while one color-difference signal pixel is present for two pixels of the luminance signal in each of the color-difference signals (Cb and Cr) with respect to each of the horizontal and vertical directions. Namely, the sampling frequency of the color-difference signals Cb and Cr is ¼ times that of the luminance signal Y, and this coding system is referred to as a "4:2:0 coding system".

FIGS. 43A and 43B illustrate image decoding processing. Referring to FIG. 43A, the image decoding processing (coding processing, too) is performed in units of pixel groups each having a prescribed size called a macro block (MB). In general, each macro block has a size of 16 by 16 pixels as to the luminance signal, and a size of 8 by 8 pixels as to each of the color-difference signals Cb and Cr. The macro block for the luminance signal Y is generally divided into four blocks of 8 by 8 pixels. In decoding under the MPEG standards, a parameter called a motion vector MV is utilized, as shown in FIG. 43B. This motion vector MV indicates a displacement to a reference block (predictive block) MBR having the strongest correlationship in the reference frame FR from a decoding block MB in a frame FP under decoding. In the decoding, addition with pixel data (reference data) of the predictive block MBR in the reference frame FR specified by the motion vector MV is performed with respect to the macro block MB in the frame FP under decoding, so that respective pixel data of the macro block MB are restored.

In an apparatus for decoding (and displaying) coded image data, a memory is required in the exterior, in order to store the decoded image data. As shown in FIG. 41, data of two (past and future) pictures are required for decoding each B picture. While the B pictures are not employed as reference images, the transferred image data are changed in frame order (temporally subsequent images are transmitted in advance in the transmission order for enabling the motion compensation from the future), and hence the B picture data must also be stored in the external memory, in order to correct the temporal order. Further, pixel data are supplied in units of macro blocks as to decoded image data while the display is performed along the raster scan order (the pixel data are successively displayed along the horizontal direction in FIG. 42 and then that pixel data of the next row are displayed after completion of display of one line), and hence the order of the pixel data must be changed.

In order to prevent the reference images from being rewritten by newly restored image data before these reference images are displayed, further, the external memory must have a storage capacity for storing at least three frames of image data. In the NTSC size picture, the luminance signal of a frame has 720 by 480 pixels, and each of the color-difference signals Cb and Cr of a frame has 360 by 240 pixels. When a single pixel is expressed in eight bits, therefore, the data quantity of one frame is 720·480·8×1.5= 3.96 Mbits, i.e., about 4 Mbits. The coefficient 1.5 is provided in consideration of the pixel numbers of the two types of color-difference signals Cb and Cr. Therefore, the external memory must have mass storage capacity of at least 12 Mbits.

The image decoding and displaying apparatus has operations for writing restored image data, reading predictive image (reference image) data in decoding processing, and reading display images, as types of access to the external memory. In the decoding processing, four motion vectors are required at the maximum according to the MPEG standards, and the total quantity of data transfer performed with respect to the external memory reaches about 100 Mbytes/sec. in case of a display speed of 30 NTSC size frames/sec.

One of techniques of ensuring such a large data transfer band is extension of the data width. For example, four 4-Mbit DRAMs each having a data width of 16 bits and supporting page mode access at 20 MHz are connected in parallel with each other so that the data width is 64 bits. According to this structure, data transfer ability of 20 MHz·8 bytes=160 Mbytes/sec. is assumed in simple calculation, and the performance required for the aforementioned data transfer band is satisfied.

In the aforementioned structure of connecting four 4-Mbit DRAMs in parallel with each other, one word is formed by eight bytes, whereby data of eight pixels can be transferred at the same time. In case of reading pixel data of a reference block in image data restoration, however, a number of garbage image data may be read depending on the value of the motion vector.

With reference to FIG. 44, consider pixels 0 to 24 . . . which are horizontally aligned with each other. One word is formed by eight pixel data. Therefore, the pixels 0 to 7 are read at the same time, while the pixels 8 to 15 are also read at the same time as one word. Consider that a luminance signal reference block is formed by the pixels 7 to 22. In this case, an operation of reading three words consisting of the pixels 0 to 7, the pixels 8 to 15 and the pixels 16 to 23 respectively and truncating the pixels 0 to 6 and 23 is required, in order to read out the necessary pixel data of the reference block. Namely, it is necessary to read three words in case of reading data of 16 pixels, since one word is formed by eight bytes and the pixel data are read in a unit of eight pixels. Thus, garbage pixel data are read in reading of the pixel data of the reference block, disadvantageously leading to deterioration of data transfer efficiency.

In case of switching pixel lines in the reference block, it is necessary to change row addresses since pixel data of one pixel line are generally arranged on the positions of the same row address in a DRAM. In this case, page mode access cannot be utilized for row switching and overhead is incurred due to the row switching (page switching), to deteriorate the data transfer efficiency.

Further, a 16-Mbit DRAM is widely utilized in recent years. When such a 16-Mbit DRAM is employed, the number of employed memories can be reduced, resulting in reduction of the area occupied by the apparatus and reduction of the cost (the cost for a single 16-Mbit DRAM is lower than that for four 14-Mbit DRAMs). In case of the 16 M-bit DRAM, however, its I/O structure (data width) is generally 16 bits at the maximum, and hence the aforementioned required wide data transfer band (bandwidth) of 100 Mbytes/sec. cannot be implemented.

In place of the aforementioned dynamic random access memory (DRAM), a high-speed memory may be employed. In particular, the difference between operating speeds of a general-purpose DRAM (dynamic random access memory) and general-purpose CPU (central processing unit) becomes remarkable due to recent improvement in performance of the CPU, and insufficient data transferability of the general-purpose DRAM comes into question. Namely, the waiting time of the CPU is lengthened in accordance with the data transferability of the general-purpose DRAM, and such insufficient data transferability of the general-purpose DRAM becomes a bottleneck for improvement of the system performance. Various high-speed DRAMs are now being implemented in order to solve the problem of insufficient data transferability of the general-purpose DRAM. One of such high-speed DRAMs is a synchronous DRAM (hereinafter referred to as an SDRAM).

FIG. 45 schematically illustrates the structure of the SDRAM. Referring to FIG. 45, the SDRAM includes two banks BKA and BKB, and an input/output circuit RD for inputting/outputting data in/from a selected bank (BKA or BKB) in synchronization with a clock signal CLK. The A and B banks BKA and BKB can be driven to active and precharged states independently of each other, while these banks BKA and BKB each include dynamic memory cells arranged in a matrix form. The clock signal CLK is a high-speed system clock, for example, with a frequency of 66 MHz to 100 MHz. Memory addresses of the banks BKA and BKB are specified by two-dimensional addresses, i.e., row and column addresses. Data of the same row address (hereinafter referred to as the same page) can be continuously accessed at a high speed. This is because memory cells of one page (or a word line) are specified and selected by the row address and the data of the selected page are latched by sense amplifiers, as well known in the art. In case of accessing data of different pages in one bank, it is necessary to change the row address (it is necessary to select another word line). In order to specify another row address, it is necessary to bring a selected row (word line) into a non-selected state and to thereafter drive a row (word line) corresponding to another row address into a selected state again similarly to the general-purpose DRAM, and hence a certain time is required for changing the pages in one bank. In order to solve the problem of overhead for such row address change, the A and B banks BKA and BKB are provided in the SDRAM, as shown in FIG. 45. Dissolution of the problem of overhead in row address change is attained by driving a second bank into a selected state during access to a first bank and accessing the second bank in row address change of the first bank. In order to implement high-speed data transfer through the bank structure of the SDRAM, however, the arrangement of pixel data in the banks BKA and BKB must be devised, as described below.

Consider that pixel data of pixel lines are alternately stored in the A and B banks as shown in FIG. 46A, for example. Namely, pixel data of odd-numbered lines are stored in the A bank and those of even-numbered lines are stored in the B bank as for data of a single image. In this case, the data can be transferred at a high speed due to the characteristics of the bank structure of the SDRAM if the pixel data are successively read in accordance with a raster scan system. However, 720 luminance signal pixels and 360 pixels of each of the color-difference signals Cb and Cr are arranged on a pixel line, as shown in FIG. 46B. In general, a 16-Mbit SDRAM has 256 (0 to 255) column addresses. Even if 16-bit data can be stored in a memory position of one column address, it is impossible to store all of 720 pixels in one page.

FIG. 47 illustrates a data read sequence of the SDRAM. As shown in FIG. 47, instructions for operations to be executed by the SDRAM are supplied in the form of commands. Each command is incorporated on the rising or trailing edge of the clock signal and decoded, so that the operation to be executed by the SDRAM is decided.

Each active command specifies a bank in the SDRAM, and specifies an operation of selecting a page in the specified bank. This active command also specifies the beginning of a memory cycle in the specified bank. In accordance with this active command, a page is selected, i.e., a word line is selected in the specified bank, so that memory cell data are read on an internal columns (bit line pairs), sensed and amplified, and latched by sense amplifiers. Two clock cycles are required from supply of the active command up to sensing and latching of the selected memory cell data.

Each read command specifies a data read operation. This read command also specifies a bank and a column subjected to data reading at the same time (column and bank addresses are supplied simultaneously with the read command). Data (words) of the selected column are read by the read command.

Each precharge command specifies a bank, and drives the specified bank to a non-selected state. In the SDRAM, all internal signal lines are precharged at prescribed potentials in non-selected states. Two clock cycles are required for returning all internal signal lines to precharged states in the bank specified by the precharge command. Therefore, at least two clock cycles are required between the precharge command and the active command. When page change is performed in one bank, it is necessary to supply the active command again after supplying the precharge command. Therefore, at least four clock cycles are required for this page change. When data are read in another bank, if only data less than the data of four clock cycles, i.e., four words (shown by a block enclosed with broken lines) of the other bank are read, all the data are read out before completion of this page change, the data cannot be read through all clock cycles required for the page change, overhead of the page change cannot be entirely hidden as a result, and high-speed data transfer cannot be implemented.

SUMMARY OF THE INVENTION

An object of the present invention is to provide an image decoding (decompressing) apparatus including a synchronous memory which can efficiently perform data transfer.

Another object of the present invention is to provide an image decoding (decompressing)apparatus which can efficiently perform data transfer by provoking data transferability of a synchronous memory at the maximum.

An image decoding apparatus according to a first aspect of the present invention includes a synchronous memory device including first and second banks capable of performing memory cell selecting operations independently of each other for inputting/outputting data in synchronization with a clock signal, decoding circuitry for receiving and decoding sampling pixel data included in coded image data for restoring original image data, and control circuitry for storing the image data restored by the decoding circuitry in the synchronous memory device. This control circuitry includes a unit for writing pixel data included in the image data from the decoding circuitry in the synchronous memory device such that pixel data horizontally aligned with each other on a screen as to a first signal component are alternately stored in the first and second banks in a unit of a prescribed number of at most two adjacent pixels.

An image decoding apparatus according to a second aspect of the present invention includes a synchronous memory device including first and second banks capable of performing memory cell selecting operations independently of each other for inputting/outputting data in synchronization with a clock signal, and decoding circuitry for receiving and decoding sampling pixel data included in coded image data for restoring original image data. The image data include first and second signal components of different types having the same sample numbers.

The image decoding apparatus according to the second aspect of the present invention further includes control circuitry for storing pixel data included in the image data restored by the decoding circuitry in the synchronous memory device. This control circuitry includes a unit for writing the image data in the synchronous memory device such that first and second signal data of the same pixel are stored in the same address positions of the first and second banks respectively.

It is possible to continuously input/output luminance signal data by bank switching in page change, by alternately storing the pixel data in the first and second banks in a unit of at most two adjacent pixels. Further, the pixel data can be read with the same number of accessed words for the first and second banks in both of reference image data reading and reading predictive images motion-compensated in fractional precision, while the number of garbage pixel data can be minimized.

Two types of color-difference signals are stored in the same address positions of the first and second banks respectively, whereby color-difference signal pixel data can be continuously inputted/outputted through bank switching also in page change. The pixel number of each color-difference signal is half that of the luminance signal with respect to the horizontal direction, and the pixel numbers of the luminance and color-difference signals on one line stored in one bank are equal to each other by the combination with the storage of luminance signal pixel data in the first and second banks alternately by at most two pixels. Thus, data input/output of the luminance and color-difference signals can be performed by the same access control to the synchronous memory, whereby the access control is simplified.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4A illustrates arrangement of luminance signal pixel data in one row address, and FIG. 4B illustrates addresses for a luminance signal pixel PXi;

FIG. 5A illustrates a specific example of a luminance signal pixel, FIG. 5B illustrates generation of a column address, a bank address and an upper/lower instruction bit from binary notation thereof, and FIG. 5C illustrates a storage mode of the pixel in the SDRAM shown in FIG. 5A;

FIG. 6 illustrates address generation of color-difference signal pixel data in the embodiment 1 of the present invention;

FIG. 7A illustrates a specific pixel of a color-difference signal, FIG. 7B illustrates the relation between the pixel number of this pixel and the column addresses, and FIG. 7C illustrates a storage position of this color-difference signal pixel data in the SDRAM;

FIGS. 13A and 13B are sequence diagrams representing operations in luminance signal reference image block pixel data reading;

FIGS. 27A illustrates data arrangement in an embodiment 3 of the present invention, and FIG. 27B illustrates address assignment and access units of the data shown in FIG. 27A;

FIG. 28A illustrates a data word read sequence in the embodiment 3 of the present invention, and FIG. 28B schematically illustrates image data and banks accessed in data word reading;

FIG. 37 illustrates an image data reading sequence in the embodiment 5 of the present invention;

FIGS. 46A to 46C illustrate problems in case of employing the conventional SDRAM; and FIG. 47 illustrates a basic access operation of the conventional SDRAM.

DESCRIPTION OF THE PREFERRED EMBODIMENTS

Embodiment 1

Figure 1A:
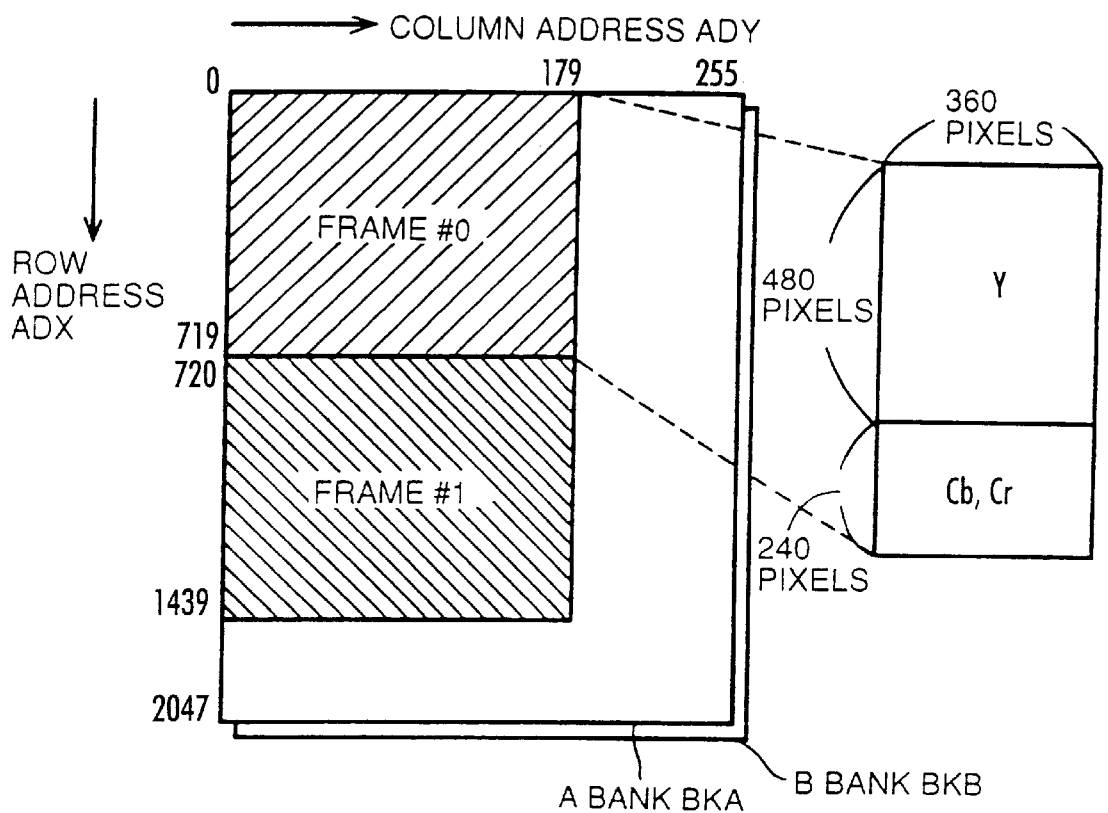
FIG. 1A illustrates a pixel data storage region in an SDRAM employed in the present invention.

FIG. 1A schematically illustrates a method of arranging image data on an SDRAM in an image decoding and displaying apparatus according to the present invention. Referring to FIG. 1A, the SDRAM includes two banks BKA (A bank) and BKB (B bank) of the same structures. Each of the banks BKA and BKB has addresses 0 to 2047 as row addresses ADX, and addresses 0 to 255 as column addresses ADY. In this SDRAM, a storage position of one word is specified by a row address ADX and a column address ADY. Each word is formed by 16 bits. Therefore, this SDRAM has 2048·256·16·2=16 Mbits as the storage capacity. As described previously, a luminance signal serving as a first signal includes 720 pixels (columns) by 480 pixels (rows) and each of color-difference signals Cb and Cr serving as first and second signals having equal sample numbers includes 360 pixels (columns) by 240 pixels (rows) in an NTSC-size image.

Luminance signal pixel data and color-difference signal pixel data are 8-bit data. One word of the SDRAM is formed by 16 bits, and data of two pixels can be stored in one word. The A bank BKA and the B bank BKB have the same address arrangements, and data of four pixels can be stored in one address (excluding a bank address) of the SDRAM. When both of the A and B banks BKA and BKB are employed, therefore, data of 720 pixels can be stored in 180 column addresses, pixel data for one line of the luminance signal can be stored as to one row address, and pixel data of one line (360·2=720) of each of the two color-difference signals Cb and Cr can be stored in the same row address position, as described below in detail.

Referring to FIG. 1A, pixel data of a frame #0 are stored in the row addresses 0 to 719 and the column addresses 0 to 179, and pixel data of a frame #1 are stored in the row addresses 720 to 1439. As described later in detail, each frame including pixel data of a luminance signal Y arranged on 480 pixel rows and 360 pixel columns and a color-difference signal (Cb or Cr) arranged on 240 pixel rows by 360 pixel columns in one bank.

Figure 1B:
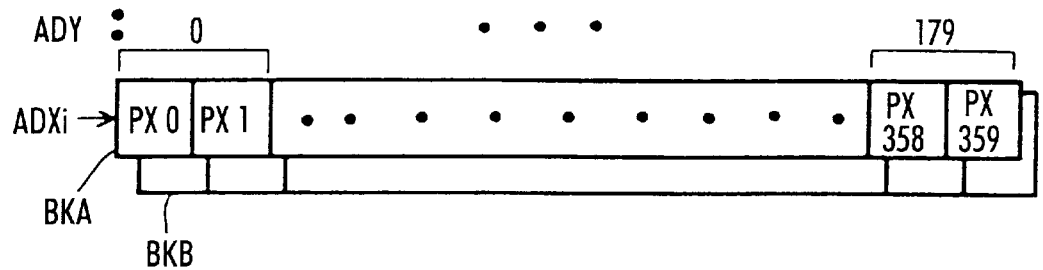
FIG. 1B illustrates a pixel data train arranged in one row address.

As shown in FIG. 1B, one row address ADXi has the column addresses ADY of 0 to 179. Data of two pixels are stored in one column address. Therefore, pixel data of 360 pixels PX0 to PX359 are stored as to the row address ADXi. The banks BKA and BKB have the same structures, whereby data of 720 pixels in total are stored in the same row address positions of the banks BKA and BKB. The 720 pixel data are sorted into the respective banks to implement efficient pixel data transfer, as described later in detail. In other words, pixel data of half in number the pixels of the luminance signal Y (480 pixel rows by 360 pixel columns) and half in number the overall pixels of the color-difference signals Cb and Cr (240 pixel rows by 360 pixel columns) are stored in one bank.

When all pixel data on the same line are stored in one row address of the SDRAM, the following effect is attained: When pixel data are stored through all memory positions as to one row address, there is no correspondence between the row address and the pixel line. Namely, pixel data of two lines are mixed in one row address. In case of this structure, column address positions of the starting of respective pixel lines differ from each other. Namely, head column address positions of respective pixel lines are dispersed. In case of reading a reference image block, therefore, page change must be so frequently performed that overhead in the page change may not be negligible. Further, the pixel data of the reference block must be read while regularly monitoring the head column address positions of the respective pages, and hence the control is complicated. When one row address is associated with one pixel line, on the other hand, the pixel line and the row address are in one-to-one correspondence to each other (in case of storing pixel data of one pixel line in one row address), and the head column address positions of respective pixel lines are regularly identical to each other. Thus, necessary pixel data can be readily read in accordance with a motion vector in reading of pixel data from the reference block.

Figure 2A:
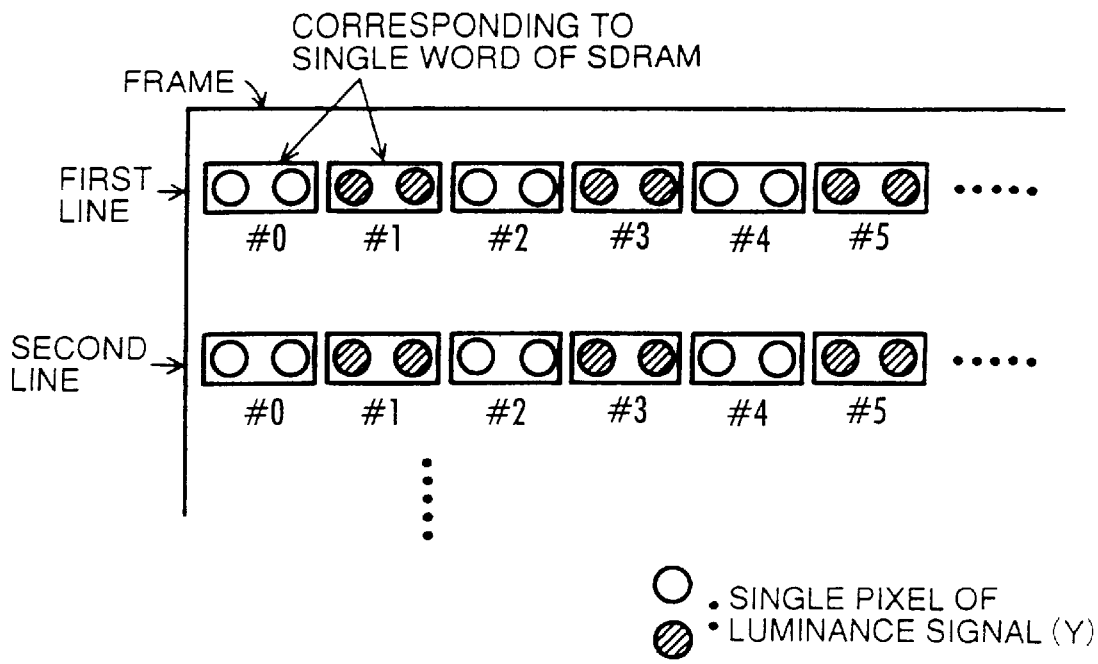
FIG. 2A illustrates the correspondence between luminance signal pixel data and one word of an SDRAM in an embodiment 1 of the present invention.
Figure 2B:
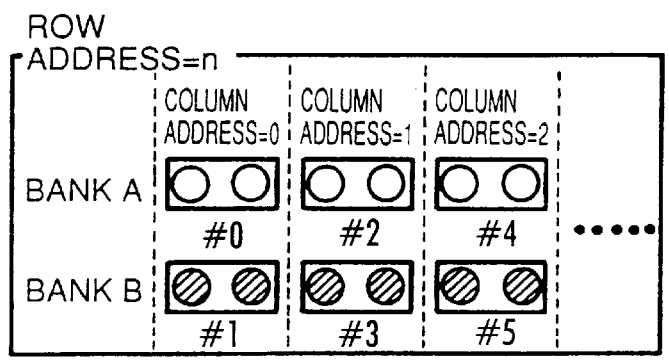
FIGS. 2B and 2C illustrate assignment of column addresses of respective pixel data in the SDRAM.
Figure 2C:
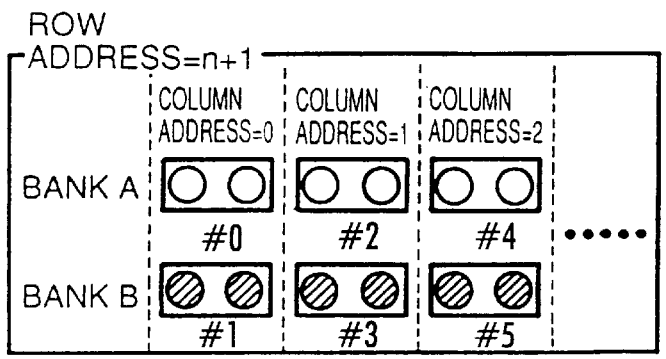

FIGS. 2A to 2C illustrate arrangement of pixel data of the luminance signal (Y) in storage positions of the SDRAM in detail. Referring to FIG. 2A, two adjacent pixels are processed as one word of the SDRAM as to pixels of the luminance signal (Y) arranged on respective lines of one frame. Therefore, pixels of 360 words of the SDRAM are present on each line of the frame. Even-numbered words #0, #2, #4, . . . are stored at the A bank BKA (hereinafter simply referred to as the bank A), and odd-numbered words #1, #3, #5, . . . are stored at the B bank BKB (hereinafter simply referred to as the bank B).

As shown in FIG. 2B, the words #0, #2, #4, . . . are stored in the column addresses 0, 1, 2, . . . respectively in the bank A, while the words #1, #3, #5, . . . are stored in the column addresses 0, 1, 2, . . . respectively in the bank B, in the storage positions for a row address, n, of the SDRAM.

As shown in FIG. 2C, the even-numbered words #0, #2, #4, . . . are stored at the column addresses 0, 1, 2, . . . respectively in the bank A, and the words #1, #3, #5, . . . are stored in the column addresses 0, 1, 2, . . . respectively in the bank B, similarly for a row address (n +1). Therefore, pixel data of the luminance signal corresponding to even-numbered words of one line are stored in storage positions for one row address in the bank A, while pixel data of the luminance signal corresponding to odd-numbered words are stored in the bank B. In this case, data of 360 pixels are stored in each of the banks A and B for one row address.

Figure 3A:
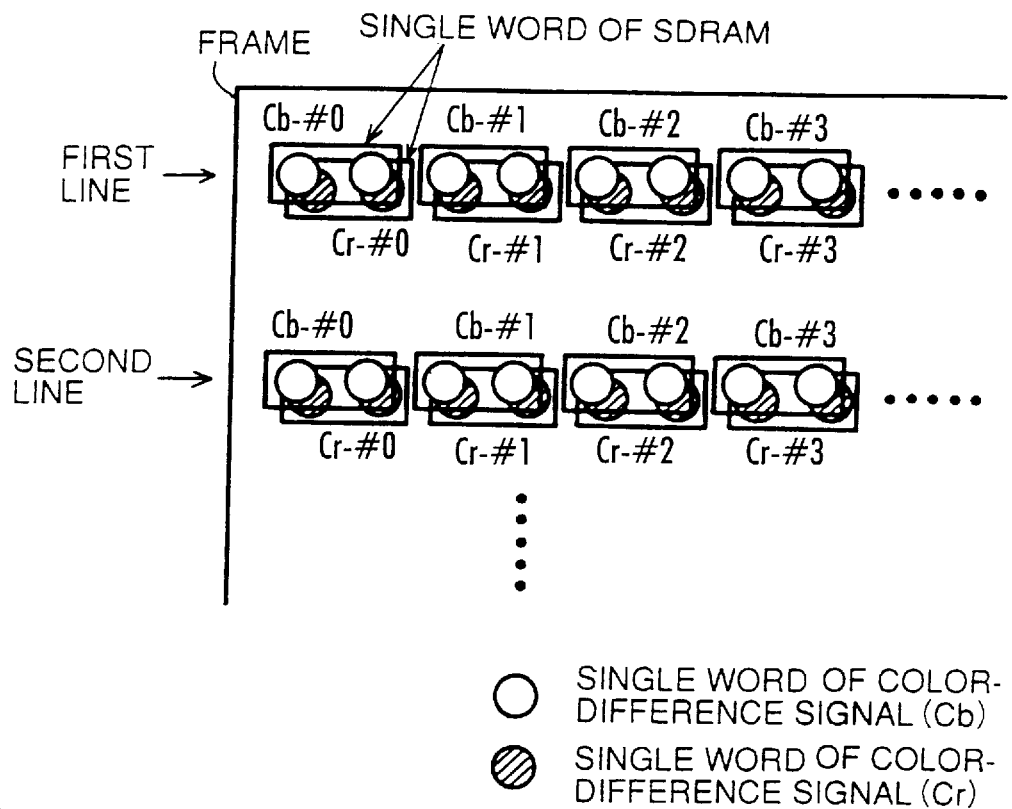
FIG. 3A illustrates the correspondence between color-difference signal pixel data and one word of the SDRAM in the embodiment 1 of the present invention.
Figure 3B:
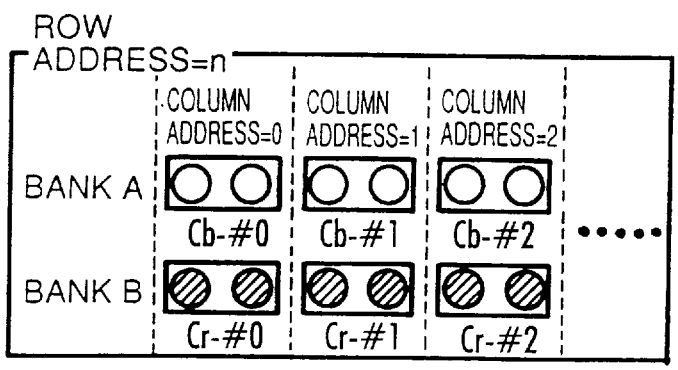
FIGS. 3B and 3C illustrate storage modes of color-difference signals in banks A and B of the SDRAM and assignment of column addresses.
Figure 3C:
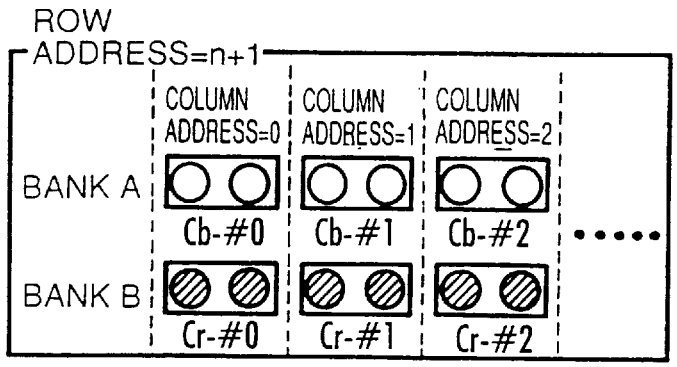

FIGS. 3A to 3C illustrate arrangement of pixel data of the color-difference signals Cb and Cr on storage positions of the SDRAM. Referring to FIG. 3A, a pair of adjacent pixels on the same line of the color-difference signal Cb are processed as one word of the SDRAM. Also in the color-difference signal Cr, a pair of adjacent pixels on the same line are processed as one word of the SDRAM. Namely, 180 words Cb#0, Cb#1, in total of the color-difference signal Cb are arranged on one line in the frame, while 180 words Cr#0, Cr#1, . . . of the color-difference signal Cr are also arranged on one line in the frame.

As shown in FIG. 3B, the pixel data of the color-difference signal Cb are arranged on the respective ones of the column addresses in the storage positions for the row address, n, in units of words in the bank A, and the pixels of the color-difference signal Cr are stored in correspondence to the respective column addresses with each word formed by two pixels in the bank B. Also in the storage positions for the row address n+1, the pixel data of the color-difference signal Cb are stored in the respective column addresses with each word formed by two pixels in the bank A, and the data of the color-difference signal Cr are stored in the respective column addresses with each word formed by two pixels in the bank B, as shown in FIG. 3C.

These color-difference signals Cb and Cr are separately stored in the banks A and B respectively, whereby pixel data of 360 pixels (180 words) are stored in storage positions (one row) for one row address in each of the banks A and B as to each of the luminance and color-difference signals.

FIG. 4A illustrates arrangement of pixels of the luminance signal (Y) on a line number, n, and FIG. 4B illustrates the structure of addresses of a pixel PXi on the SDRAM. Referring to FIG. 4A, pixels PX0 . . . PXi, PXi +1, . . . are arranged on the line number, n. The line number, n, starts from zero. The address for the pixel PXi is obtained from the line number, n, and the number, i, of the pixel PXi, as shown in FIG. 4B. Namely, the row address is obtained by the line number, n, (even-numbered frame #0) or the line number (n)+720 (odd-numbered frame #1). The column address is obtained by upper bits expressing the pixel number, i, in binary notation. Least significant two bits are utilized as a bank address bit BA and an upper/lower instruction bit U/L.

The bank address bit BA is arranged at an upper position than the upper/lower instruction bit U/L. The bank A is specified when the bank address bit BA is zero, while the bank B is specified when the bank address bit BA is 1. When the bit U/L is zero, an upper byte is specified and a head pixel in the word is specified. When the bit U/L is 1, on the other hand, a lower byte is specified to indicate a latter pixel of the word. The head pixel in this word may be stored in the lower byte, in place of the upper byte.

The row address can be readily generated from the line number, n, in accordance with an even-numbered or odd-numbered frame. When the pixel number, i, is obtained, on the other hand, an address for the SDRAM can be readily generated. A method of generating an address from the pixel number, i, is now described specifically.

Consider a luminance signal pixel PX248, as shown in FIG. 5A. The decimal number "248" is expressed as "11111000" in binary notation. 720 luminance signal pixels are present on one line, and hence the pixel position is expressed in a 10-bit address. As shown in FIG. 5B, upper eight bits are employed as the column address of the SDRAM, the bit next to the least significant bit is employed as the bank address bit BA, and the least significant bit is utilized as the upper/lower instruction bit U/L. In this case, therefore, the column address for the SDRAM is 62, the bank address bit BA is zero and hence the bank A is specified, while the upper byte is specified since the upper/lower instruction bit U/L is zero. Therefore, the data of the pixel PX248 are stored in the head position of the word of the column address #62 in the bank A, as shown in FIG. 5C.

FIG. 6 illustrates the correspondence between the pixel number of the color-difference signal and the address of the SDRAM. FIG. 6 similarly shows the address of the pixel PXi shown in FIG. 4A. In case of the color-difference signal, the row address is provided by the row number +480 (even-numbered frame) or the line number +1200 (in case of an odd-numbered frame), as clearly understood from the pixel arrangement shown in FIG. 1A. The row address is larger by 480 as compared with the pixel data of the luminance signal since the color-difference signal is stored in a row address region higher than the luminance signal storage region. The pixel number, i, is decomposed into a column address and an upper/lower instruction bit U/L. This pixel number, i, is expressed in binary notation, and the least significant bit is utilized as the upper/lower instruction bit U/L. The bank address bit BA is supplied as a signal specifying the color-difference signal Cb or Cr. The bank address bit BA is zero and specifies the bank A in case of the color-difference signal Cb, while the bank address bit BA is 1 and specifies the bank B in case of the color-difference signal Cr. This bank address bit BA may be arranged on a position of the most significant bit (left side of the row address) shown in FIG. 6.

Consider the address of the pixel PX248 of the color-difference signal Cb or Cr, as shown in FIG. 7A. In case of the color-difference signal, 360 pixels are arranged on one line, while the pixel position is expressed in 10 bits in coincidence with the luminance signal. This pixel number 248 is expressed in binary notation, and the least significant bit is utilized as the upper/lower instruction bit U/L. "248" is expressed as "11111000", and hence the column address is 124 because zero of the least significant bit is excluded. Namely, the pixel data PX248 is stored in an upper byte position of a word position (column address) #124 in the SDRAM, as shown in FIG. 7C. Whether the data is stored in the bank A or B is decided depending on whether the pixel data PX248 is the data of the color-difference signal Cb or of the color-difference signal Cr.

Thus, the storage position of each pixel data in the SDRAM can be specified also in case of selectively storing image data, which are arranged on each line in units of pixels, in the banks A and B in units of pairs of horizontally adjacent pixels.

When the image data are selectively stored in the banks of the SDRAM in units of pairs of adjacent pixels, it is possible to efficiently perform transfer of the image data, particularly reading of a reference image block, as described below in detail.

[Reading of Predicted Image (Reference Image) Block Pixel Data]

Figure 8A:
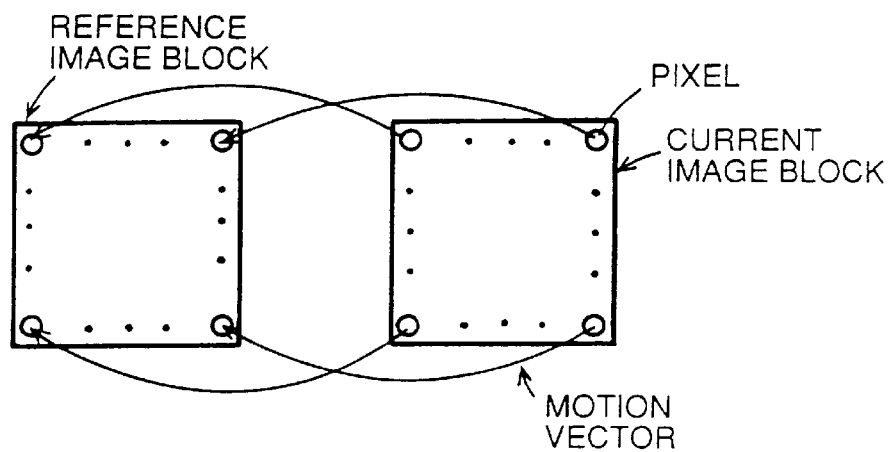
FIG. 8A illustrates the correspondence between a decoded current image block and a reference image block.

FIG. 8A schematically illustrates decoding processing of a motion-compensated predicted image. Referring to FIG. 8A, a current image block is formed by pixels which are arranged in 16 rows and 16 columns for the luminance signal (Y), while it is formed by pixels which are arranged in eight rows and eight columns for each color-difference signal (Cb or Cr). A reference image block providing predicted values of the pixel data of the current image block has the same size as the current image block. The pixel data of the current image block coded by prescribed processing indicates a differential value between the same and the corresponding pixel data of the reference block. In the decoding processing, therefore, data of the respective pixels of the current image block and those of the corresponding pixels of the reference image block are added up for restoring the current image data. In the reference image, displacements from the current image block positions to the reference image block positions are indicated by motion vectors. In restoration, therefore, the respective pixel data of the current image block are added up with those of pixels present in positions indicated by the motion vectors.

In this motion-compensated predictive coding, there are prediction in integer precision and that in fractional precision. In the prediction in integer, both of horizontal and vertical components of the motion vectors are integers.

In the prediction in fractional precision, on the other hand, horizontal and vertical components H and V of the motion vectors can take fractional values. In this embodiment, a ½ pixel, i.e., ½ precision is employed as the reference unit for the motion vectors.

Figure 8B:
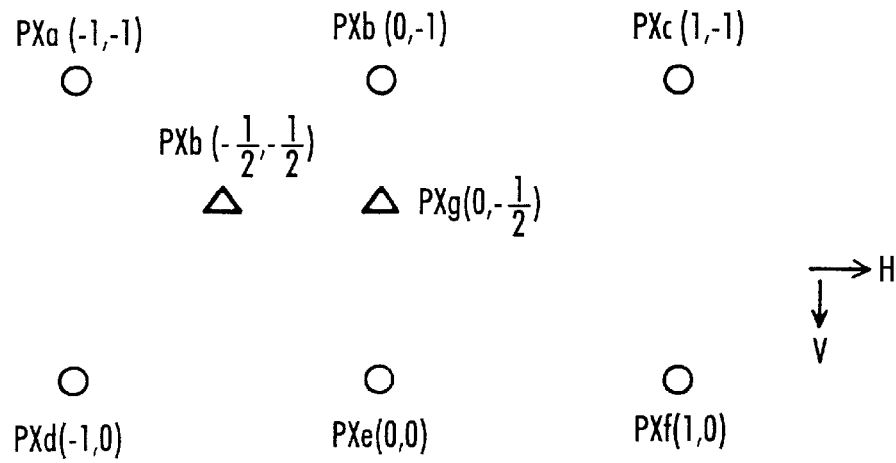
FIG. 8B illustrates the motion vector.

FIG. 8B illustrates motion vectors of ½ pixel precision and corresponding pixel positions. Referring to FIG. 8B, the horizontal rightward direction is the positive direction of horizontal components H of the motion vectors, and the downward direction is the positive direction of the vertical components V of the motion vectors. Assuming that the motion vectors are expressed as (H, V), a pixel PXe corresponds to the position of a motion vector (0, 0). Motion vectors of pixels PXf and PXd arranged on positions in negative and positive horizontal directions are (1, 0) and (−1, 0) respectively. A motion vector for a pixel PXb displaced in a vertical direction from the pixel PXe by one pixel is (0, −1). Pixels PXc and PXa horizontally adjacent to the pixel PXb have motion vectors (1, −1) and (−1, −1) respectively. In the ½ pixel precision, the motion vectors can take ±½ in both of the horizontal and vertical components H and V. A motion vector of a pixel PXg negatively displaced from the pixel PXb by a ½ pixel in the vertical direction is (0, −½). A motion vector of a pixel PXh negatively displaced by ½ pixels in the horizontal and vertical directions is (−½, −½).

The range of the motion vectors is decided by a predetermined search range (range allowing a search for a reference pixel block having the highest degree of correlation), and the motion vectors can take arbitrary values as integer values thereof. In case of the ½ pixel precision, the pixel PXg is PXh is not a sampled pixel. These are virtual pixels existing between pixels, and hence the data of the pixel PXh is calculated by making an arithmetic mean, for example, of the adjacent pixels PXa, PXb, PXd and PXe, while the data of the pixel PXg is calculated from the data of the pixels PBX and PXe. In case of this ½ pixel precision, therefore, it is necessary to read an image block of a size extended by one pixel from the reference image block in the integer precision, in order to calculate data of a pixel, such as the pixel PXh, existing in an intermediate position.

Figure 8C:
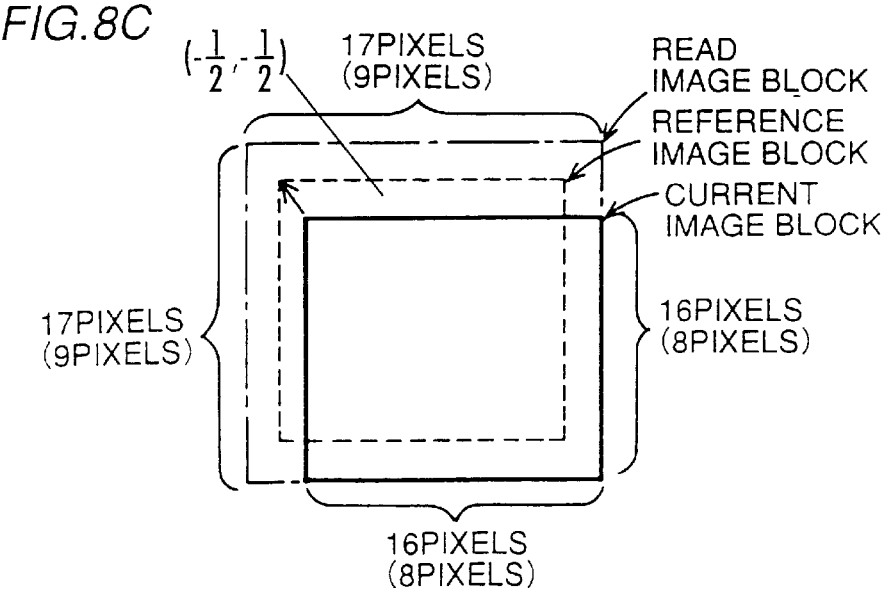
FIG. 8C illustrates the sizes of image blocks read in response to the motion vector.

FIG. 8C shows a reference image block of the motion vector (−½, −½) by broken lines with respect to the current image block. All pixels of the reference image block shown by the broken lines must be calculated from sampled pixel data. Therefore, it is necessary to read an image block storing this reference image block. In case of the motion vector (−½, −½), for example, it is necessary to read an image block of 17 pixels by 17 pixels in relation to the luminance signal, while an image block of nine pixels by nine pixels must be read in case of each color-difference signal. Namely, it is necessary to read an image block having a size larger than the current image block by one pixel with respect to the direction having fractional components. In case of a pixel block of a luminance signal of 16 by 16 pixels, therefore, it is necessary to read an image block of 16 by 16 pixels 17 by 16 pixels, 16 by 17 pixels or 17 by 17 pixels in accordance with the value of the motion vector. Also as to a current image block of a color-difference signal of 8 by 8 pixels, therefore, it is necessary to read an image block of 8 by 8 pixels, 8 by 9 pixels, 9 by 8 pixels or 9 by 9 pixels in accordance with the value of the motion vector.

Figure 9A:
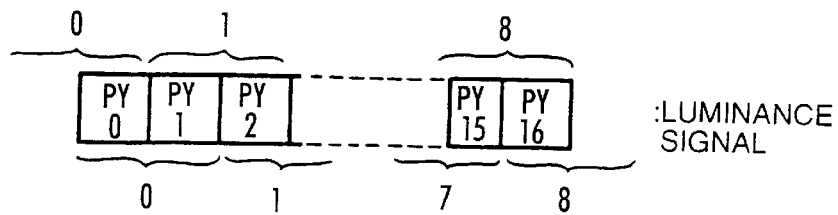
FIG. 9A illustrates the correspondence between words and pixel data in reading of a luminance signal reference image block.

FIG. 9A illustrates the correspondence between 17 pixels PY0 to PY16 of the luminance signal and read words. When the luminance signal pixel PY0 is the first byte of a word in FIG. 9A, the required 17-th pixel PY16 is also a first byte of a word. When the pixel PY0 is a second byte of a word 0, on the other hand, the final pixel PY16 is also present on the position of a second byte of a word. In either case, nine words must be read from the SDRAM.

Figure 9B:
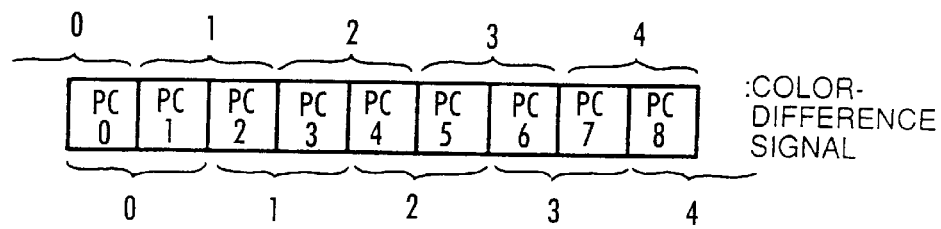
FIG. 9B illustrates the correspondence between employed pixels and read words in reading of a color-difference signal reference image block.

FIG. 9B illustrates the correspondence between pixels of a reference block of a color-difference signal and read words. When a head color-difference signal pixel PC0 is stored in a first byte position of a word, a ninth final pixel PC8 is also stored in a first byte position of a word. When the head pixel PC0 is stored in a second byte position of a word, on the other hand, the final pixel PC8 is also stored in a second byte position of a word. In either case, pixel data of the color-difference signal must be read by five words.

Figure 10A:
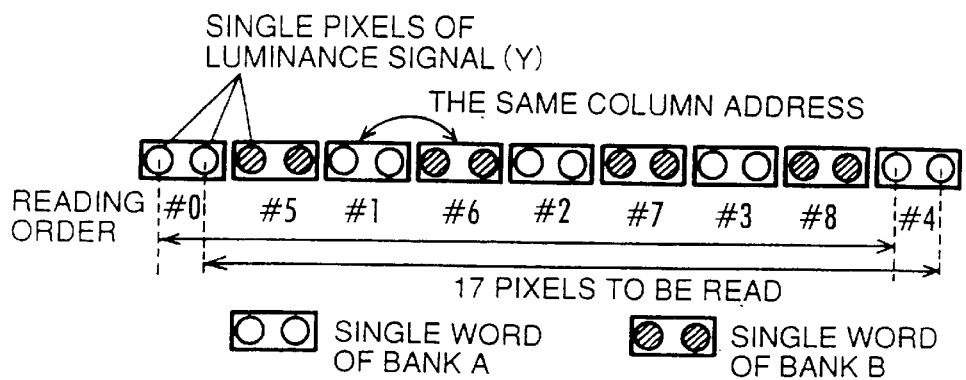
FIGS. 10A and 10B illustrate pixel data reading sequences in reading of luminance signal reference image block pixel data.
Figure 10B:
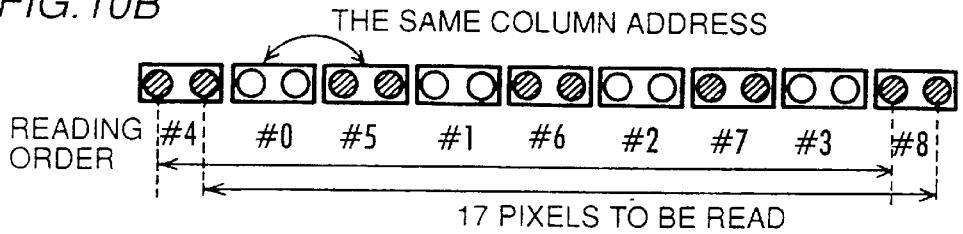

FIGS. 10A and 10B illustrate the order of reading luminance signal pixel data of the reference pixel block from the SDRAM. Referring to FIGS. 10A and 10B, white circle marks indicate pixel data stored in the bank B. and slanted circle marks indicate pixel data stored in the bank B. One word includes two pixels. When the head pixel of one line of the reference image block is stored in the bank A in FIG. 10A, five words #0 to #4 are first continuously read from the bank A, and then four words #5 to #8 are read from the bank B. Required 17 pixels are varied with the position head pixel being at the first or second byte of the head word #0.

FIG. 10B illustrates data reading order in case where the head pixel in one line of the reference image block is stored in the bank B. Also in this case, necessary four words #0 to #3 are read from the bank A first, and then five words #4 to #8 are continuously read from the bank B. Required 17 pixels are varied with the position at the head pixel being at the first or second byte of the word #4. When the read operation shown in FIG. 10A or 10B is repeated for necessary lines (16 or 17 lines) of the reference image block, all the necessary pixel data of the reference block can be read out. Basically, five words are continuously read from either one of the banks A and B, and four words are continuously read from the other bank, depending on whether the head pixel is stored in the bank A or B. This operation is repeated. The term "read" indicates supply of necessary data from the SDRAM to a decoding unit.

Figure 11:
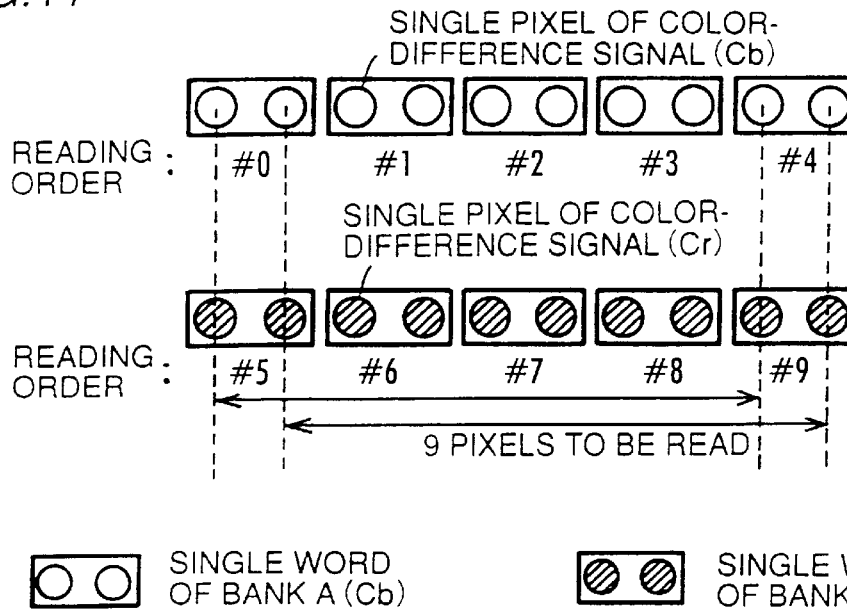
FIG. 11 illustrates a color-difference signal reference image block pixel data reading sequence.

FIG. 11 illustrates a reading order of the color difference signals from the SDRAM. Referring to FIG. 11, each white circle mark indicates one pixel of the color-difference signal Cb, and each slanted circle mark indicates one pixel of the color-difference signal Cr. The respective pixels of the color-difference signal Cb are stored in the bank A, and those of the color-difference signal Cr are stored in the bank B. In this case, the bank A is first accessed and five words #0 to #4 are continuously read, and then the bank B is accessed and five words #5 to #9 are continuously read. Thus, the pixel data of the color-difference signal Cb are first read, and then the respective pixel data of the color-difference signal Cr are read. Sampling positions of the color-difference signals Cb and Cr are identical to each other. Therefore, necessary nine pixels are selected depending on whether the head pixel position is on a first or second byte position of a word in the reference image block. In case of the color difference signal, the banks A and B are alternately accessed in an unit of five words, for reading the data. This reading operation is repeatedly executed by a required line number (8 or 9 lines) of the reference image block.

As hereinabove described, the access sequences for the SDRAM can be made identical with respect to both of the luminance and color-difference signals by alternately accessing the banks A and B in an unit of a constant number of words in both of the luminance and color-difference signals as described later in detail, whereby the control is simplified.

Figure 12:
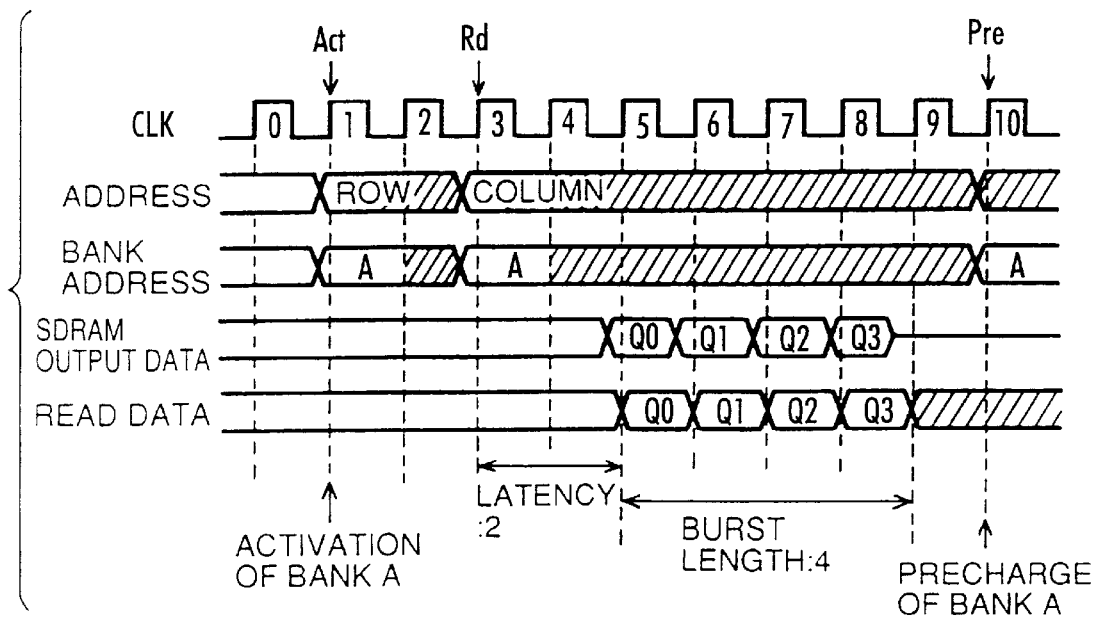
FIG. 12 is a sequence diagram representing an access operation of the SDRAM.

FIG. 12 is a timing chart representing the reading operation of the SDRAM. The data reading operation of the SDRAM is now briefly described.

This SDRAM inputs/outputs data, and executes incorporation of a control signal and an address signal from the exterior in synchronization with a clock signal. An active command Act is supplied at a clock cycle 1. Row and bank addresses are supplied simultaneously with this active command Act. The bank address specifies the bank A, and this bank A is activated, for selecting memory cells of a page whose row address is specified. Commands of the SDRAM are supplied by combinations of states of external control signals.

A read command Rd is supplied at a clock cycle 3, to specify a data read operation. Column and bank addresses are simultaneously supplied with this read command Rd. A word on a page specified by the row address is specified by this column address. A word Q0 specified by this column address is read from a clock cycle 5 after a lapse of two clock cycles. The number of clock cycles required till outputting the corresponding data Q0 from the supply of the read command Rd is generally called a latency. Referring to FIG. 12, the latency is 2.

Then, adjacent words (in the same page) are successively selected on the basis of the column address supplied with the read command Rd every clock cycle, so that words Q1, Q2 and Q3 are outputted. Output data of the SDRAM are brought into an ascertained state before the clock signal CLK rises at each clock cycle, and the output data of the SDRAM are sampled in synchronization with the rising edge of the clock signal CLK and supplied to the image decoding apparatus (or the image decoding and displaying apparatus) as read data. The number of data which can be continuously read by supplying one column address is called a burst length, which is 4 in FIG. 12. When data of the burst length are read, the SDRAM enters an output high impedance state. In this state, the page maintains a selected state in the bank A. A precharge command Pre is supplied at a clock cycle 10 along with a bank address (A). Thus, the page which has been selected in the bank A is brought into a non-selected state, and the bank A returns to a precharged state. In general, the burst length can be set to an arbitrary number up to one page at the maximum.

The SDRAM has the banks A and B, and can activate and precharge the banks A and B independently of each other by specifying the banks in accordance with the bank addresses. However, only a command for one bank can be supplied at one clock cycle. A reading operation of efficiently performing the pixel data reading sequence shown in FIGS. 10 and 11 with no collision of commands is now described.

FIGS. 13A and 13B illustrate a sequence of reading reference block pixel data from the SDRAM. These figures show the luminance signal pixel data reading operation sequences shown in FIGS. 10A and 10B respectively. Referring to FIGS. 13A and 13B, the latency is 2, and the burst length is the full page (all pixel data of one page). A continuous data reading operation is stopped by a precharge command Pre.

Referring to FIG. 13A, an active command Act for the bank A of the SDRAM is supplied at a clock cycle #0, and a read command Rd for the bank A is supplied at a clock cycle #2. In accordance with the read command Rd at the clock cycle #2, pixel data (A) are continuously read from a clock cycle #4 after a lapse of two clock cycles.

An active command Act for the bank B of the SDRAM is supplied at a clock cycle #5, and a read command Rd for the bank B is supplied at a clock cycle #7. In the SDRAM, a subsequently supplied read command Rd is rendered effective. Therefore, pixel data from the bank A are continuously read up to a clock cycle #8, and pixel data (B) from the bank B are continuously read from a clock cycle #9 in accordance with the read command Rd at the clock cycle #7. A precharge command Pre is supplied at the clock cycle #8, for returning the bank A to a precharged state.

An active command Act is supplied for the bank A again at a clock cycle #10 while the pixel data are read from the bank B, and then a read command Rd is supplied for the bank A at a clock cycle #12. In accordance with the read command Rd at the clock cycle #12, the pixel data (A) of the bank A are continuously read from a clock cycle #14. A precharge command Pre is supplied for the bank B at a clock cycle #13. At this time, pixel data are read at the clock cycle #13 in accordance with the read command Rd for the bank B supplied at the clock cycle #7, while the data are neglected in the exterior (this structure is described later). Even if the precharge command Pre is supplied, valid data are outputted at that clock cycle. The precharge command Pre inhibits data output at the next clock cycle (precharging is performed at that cycle).

An active command Act is supplied for the bank B at a clock cycle #15, and a read command Rd for the bank B is supplied at a clock cycle #17. Thus, the pixel data (B) from the bank B are read from a clock cycle #19. A precharge command Pre is supplied for the bank A at a clock cycle #18, for returning the bank A to a precharged state, in preparation for the next page change.

As shown in FIG. 13A, data are continuously read over five clock cycles from each of the banks A and B. Only in the bank B, pixel data included in the final one of five words is invalidated. Further, the commands Act, Rd and Pre are alternately supplied to the banks A and B every five clock cycles. In each of the banks A and B, each command is supplied in a period of 10 clock cycles. Thus, the commands can be periodically supplied, whereby control of command application to the SDRAM is simplified. The interval between each precharge command and each active command is reliably two clock cycles, and the interval between each active command Act and each read command Rd is also two clock cycles. Thus, the banks A and B each are accessed with the minimum necessary delay time. Only pixel data of one word is rendered unnecessary for the access cycles with respect to the banks A and B, whereby overhead of page change can be suppressed to the minimum in reading the pixel data of the reference image block.

Referring to FIG. 13B, the head pixel of each line of the reference pixel block is stored in the bank B. Also in this case, the bank A is accessed first. An active command Act for the bank A is supplied at a clock cycle #0, and a read command Rd for the bank A is supplied at a clock cycle #2. Words stored in the bank A are successively read from a clock cycle #4. The data read at the clock cycle #4 are neglected in an external device as pixel data in the exterior of the reference image block. During such word reading from the bank A, an active command Act for the bank B is supplied at a clock cycle #5, and a read command Rd for the bank B is supplied at a clock cycle #7. Thus, pixel data from the bank B are successively read from a clock cycle #9. A precharge command Pre for the bank A is supplied at a clock cycle #8. Then, an active command Act for the bank A is supplied at a clock cycle #10, and a read command Rd for the bank A is supplied at a clock cycle #12. Also in this state, words (pixel data) read from the bank A at a clock cycle #14 are neglected in the external device as garbage data. Data (A) of four words continuously read from a clock cycle #15 are processed as the pixel data of the reference image block.

An active command Act for the bank B is supplied again at the clock cycle #15, and a read command Rd for the bank B is supplied at a clock cycle #17. Thus, word data from the bank B are read from a clock cycle #19. A precharge command Pre for the bank A is supplied at a clock cycle #18, in preparation for page change.

Also in the reading operation sequence shown in FIG. 13B, word data are alternately read from the banks A and B in a unit of five words. The head words of the bank A are neglected in the exterior. Also in this case, therefore, garbage of only one word is outputted for each line of the reference image block, the pixel data are continuously outputted from the SDRAM, and overhead of page change can be suppressed to the minimum in reading necessary reference block pixel data.

As clearly understood from the operation sequences shown in FIGS. 13A and 13B, the clock cycles at which the commands are supplied identical to each other. Namely, the commands are alternately applied to the banks A and B every five clock cycles, and the command application period for each bank is 10 clock cycles. Therefore, the access control for the SDRAM may not be changed regardless of the head pixel position of the reference image block (merely processing of rendering the pixel data unnecessary in the exterior is required), and the access control with respect to the SDRAM is simplified.

Figure 14:
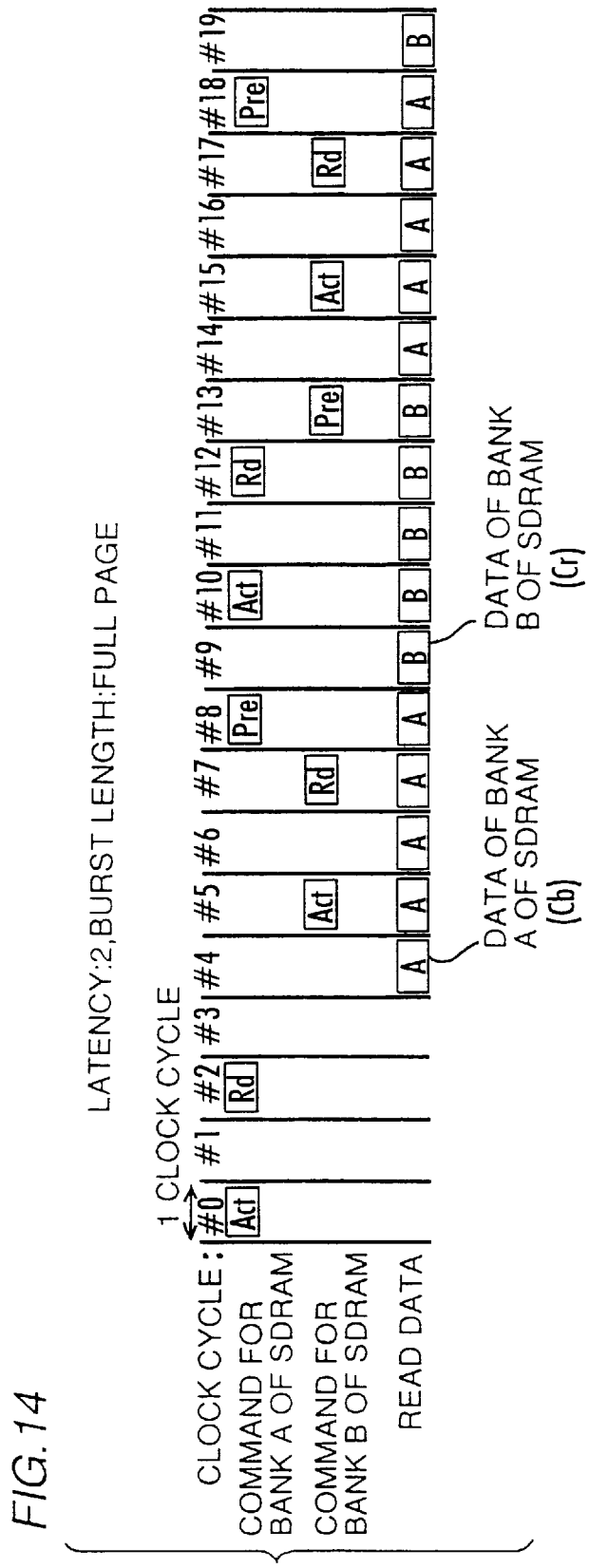
FIG. 14 is a sequence diagram representing an operation in color-difference signal reference image block pixel data reading.

FIG. 14 illustrates a sequence of reading pixel data of the color-difference signals from the SDRAM. This reading sequence for the color-difference signals corresponds to the reading sequence for the color-difference signals Cb and Cr shown in FIG. 11.

Referring to FIG. 14, an active command Act for the bank A is supplied at a clock cycle #0, and a read command Rd for the bank A is supplied at a clock cycle #2. Pixel data from the bank A are successively read by five words from a clock cycle #4. An active command Act for the bank B is supplied at a clock cycle #5, and a read command Rd for the bank B is supplied at a clock cycle #7. In accordance with the read command Rd for the bank B, pixel data are successively read from the bank B by five words from a clock cycle #9.

A precharge command Pre for the bank A is supplied at a clock cycle #8, and an active command Act for the bank A is supplied again at a clock cycle #10. Then, a read command Rd for the bank A is supplied at a clock cycle #12. In accordance with the read command Rd at the clock cycle #12, pixel data of five words are continuously read from the bank A from a clock cycle #14. A precharge command Pre for the bank B is supplied at a clock cycle #15, and an active command Act for the bank B is supplied again at a clock cycle #15. Then, a read command Rd for the bank B is supplied at a clock cycle #17. A precharge command Pre for the bank A is supplied at a clock cycle #18.

Also in the reading sequence shown in FIG. 14, pixel data of five words are continuously read alternately from the banks A and B. The commands are alternately supplied to the banks A and B every five clock cycles, and the command application period for each bank is 10 clock cycles. Therefore, necessary color-difference signal pixel data can be read in accordance with the same access sequence as that in the pixel data reading of the luminance signal. No garbage data word is present in case of the color-difference signals. Garbage pixels are invalidated in the interior of the decoding apparatus, for example, in accordance with the position of the reference image block.

Figure 15:
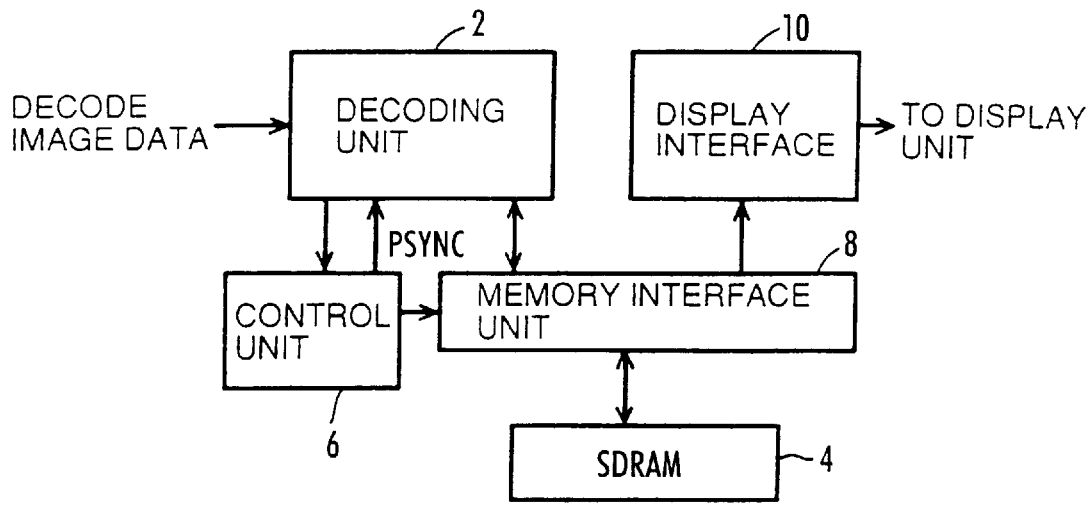
FIG. 15 schematically illustrates the overall structure of an image decoding and displaying apparatus according to the present invention.

FIG. 15 schematically illustrates the structure of an image decoding and displaying apparatus according to the present invention. Referring to FIG. 15, the image decoding and displaying apparatus includes a decoding unit 2 for receiving decoded image data supplied in the form of a bit stream and performing prescribed decoding on coded pixel data included in the decoded image data for restoring original pixel data, an SDRAM 4 serving as an external memory for storing the pixel data restored in the decoding unit 2, and a control unit 6 for controlling various operations such as decision of the operation timing of the decoding unit 2 and access operations to the SDRAM 4. The decoding unit 2 generally has a decoding function in accordance with the MPEG2 standards for decoding the coded pixel data and a function of analyzing header information indicating the properties and attributes of respective images. The control unit 6 decides the decoding start timing of the decoding unit 2 in accordance with synchronizing signals (horizontal and vertical synchronizing signals) supplied from a display control unit (not shown) provided in the exterior.

A memory interface unit 8 is arranged between the decoding unit 2 and the SDRAM 4, and a display interface 10 is arranged between the memory interface unit 8 and a display unit (not shown) provided in the exterior. The memory interface unit 8 generates data write and read addresses for the SDRAM 4 and establishes a data transmission path between the SDRAM 4 and the decoding unit 4 or between the SDRAM 4 and the display interface 10, under control by the control unit 6. The display interface 10 successively outputs pixel data supplied from the memory interface unit 8, in accordance with a display speed of the pixel data in the display unit.

Figure 16:
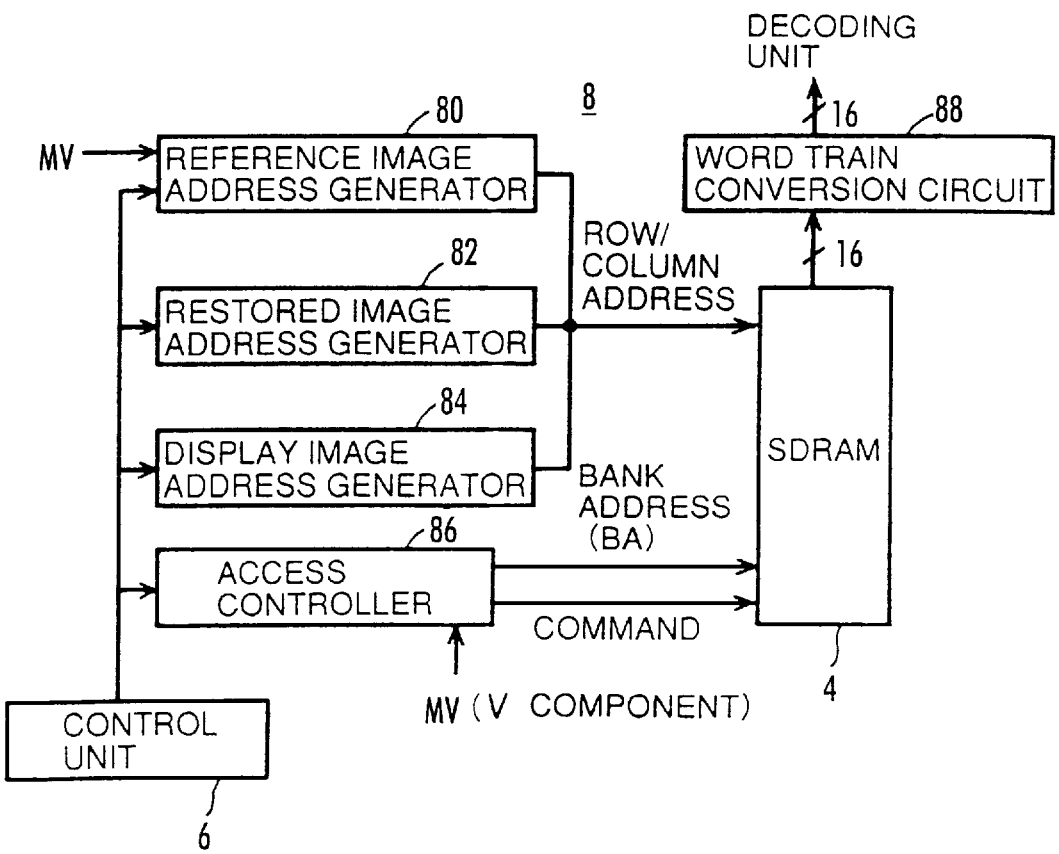
FIG. 16 schematically illustrates the structure of a memory interface shown in FIG. 15.

FIG. 16 schematically illustrates the structure of the memory interface unit 8 shown in FIG. 15. Referring to FIG. 16, the memory interface unit 8 includes a reference image address generator 80 which receives motion vector information MV supplied from the decoding unit 2 shown in FIG. 15 for generating addresses for reading pixels of a reference frame (macro block) under control by the control unit 6, a restored image address generator 82 for generating addresses for writing the pixel data (restored pixels) decoded in the decoding unit in the SDRAM 4 under control by the control unit 6, a display image address generator 84 for generating addresses for reading the pixel data from the SDRAM 4 for display on the display unit under control by the control unit 6, an access controller 86 for outputting a bank address BA and a command for the SDRAM 4 at a prescribed period under control by the control unit 6, and a word train conversion circuit 88 for converting the arrangement order of the pixel data read by the SDRAM 4 for outputting.

The control unit 6 supplies a picture synchronizing signal PSYNC for defining a frame period and deciding the pixel decoding start timing with respect to the decoding unit 2 in accordance with the horizontal and vertical synchronizing signals supplied from the display control unit (not shown). In accordance with the picture synchronizing signal PSYNC, the control unit 6 activates the address generators 80, 82 and 84 in prescribed sequences.

When the SDRAM 4 is accessed, the access controller 86 regularly outputs commands alternately to the banks A and B (included in the SDRAM 4) every five clock cycles, or at a period of 10 clock cycles for one bank. This access controller 86 decides the number of lines to be read in accordance with whether the value of a vertical component (V component) included in the motion vector information MV is an integer or a fraction (±½) and accesses the SDRAM 4 repeatedly by the decided line number in pixel data reading of the reference image block. In writing and reading of the restored image data in and from the SDRAM 4, the access controller 86 repeatedly executes the access operation such that all lines are accessed from the head pixel of each image. The control unit 6 receives frame type information indicating the type of decoding images from the decoding unit 2, and stops the reference image address generating operation of the reference image address generator 80 when the frame type information indicates an I frame. If the decoding image is a P picture or a B picture, the reference image address generator 80 generates a read address in accordance with the motion vector information MV. The control unit 6 has an arbitration function of adjusting the address generation timings of the address generators 80, 82 and 84 such that no addresses outputted from these generators conflict with each other on an address bus for the SDRAM 4. Alternatively, an arbiter may be separately provided for avoiding the confliction of access to the SDRAM 4.

The word train conversion circuit 88 rearranges word train of pixel data read from the SDRAM 4 in units of words in accordance with the arrangement order of the pixel data on the respective pixel lines, and selects necessary word data for supplying to the decoding unit 2. In this word train conversion circuit 88, word data shown as garbage in FIGS. 13A and 13B are truncated.

Figure 17:
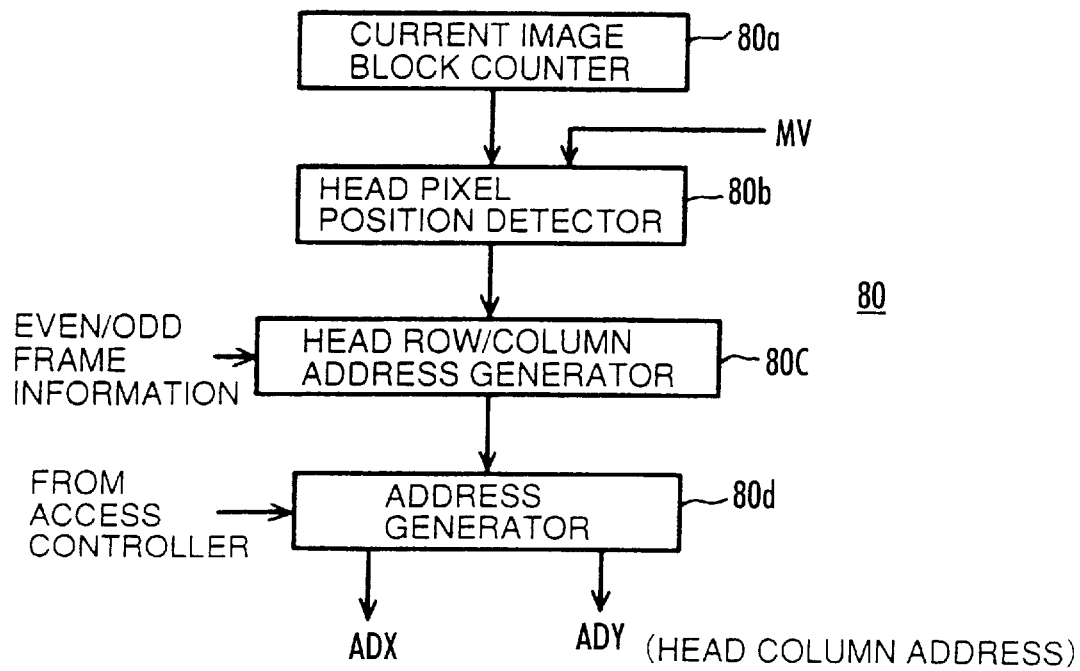
FIG. 17 schematically illustrates the structure of a reference image address generator shown in FIG. 16.

FIG. 17 schematically illustrates the structure of the reference image address generator 80 shown in FIG. 16. Referring to FIG. 17, the reference image address generator 80 includes a current image block counter 80a for storing head pixel position information as to both of luminance and color-difference signals of the current image block under decoding, a head pixel position detector 80b for detecting the head pixel positions as to both of the luminance and color-difference signals of the reference image block in accordance with the head pixel position information from the current image block counter 80a and the motion vector information MV, a head row/column address generator 80c for generating head rod and column addresses for the SDRAM as to both of the color-difference and luminance signals on the basis of head pixel position information from the head pixel position detector 80b in accordance with even/odd frame information, and an address generator 80d for generating row and column addresses ADX and ADY for the SDRAM in accordance with the head addresses from the head row/column address generator 80c under control by the access controller 86. Since the decoding is performed in units of macro blocks in each frame (image), the current image block counter 80a generates information indicating the number of the currently decoding image block by a counter, and generates head pixel position information as to the respective ones of the luminance and color-difference signals on the basis of the count value of this counter. The count value from the current image block counter 80a includes both of horizontal and vertical components.

The head pixel position detector 80b adds up the head pixel position information for the current image block supplied from the current image block counter 80a with the motion vector information MV, and detects the head pixel position of the reference block. The head row/column address generator 80c, the structure of which is described later, generates a row address from a prescribed integer (refer to FIGS. 4 and 6) and head line information supplied from the head pixel position detector 80b in accordance with whether the reference frame is an even-numbered or odd-numbered frame, and generates a column address on the basis of a head pixel number on a head pixel line. The address generator 80d repeatedly increments the head row address supplied from the head row/column address generator 80c every 10 words under control by the access controller 86. The column address ADY from the address generator 80d, which depends on the burst length of the SDRAM, is fixed to the head column address generated by the head row/column address generator 80c when the burst length is the full page.

Figure 18:
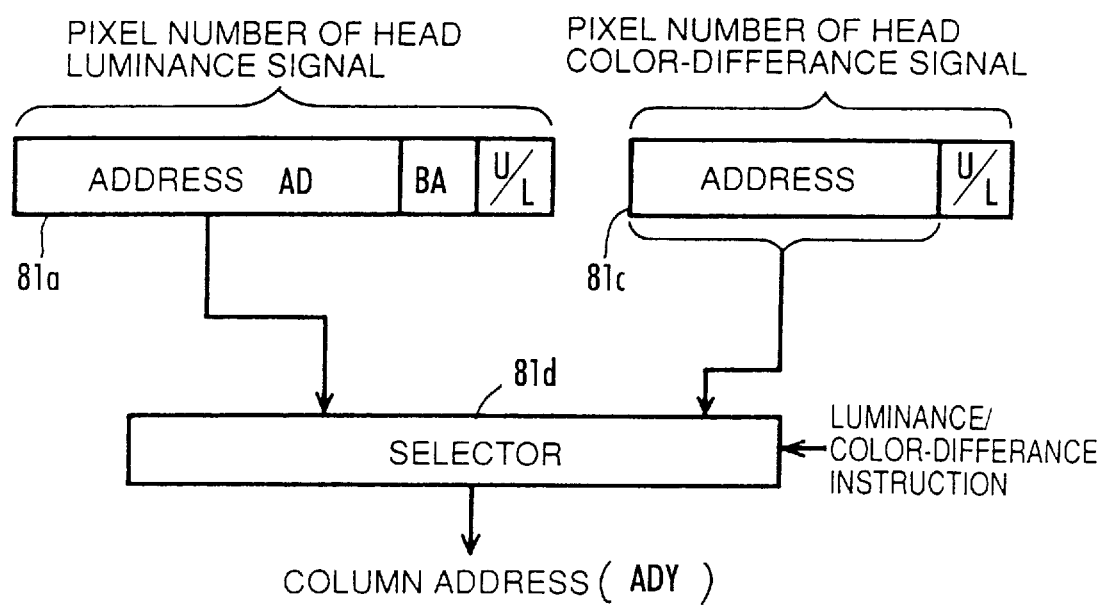
FIG. 18 schematically illustrates the structure of a column address generating part of a head row/column address generator shown in FIG. 17.

FIG. 18 schematically illustrates the structure of a column address generating part of the head row/column address generator 80c shown in FIG. 17. Referring to FIG. 18, the column address generating part includes a register 81a for storing a head luminance signal pixel number supplied from the head pixel position detector 80b, a register 81c for storing a head color-difference signal pixel number supplied from the head pixel position detector 80b, and a selector 81d for selecting one of upper bits (addresses) of the registers 81a and 81c in accordance with a luminance/color-difference instruction indicating a luminance or color-difference signal and generating the column address ADY. When the head pixel as to the luminance signal component is included in the bank B, its bank address bit BA is "1". While it is necessary to first read a word from the bank B in this case, addresses (AD) of head pixels are identical to each other in the banks A and B. A pixel data word is read from the bank A and truncated.

As to the color-difference signal component, the bits of the head color-difference signal pixel number detected by the head pixel position detector 80b are the column address. The selector 81d reads all necessary words of the luminance signal component, and then selects the color-difference signal column address for reading word information of the color-difference signal. This luminance/color-difference instruction signal is supplied from the access controller 86. The access controller 86 controls a selection path of the selector 81d for reading information of the color-difference signal after reading the luminance signal information of the necessary lines.

Figure 19:
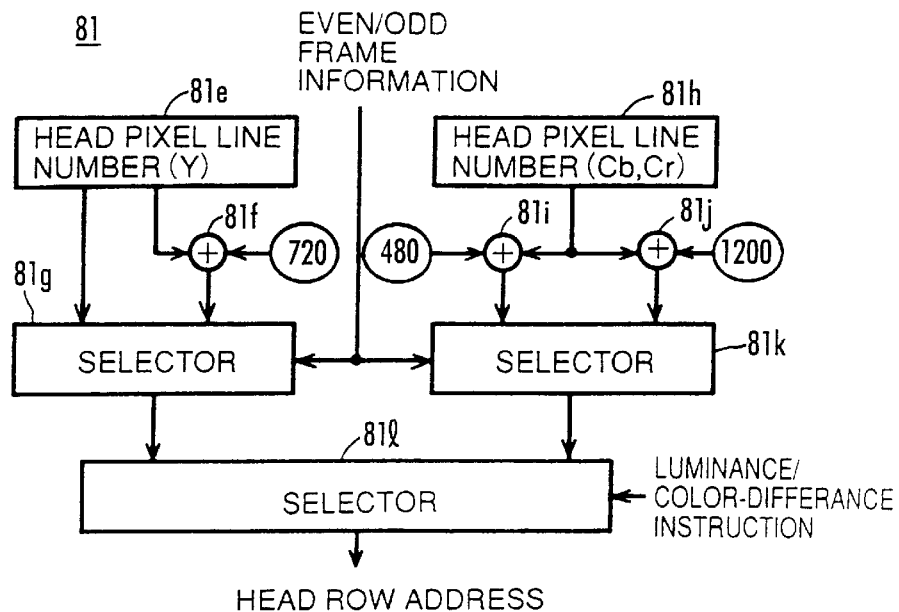
FIG. 19 schematically illustrates the structure of a row address generating part of the head row/column address generator shown in FIG. 17.

FIG. 19 schematically illustrates the structure of a head row address generating part of the head row/column address generator 80c shown in FIG. 17. Referring to FIG. 19, the head row address generating part includes a register 81e for storing the head pixel line number of the luminance signal, an adder 81f for adding up the line number information of the register 81e with a constant 720, a selector 81g for selecting one of the line number information of the register 81e and information outputted from the adder 81f in accordance with the even/odd frame information, a register 81h for storing the head pixel line number information of the color-difference signal, an adder 81i for adding up the head pixel line number information stored in the register 81h with a prescribed constant 480, an adder 81j for adding up the color-difference signal head pixel line number information stored in the register 81h with a prescribed constant "1200", a selector 81k for selecting one of output information from the adders 81i and 81j in accordance with the even/odd frame information, and a selector 81l for selecting one of output information from the selectors 81j and 81k in accordance with the luminance/color-difference instruction.

The selector 81g selects the output information of the register 81e when the odd/even frame information specifies an even-numbered frame (#0), while selecting the output information of the adder 81f when the even/odd frame information specifies an odd-numbered frame (#1). The selector 81k selects the output information of the adder 81i when the even/odd frame information indicates an even-numbered frame, while selecting the output information of the adder 81j when the even/odd frame information specifies an odd-numbered frame. The constants "480, 720 and 1200" are set by the correspondence between the row addresses of the SDRAM and the luminance and color-difference signals shown in FIG. 1. The head row addresses are outputted from the selector 81l for both the luminance and color-difference signals.

Figure 20:
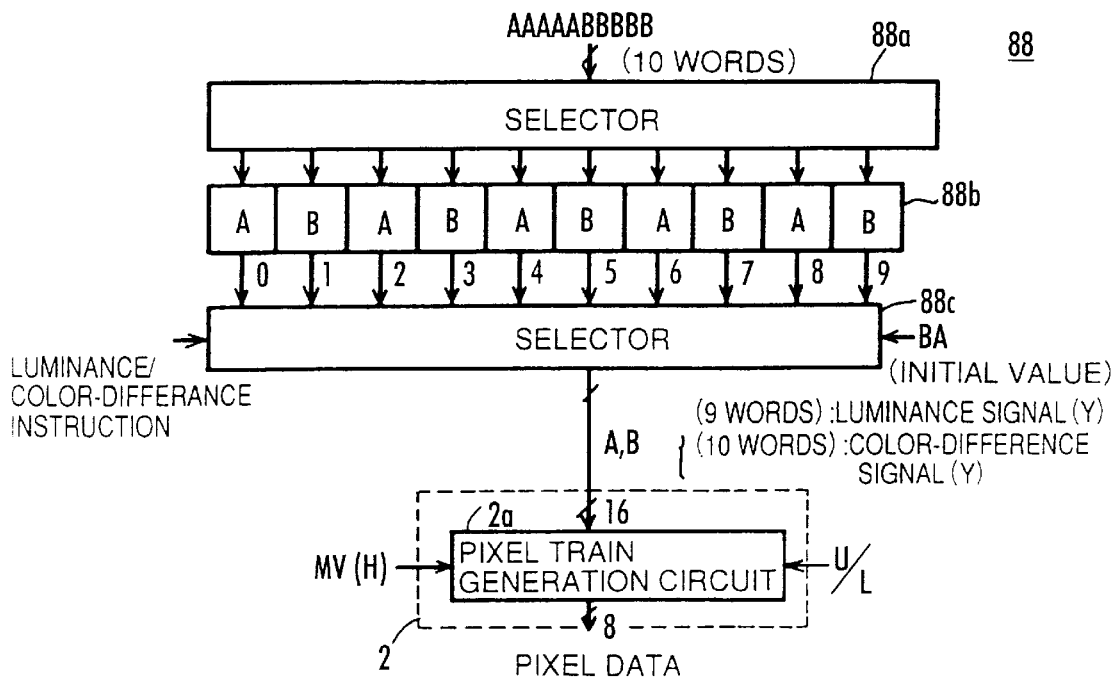
FIG. 20 schematically illustrates the structure of a word train conversion circuit shown in FIG. 16.

FIG. 20 illustrates an exemplary structure of the word train column conversion circuit 88 shown in FIG. 16. Referring to FIG. 20, the word train conversion circuit 88 includes a register 88b for receiving words read from the SDRAM through a selector 88a and successively storing the same, and a selector 88c for successively selecting and outputting the word information stored in the register 88b in accordance with the luminance/color-difference instruction signal and the bank address bit BA. The selector 88a successively stores data (A) read from the bank A in even-numbered storage positions of the register 88b for data of 10 words read from the SDRAM, and then stores data of five words read from the bank B in odd-numbered storage positions of the register 88b. The register 88c successively selects and outputs a necessary number of words of the register 88b in accordance with the storage position numbers, with the bank address bit BA serving as an initial value when the luminance/color-difference instruction signal indicates a luminance signal. When the luminance/color-difference instruction signal indicates a color-difference signal, on the other hand, the selector 88c first successively selects the data (A) of the bank. A stored in even-numbered storage positions by five words, and then successively selects data of five words supplied from the bank B.

Words (16 bits) outputted from the word train conversion circuit 88 are supplied to a pixel column generation circuit 2a included in the decoding unit 2. This pixel column generation circuit 2a detects head pixels of the supplied words in accordance with horizontal component information MV(H) of the motion vector information MV and an upper/lower instruction bit U/L included in the head pixel position information, and successively outputs 8-bit pixel data from the detected head pixels.

The garbage data shown by slanted blocks in FIGS. 13A and 13B can be eliminated by successively selecting nine luminance signal words, with the bank address signal bit BA serving as an initial value. Namely, the head pixel is included in the bank B when the bank address signal bit BA is "1" and the word of the bank A stored in an address 0 of the register 88b is a garbage word. Therefore, the garbage data can be eliminated by successively reading nine words from the information stored at an address 1.

When the bank address signal bit BA is "0" on the other hand, the head pixel is included and stored in the bank A, and in this case, the final word read from the bank B can be eliminated by successively reading nine words from the address 0. Thus, garbage pixel data can be reliably eliminated.

When the horizontal motion vector information MV(H) is an integer component, the pixel train generation circuit 2a selects 16 pixel information from the supplied words (in case of a luminance signal component: 8 words in case of a color-difference signal). When the horizontal motion vector information MV(H) has a fractional component, on the other hand, the pixel train generation circuit 2a selects nine words for the luminance signal, while selecting 10 words for the color-difference signal. It identifies the head pixel of the selected nine words (as to the luminance signal (Y)) by the upper/lower bits U/L, and successively selects and outputs 17 pixel data as to the luminance signal. As to the color-difference signal, on the other hand, it successively selects and outputs nine pixel data in accordance with the upper/lower instruction bit U/L for each of the color-difference signals Cb and Cr.

The structures shown in FIGS. 17 to 19 can be utilized for the restored image address generator 82 shown in FIG. 16. In writing of restored image data in the SDRAM, there are 16 lines for the luminance signal and eight lines for the color-difference signal, and values of the row addresses ADX counted up by the address generator (refer to the address generator 80d in FIG. 17) are fixed for the luminance and color-difference signals respectively. In order to rearrange the restored pixel data in units of words, the structure of the word train conversion circuit 88 shown in FIG. 20 can be utilized. Namely, restored 8-bit pixel data are converted to 16-bit words and successively stored in the register 88b through the selector 88c, and the pixel data are read in units of banks. The restored image data must be alternately written in the banks A and B in a unit of four words for the luminance signal. In this case, words regarded as unnecessary in data writing in the SDRAM may be masked for inhibition of writing. While pixel data are written in a unit of four words for the color-difference signal, the banks A and B may be alternately accessed in a unit of five words in this case and one word is masked for inhibition of data writing. A masking instruction signal for such masking can be externally supplied in synchronization with the clock signal independently of the commands, resulting in no collision of the commands. When such masking is employed, therefore, it is possible to maintain the access sequence of alternately accessing the banks A and B in a unit of five words in restored image writing and reference image reading.

In case of such a structure that blocks of pixel data of the color-difference signals Cb and Cr are supplied in the decoding unit 2 independently of each other in writing of a restored image, a buffer memory is employed. The pixel data of the color-difference signals Cb and Cr are alternately read in a unit of two pixel data. This is equivalent to such case that decoded pixels of the color-difference signals Cb and Cr are alternately generated in a unit of a single pixel in the decoding unit 2, whereby color-difference signal pixel data in a unit of five words can be generated in accordance with a sequence similar to that for the luminance signal.

Figure 21A:
FIGS. 21A and 21B schematically illustrate the structures of a column address generating part and a row address generating part of a display image address generator shown in FIG. 16 respectively.
Figure 21B:
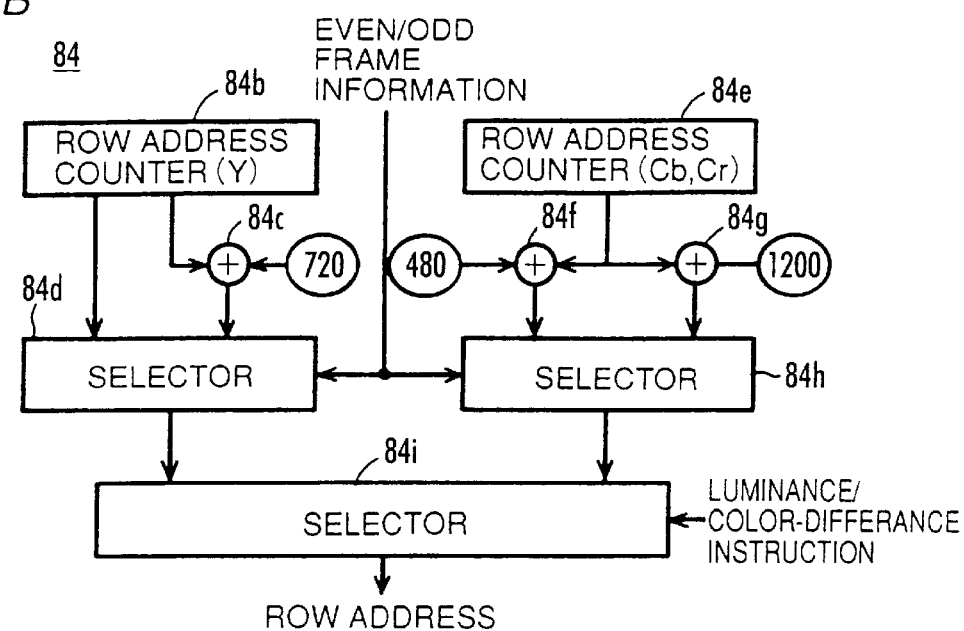

FIGS. 21A and 21B schematically illustrate the structure of the display image address generator 84 shown in FIG. 16. These figures illustrate the structures of column and row address generating parts for display image addresses respectively. Referring to FIG. 21A, the display image address generation circuit 84 includes a column address counter 84a performing a count operation in accordance with a countup signal supplied from the access controller 86. This column address counter 84a counts up its count value by 5 every time 10 words are read from the SDRAM.

Referring to FIG. 21B, the row address generating part includes a row address counter 84b for generating row addresses for the luminance signal, an adder 84c for adding up an outputted count value of the row address counter 84b with the constant "720", a selector 84d for selecting one of the count value outputted from the row address counter 80b and a count value outputted from the adder 84c in accordance with the even/odd frame information, a row address counter 84e for generating row addresses for the color-difference signal, an adder 84f for adding up an output count of the row address counter 84e with the constant "480" an adder 84g for adding up the output count value of the row address counter 84e with the constant "1200", a selector 84h for selecting one of outputs of the adders 84f and 84g in accordance with the even/odd frame information, and a selector 84i for selecting one of outputs of the selectors 84d and 84h in accordance with the luminance/color-difference instruction signal.

Under control by the access controller 86, the row address counter 84b increments its count value by 1 every time 360 words are read. The row address counter 84e also increments its count value by 1 every time 180 words are read from the SDRAM. The selector 84d selects the output count of the row address counter 84b when a read display image is an even-numbered frame, while selecting the output of the adder 84c when the display image is an odd-numbered frame. The selector 84h selects the output of the adder 84f in case of an even-numbered frame, while selecting the output of the adder 84g in case of an odd-numbered frame. The selector 84i selects the output of the selector 84d when luminance signal pixel data are read, while selecting the output of the selector 84h when color-difference signal pixel data are read. Thus, row and column addresses can be generated in display pixel data reading from the SDRAM.

In case of such a structure that the column address counter 84a is reset when the same reads out prescribed numbers of pixels of the luminance and color-difference signals for display under control by the access controller 86 (720 pixels (360 words) in case of luminance signal pixel data and 360 pixels (180 words) in case of the color-difference signal), the row address counters 84b and 84e may be a common row address counter, in which case the count value of the common row address counter is incremented by one every resetting of the column address counter 84a (return to the initial value).

Figure 22:
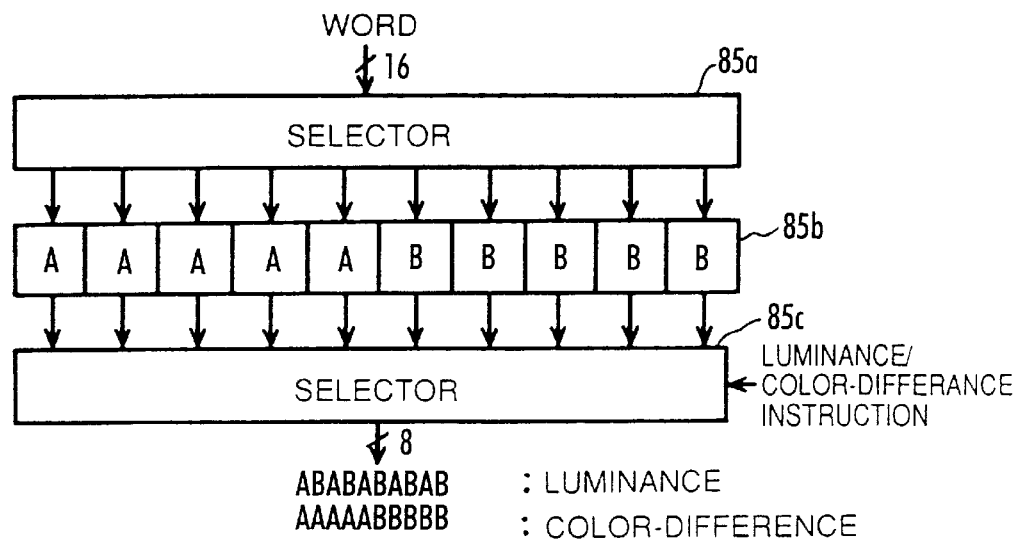
FIG. 22 schematically illustrates the structure of the word train conversion circuit in display image pixel data reading.

FIG. 22 illustrates the structure of a pixel train converting part for the display interface 10 shown in FIG. 15. This pixel train converting part may be included in the display interface 10, or the memory interface unit 8. The pixel train converting part includes a register 85b for successively storing data of 10 words read from the SDRAM through a selector 85a, and a selector 85c for converting the word data stored in the register 85b to byte data and successively selecting the byte data in a prescribed sequence. The selector 85a successively stores display image pixel data words read from the SDRAM starting from the head storage position of the register 85b. The selector 85c alternately selects and reads words of the banks A and B from the register 85b, and then converts the 16-bit word data to 8-bit pixel data for outputting when the display image data are those of the luminance signal.

In case of pixel data of the color-difference signal, on the other hand, the selector 85c successively selects the word data stored in the register 85b in accordance with the storage positions of the register 85b. Thus, the color-difference signal data are in the same order as the words read from the SDRAM. In this case, the color-difference signal Cb can be generated with a delay of one line to the color-difference signal Cr, by passing pixel data from the color-difference signal Cb (bank B) through a 1-line delay. Alignment of the pixel data is performed in the display interface 10 shown in FIG. 15. Also in this case, the pixel data are merely alternately read from the banks A and B in a unit of five word. Conversion of arrangement of a pixel data train is executed in the exterior of the SDRAM.

The pixel train conversion circuit shown in FIGS. 20 and 22 stores pixel data of 10 words. In this case, storage of read data from the SDRAM and pixel data reading. from the pixel train conversion circuit can be simultaneously executed when two pixel train conversion circuits shown in FIGS. 20 and 22 are provided in parallel with each other and these pixel train conversion circuits are alternately accessed.

According to the embodiment 1 of the present invention, as hereinabove described, pixel data are formed by adjacent two pixels as one word to be alternately arranged in the banks A and B in units of words for the luminance signal and stored in different banks for different types of the color-difference signals for the two types of color-difference signals, whereby access can be made in the same access sequence (in a unit of five word) in pixel data write and read operations in and from the SDRAM, overhead in page change can be suppressed to the minimum and data transfer can be executed at a high speed.

Embodiment 2

Figure 23A:
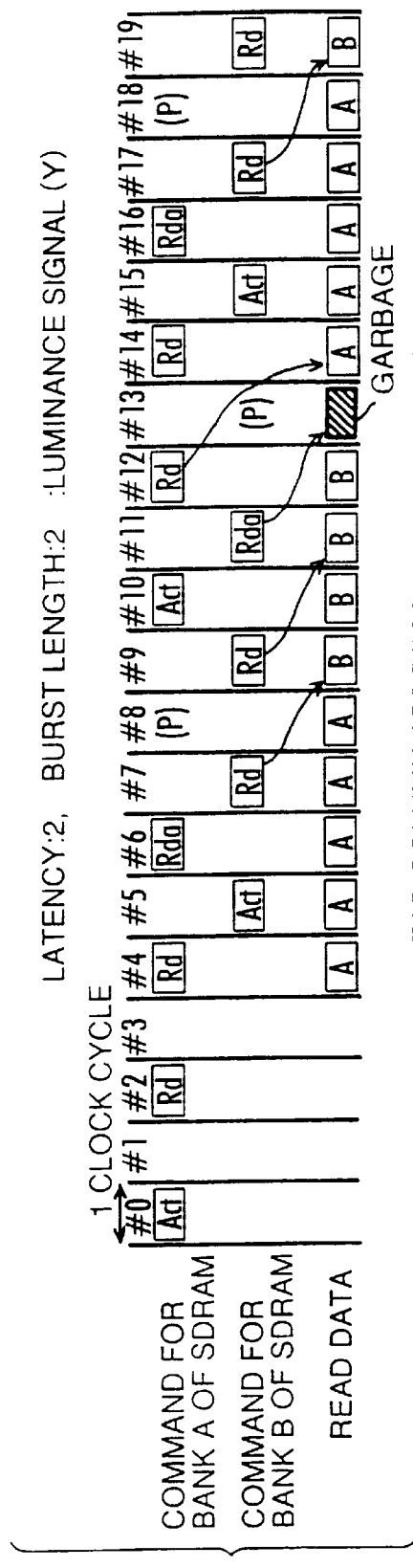
FIGS. 23A and 23B illustrate reference image block pixel data reading sequences from an SDRAM in an embodiment 2 of the present invention.
Figure 23B:
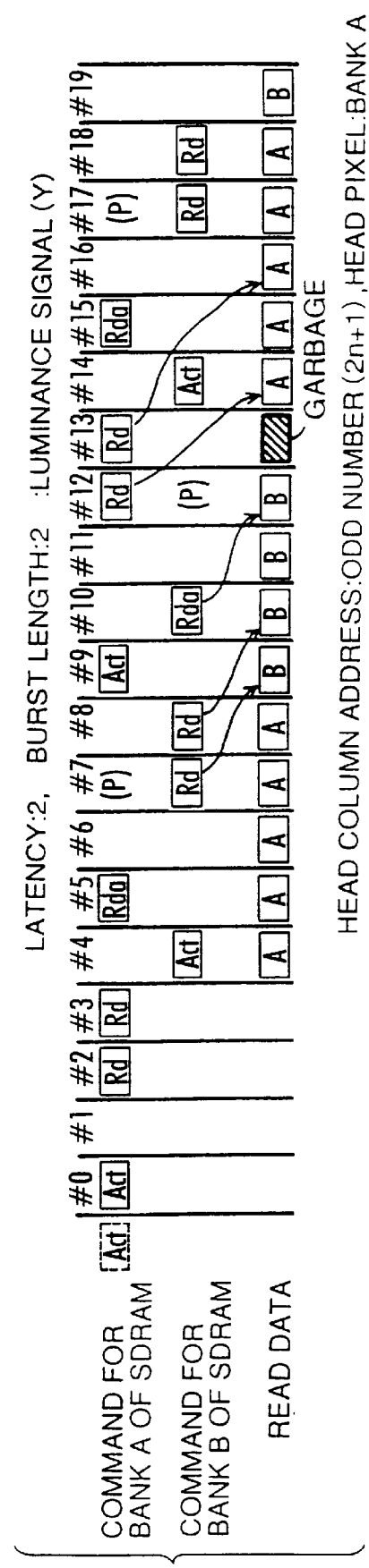

FIGS. 23A and 23B illustrate reference image block reading operation sequences of an SDRAM according to an embodiment 2 of the present invention. Referring to FIGS. 23A and 23B, sequences for reading luminance signal pixel data are illustrated. In this embodiment 2, the SDRAM is set at a latency of 2 and a burst length of 2. When the burst length is 2, column addresses, n, and n+1 are specified by one read command. The reading operation is now described.

FIG. 23A shows the reference block image data reading operation sequence in such a case that the head column address of a reference image block is an even number and the head pixel is included in a bank A. An active command Act is supplied for the bank A at a clock cycle #0, and a page is selected in the bank A (in accordance with a row address).

Then, a read command Rd for the bank A is supplied at a clock cycle #2. The latency is 2, and hence pixel data of two words are successively read from a clock cycle #4 in units of words in accordance with the read command Rd supplied at the clock cycle #2. The burst length is 2, and hence only two words are specified by the read command Rd. Therefore, a read command Rd is supplied for the bank A again at the clock cycle #4, for specifying the next two words. Thus, pixel data of two words specified by the read command Rd are successively read from a clock cycle #6 in units of words.

An active command Act is supplied for a bank B at a clock cycle #5, for starting a page selecting operation for the bank B. At the clock cycle #6, an auto precharge read command Rda is supplied for the bank A. This auto precharge read command Rd instructs an operation of returning a specified bank to a precharged state after words of the burst length specified by the read command are read. When the auto precharge read command Rda is supplied at the clock cycle #6, therefore, this is equivalent to such an operation that a precharge command Pre is supplied at a clock cycle #8 after a lapse of the burst length, i.e., two clock cycles. A read command Rd is supplied for the bank B at a clock cycle #7. In accordance with this read command Rd, pixel data of two words are successively read from the bank B in units of words from a clock cycle #9. Then, a read command Rd is supplied for the bank B at the clock cycle #9, and the next pixel data of two words are read from a clock cycle #11. Then, an auto precharge read command Rda is supplied for the bank B at the clock cycle #11.

An active command Act is supplied for the bank A at a clock cycle #10, for selecting the next page (page change). Then, a read command Rd is supplied for the bank A at a clock cycle #12. In accordance with this read command Rd, pixel data of two words are successively read from the bank A from a clock cycle #14. Then, a read command Rd is supplied for the bank A at the clock cycle #14, for specifying and successively reading the next pixel data of two words. Due to the auto precharge read command Rda, the operation is equivalent to such an operation that a precharge command is supplied for the bank A at a clock cycle #18, whereby the bank A returns to a precharged state, in preparation for page change.

In the bank B, an active command Act is supplied at a clock cycle #15 for selecting the next page (the same page as the bank A), and read commands Rd are supplied at clock cycles #17 and #19 respectively for successively reading pixel data of two words.

Pixel data read at a clock cycle #13 are truncated in the aforementioned pixel train conversion circuit shown in FIG. 20.

In the reference block pixel data reading sequence shown in FIG. 23A, the active commands Act are alternately supplied to the banks A and B every five clock cycles. The sequence of supplying the read commands Rd and the auto precharge commands Rda to the banks A and B is also identical to this alternate application.

FIG. 23B illustrates a luminance signal pixel data reading sequence of the reference image block in such case that the head column address is an odd number. The head pixel is included in the bank A. An active command Act is supplied for the bank A at a clock cycle #0, for selecting a page specified by a row address in the bank A. A read command Rd is supplied for the bank A at a clock cycle #2. Thus, pixel data words are successively read from the bank A from a clock cycle #4. At this time, a read command Rd is supplied for the bank A again at a clock cycle #3. Due to the read command Rd supplied at the clock cycle #3, data words specified in accordance with the subsequently supplied read command Rd (clock cycle #3) are read from a clock cycle #5.

An auto precharge read command Rda is supplied for the bank A at the clock cycle #5. Thus, pixel data of two words specified by the auto precharge read command Rda are successively read from a clock cycle #7. Since a precharge command is equivalently supplied to the bank A at the clock cycle #7, the bank A enters a precharged state, in preparation for the next page change.

An active command Act is supplied for the bank B at the clock cycle #4, for selecting a page. Then, a read command Rd is supplied for the bank B at the clock cycle #7, and then a read command Rd is supplied at a clock cycle #8 again. Pixel data words read from the bank B at the clock cycle #9 are specified by the read command Rd supplied at the clock cycle #7, while pixel data of two words read from a clock cycle #10 are specified by the read command Rd at the clock cycle #8. An auto precharge read command Rda is supplied for the bank B at the clock cycle #10, so that pixel data of two words specified by this auto precharge read command Rda are successively read from the bank B from a clock cycle #12.

In the bank A, a page is selected in accordance with the active command Act supplied at the clock cycle #9, read commands Rd are supplied at the clock cycles #12 and #13 respectively, pixel data words are read from a clock cycle #14, and an auto precharge read command Rda is supplied at a clock cycle #15. In parallel with this reading operation, an active command Act is supplied for the bank B at a clock cycle #14, and read commands Rd are supplied to the bank B at clock cycles #17 and #18 respectively.

Even when the head column address is an odd number, access sequences to the banks A and B are identical to each other. Particularly when an active command Act for the bank A is supplied in a cycle precedent to the clock cycle #0 as shown by broken lines in FIG. 23B, the active commands Act are supplied to the banks A and B every five clock cycles-and the same sequences as the case of the even-numbered head column address shown in FIG. 23A can be maintained. The difference merely resides in a point that the read command Rd supplied for the bank A first is delayed by one clock cycle as compared with the case of the even number of the head column address, and a similar operation sequence can be implemented.

When a precharge command Pre is employed, there occurs such a situation that the precharge command for the bank A and a read command Rd for the bank B are supplied at the same clock cycle. The SDRAM can supply a command for only one bank at one clock cycle. Such confliction of commands can be prevented by utilizing the auto precharge read command Rda, thereby implementing efficient data reading.

When the active command Act is supplied at the clock cycle precedent to the clock cycle #0 as shown in FIG. 23B, all access sequences for the SDRAM can be equaled to each other although reading of the head pixel of the reference image block is delayed by one clock cycle.

Figure 24A:
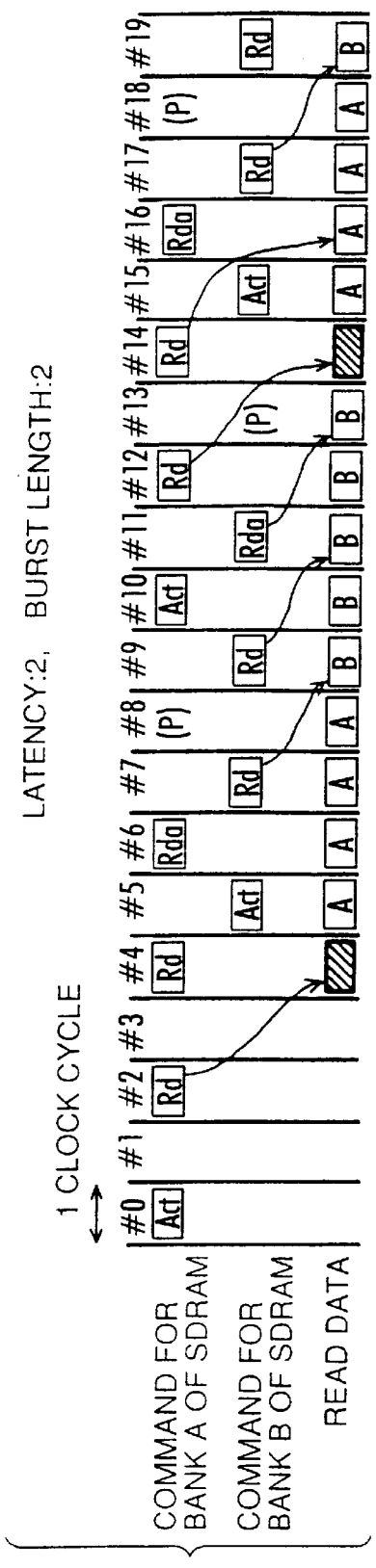
FIGS. 24A and 24B illustrate reference image block pixel data reading sequences in the embodiment 2 of the present invention.

FIG. 24A illustrates a luminance signal pixel data reading sequence of a reference image block from the SDRAM in such a case that the head column address is an even number and the head pixel is included in the bank B. Also in FIG. 24A, the SDRAM has a latency of 2, and its burst length is set at 2.

An active command Act is supplied for the bank A at a clock cycle #0, and then a read command Rd is supplied for the bank A at a clock cycle #2. Pixel data of two words are successively read from the bank A from a clock cycle #4. A read command Rd is supplied for the bank A again at the clock cycle #4, for specifying the next pixel data of two words. An active command Act is supplied for the bank B at a clock cycle #5, and then a read command Rd is supplied for the bank B at a clock cycle #7.

At a clock cycle #6, an auto precharge read command Rda is supplied for the bank A. Therefore, pixel data words from the bank B are successively outputted from a clock cycle #9. At a clock cycle #8, the bank A enters a precharged state. A read command Rd is supplied for the bank B again at the clock cycle #9, for specifying the next pixel data of two words.

An active command Act is supplied for the bank A at a clock cycle #10, for selecting the next page in the bank A. At a clock cycle #11, an auto precharge read command Rda is supplied for the bank B for specifying the next pixel data of two words, while specifying precharge of the bank B after reading of pixel data of two words. A read command Rd is supplied for the bank A at a clock cycle #12, and pixel data words from the bank A are successively read from a clock cycle #14. The pixel data words read from the bank A at the clock cycle #14 are truncated as unnecessary in the word train conversion circuit provided in the exterior. A read command Rd is supplied for the bank A again at the clock cycle #14. Further, an auto precharge read command Rda is supplied for the bank A at a clock cycle #16. In the bank B, an active command Act is supplied at the clock cycle #15 for selecting the next page. A read command Rd is supplied at a clock cycle #17, so that pixel data words from the bank B are read from a clock cycle #19 in accordance with this read command Rd.

A read command Rd is supplied for the bank B again at a clock cycle #18.

Pixel data words specified by the read command Rd supplied for the bank A first are rendered unnecessary in the exterior. Five words are read alternately from the banks A and B and a garbage word is disposed in the exterior, whereby four words and five words can be alternately read from the banks A and B.

Figure 24B:
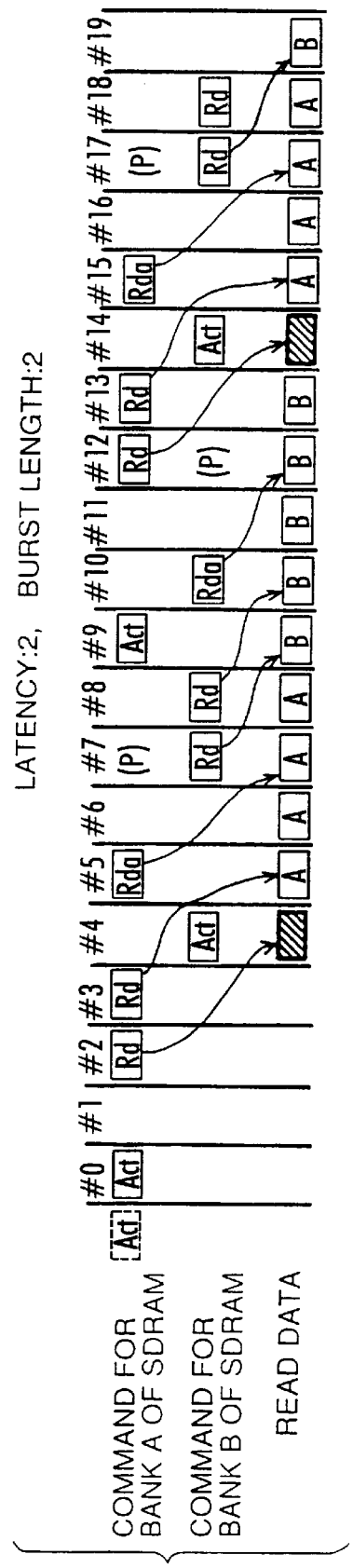

FIG. 24B illustrates a data reading sequence in such a case that the head column address is an odd number and the head pixel is included in the bank B. Referring to FIG. 24, an active command Act is supplied for the bank A at a clock cycle #0, and then read commands Rd are supplied for the bank A at clock cycles #2 and #3 respectively. Pixel data of two words are successively read from a clock cycle #4 in accordance with the read command Rd supplied at the clock cycle #3. A pixel data word specified by the read command Rd supplied at the clock cycle #2 is disposed as unnecessary in the exterior.

An auto precharge read command Rda is supplied for the bank A at a clock cycle #5, and pixel data of two words are successively read from the bank B from a clock cycle #7.

An active command Act is supplied for the bank B at the clock cycle #4 for selecting a page, and read commands Rd are supplied for the bank B at clock cycles #7 and #8 respectively. Thus, pixel data words from the bank B are successively read from a clock cycle #9. Also in this case, the last word of the pixel data of two words specified by the read command Rd supplied at the clock cycle #7 is not read but the pixel data words are read in accordance with the read command Rd supplied at the clock cycle #8. An auto precharge read command Rda is supplied for the bank B at a clock cycle #10, and the remaining pixel data of two words are successively read from the bank B from a clock cycle #12.

An active command Act is supplied for the bank A again at the clock cycle #9, for selection of the next page. Then, read commands Rd are supplied for the bank A at the clock cycles #12 and #13 respectively, and pixel data words are successively read from a clock cycle #14. Also in this case, a pixel data word specified by the read command Rd supplied at the clock cycle #12 is disposed as unnecessary by the externally provided circuit. At a clock cycle #15, an auto precharge read command Rda is supplied for the bank A for reading the remaining pixel data of two words. An active command Act is supplied for the bank B at a clock cycle #14, and read commands Rd are supplied to the bank B at clock cycles #17 and #18 respectively. Thus, the pixel data from the bank B are successively read from the clock cycle #19.

Also in the data reading sequence shown in FIG. 24B, pixel data of the head word read from the bank are rendered unnecessary in the exterior. Therefore, the reading sequence is identical to that shown in FIG. 24A, except for the manner of supplying the commands. In the operation sequence shown in FIG. 24B, an active command Act for the bank A may be supplied at a clock cycle precedent to the clock cycle #0 as shown by broken lines. In this case, command application sequences are entirely identical to each other for the bank A and for the bank B. However, reading of the fixed pixel data from supply of the active command Act is delayed by one cycle.

Also in the reading sequences shown in FIGS. 24A and 24B, five pixel data words can be successively read alternately from the banks A and B. When the head column address is an even number, necessary reference image clock pixel data can be read in the same operation sequence regardless of whether the head pixel is included in the bank A or the bank B (refer to FIGS. 23A and 24A). Also When the head pixel is an odd number, necessary reference image clock pixel data can be read in the same operation sequence regardless of whether the head pixel is included in the bank A or the bank B (refer to FIGS. 23B and 24B). Thus, the necessary pixel data can be read in the same sequence, whereby the control is simplified.

Figure 25A:
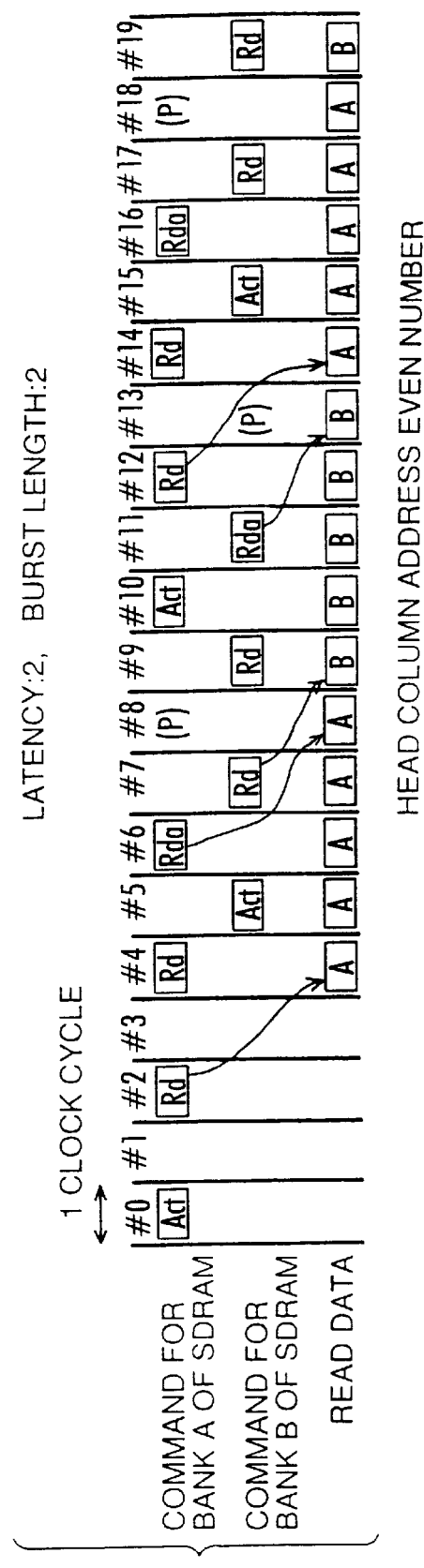
FIGS. 25A and 25B illustrate color-difference signal reference image block pixel data reading sequences in the embodiment 2 of the present invention.
Figure 25B:
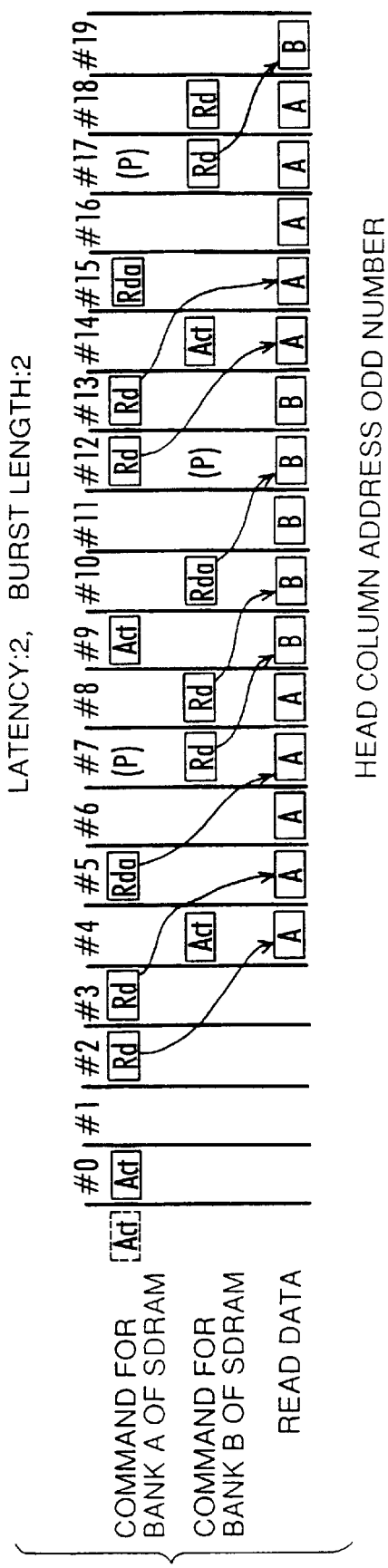

FIGS. 25A and 25B illustrate sequences in case of reading color-difference signal pixel data words from the SDRAM. Also in FIGS. 25A and 25B, the SDRAM has a latency of 2, and its burst length is set at 2. With reference to FIG. 25A, a reading sequence for the color-difference signal pixel data words in case of an even-numbered head column address is described.

An active command Act is supplied for the bank A at a clock cycle #0, and read commands Rd are supplied for the bank A at clock cycles #2 and #4 respectively. Thus, pixel data words are successively read from the clock cycle #4. At a clock cycle #5, an active command Act is supplied for the bank B, for selecting a page. An auto precharge read command Rda is supplied for the bank A at a clock cycle #6.

Then, a read command Rd is supplied for the bank B at a clock cycle #7. Pixel data words are read from a clock cycle #8 in accordance with the auto precharge read command Rda, while pixel data words are read from the bank B, starting at a clock cycle #9 in accordance with the read command Rd supplied at the clock cycle #7. Thus, pixel data of five words are continuously read from the bank A. Then, a read command Rd is supplied for the bank B at a clock cycle #9, and an auto precharge read command Rda is supplied for the bank B at a clock cycle #11. An active command Act is supplied for the bank A at a clock cycle #10, for selecting the next page.

A read command Rd is supplied for the bank A at a clock cycle #12. Thus, pixel data words from the bank A are successively read from a clock cycle #14. A read command Rd is supplied for the bank A at the clock cycle #14, and an auto precharge read command Rda is supplied for the bank A at a clock cycle #16. An active command Act is supplied for the bank B at a clock cycle #15, and read commands Rd are supplied for the bank B at clock cycles #17 and #19 respectively. Thus, pixel data words from the bank B are read from a clock cycle #19 successively by five words.

When the head column address is an even number, the pixel data words are alternately read from the banks A and B in a unit of five words. This reading sequence for the color-difference signal pixel data is identical to the luminance signal pixel data reading sequences shown in FIGS. 23A and 24A. When the head column address is an even number, therefore, the access sequences for the SDRAM can be made identical as to luminance and color-difference signals to each other.

With reference to FIG. 25B, a reading sequence in such a case that the head column address of color-difference signal pixel data is an odd number is described. An active command Act is supplied for the bank A at a clock cycle #0, and then read commands Rd are supplied for the bank A at clock cycles #2 and #3 respectively. A pixel data word specified by the read command Rd supplied at the clock cycle #2 is read at a clock cycle #4, and then a pixel data word specified by the read command Rd supplied at the clock cycle #3 is read from a clock cycle #5.

Then, an auto precharge read command Rda is supplied for the bank A at the clock cycle #5. Thus, the remaining pixel data of two words are successively read from a clock cycle #7. On the other hand, an active command Act is supplied for the bank B at the clock cycle #4, for selecting the page of the bank B. Then, a read command Rd is supplied for the bank B at the clock cycle #7, and the pixel data words from the bank B are read from the clock cycle #9. Then, a read command Rd is supplied for the bank B at a clock cycle #8, whereby pixel data words selected in accordance with the read command Rd supplied at the clock cycle #8 are successively read from a clock cycle #10. An auto precharge read command Rda is supplied for the bank B at the clock cycle #10. Thus, pixel data of four words are successively read from a clock cycle #12.

On the other hand, an active command Act is supplied for the bank A at the clock cycle #9, for selecting the next page. Read commands Rd are supplied for the bank A at clock cycles #12 and #13 respectively, for successively reading pixel data of three words. Then, an auto precharge read command Rda is supplied for the bank A at a clock cycle #15, for successively reading the remaining pixel data of two words from a clock cycle #17.

An active command Act is supplied for the bank B at the clock cycle #14 for selecting the next page, and then read commands Rd are supplied for the bank at clock cycles #17 and #18.

When the head column address is an odd number, necessary pixel data of five words can be read by continuously supplying read commands Rd to the banks A and B. In the reading operation sequence shown in FIG. 25B, an active command Act for the bank A may be supplied at a clock cycle precedent to the clock cycle #0 as shown by broken lines. The operation sequence shown in FIG. 25B is identical to those shown in FIGS. 23B and 24B, and hence necessary pixel data can be read from the SDRAM in the same access sequences for luminance signals and for color-difference signals also when the head column address is an odd number.

Also in the embodiment 2, although the access sequence depends on whether the head column address is an even or odd, necessary pixel data can be read from the SDRAM in the same access sequence for both luminance signals and color-difference signals no overhead for page change is caused, and the pixel data words can be continuously read.

Figure 26:
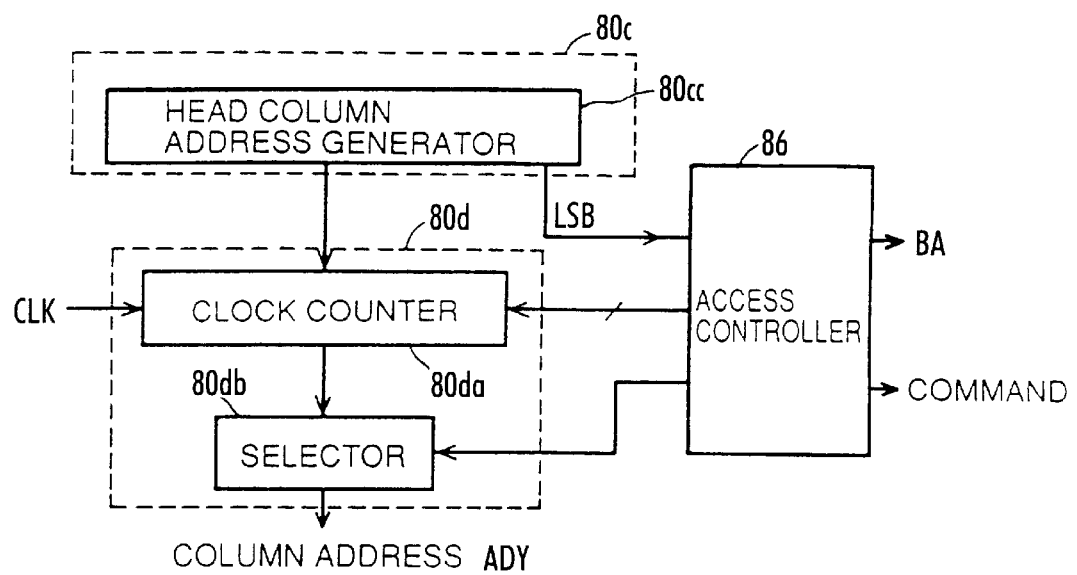
FIG. 26 schematically illustrates the structure of a column address generating part of a reference image address generator employed in the embodiment 2 of the present invention.

FIG. 26 illustrates the structure of a column address generating part in the reference block image reading. The structure of a reference image address generator according to the embodiment 2 is identical to the structure shown in FIG. 17 for row addresses. The values of the row addresses are incremented by 1 by an address generator every time 10 words are read. Thus, the same structure can be utilized, so that necessary row addresses can be generated under control by the access controller 86 shown in FIG. 16.

Referring to FIG. 26, the column address generating part includes a column address generator 80*d* for receiving a head column address from a head column address generator 80*cc* which is included in the head row/column address generator 80*c* shown in FIG. 17 and generating a column address ADY. This column address generator 80*d* includes a clock counter 80*da* for counting a clock signal CLK with the head column address from the head column address generator 80*cc* as the initial address, and a selector 80*db* for outputting the count value of the clock counter 80*da* as a column address under control by the access controller 86.

The clock counter 80*da* is started, when a read command is supplied, for counting the clock signal CLK under control by the access controller 86. This clock signal CLK defines an access cycle. The access controller 86 resets the count value of the clock counter 80*da* at the initial value when an auto precharge read command is outputted. The selector 80*db* selects and outputs the count value of the clock counter 80*da* when a read command or an auto precharge read command is supplied from the access controller 86.

The clock counter 80*da* counts the clock signal CLK. When the head column address is even, the clock counter 80*da* is incremented by 2 every time the read command or the auto precharge command is supplied, and hence a column address ADY incremented by 2 in accordance with each read command or each auto precharge command is outputted from the selector 80*db*. When the head column address is odd, on the other hand, the access controller 86 first continuously supplies read commands. At this time, the count value of the clock counter 80*da* is merely incremented by 1. When the read commands are continuously supplied, therefore, the selector 80*db* outputs continuous column address values as column addresses ADY. Necessary pixel data words can be regularly read from the same head address in case of alternately accessing the banks A and B by resetting the count value of the clock counter 80*da* at the initial value when the access controller 86 outputs an auto precharge read command.

The arrangement order of the read pixel data words is identical to that in the embodiment 1, and hence a structure for converting the arrangement order of the pixel data words similar to that of the embodiment 1 can be utilized.

According to the embodiment 2 of the present invention, as hereinabove described, the pixel data words are alternately read from the SDRAM in a unit of five words also when the SDRAM having a latency of 2 and a burst length of 2 is employed, whereby necessary pixel data words can be continuously read, resulting in efficient data transfer.

In display image data reading and decoded image data writing, the head column addresses are even-numbered addresses and hence access is made from head positions of images in these operations, whereby necessary addresses are generated in accordance with the access sequences. Also in this case, the column address may be incremented by two in accordance with read commands while row addresses may be incremented by one when all necessary data words (data words of one page) are read similarly to the embodiment 1, whereby a structure similar to that of the embodiment 1 can be utilized.

Embodiment 3

FIGS. 27A and 27B illustrate data arrangement modes according to an embodiment 3 of the present invention. In an image decoding and displaying apparatus, coded pixel data are transferred to a decoding unit. The coded image data, which are called a bit stream, include compressed data of images and attribute information of the images. In general, a bit stream has a hierarchical structure of a plurality of layers in the MPEG2 standards, and each layer includes information indicating the head and the attribute of the layer. Sound data are also supplied similarly. Input/output order (writing and reading) of these coded image data (bit stream) is fixed. Such data other than restored image data are also arranged in an SDRAM.

Referring to FIG. 27A, a data train Data#0, . . . is stored in the SDRAM in an access unit of eight words, assuming that each word is formed by 16 bits. As shown in FIG. 27B, data Data#0 to Data#3 of four words are stored in a bank A among data Data#0 to Data#7 of eight words, while the remaining data Data#4 to Data#7 of four words are stored in a bank B. The address structure of these data words is identical to that shown in FIG. 4. Data reading operations of FIGS. 27A and 27B are now described with reference to a sequence diagram shown in FIG. 28. The SDRAM has a latency of 2, and its burst length is set at 4. In the SDRAM, the burst length can be set at an arbitrary value by a command from the exterior.

An active command Act is supplied for the bank A at a clock cycle #0, and an auto precharge read command Rda is supplied for the bank A at a clock cycle #2. The data Data#0 to Data#3 are successively read from the bank A from a clock cycle #4. An active command Act is supplied for the bank B at the clock cycle #4, and an auto precharge command Rda is supplied for the bank B at a clock cycle #6. Thus, the data words Data#4 to Data#7 from the bank B are successively outputted from a clock cycle #8. Then, an active command Act is supplied for the bank A at the clock cycle #8, and an auto precharge command Rda is supplied at a clock cycle #10. Then, four data words from the bank A are successively outputted from the clock cycle #12.

Then, an active command Act is supplied for the bank B at the clock cycle #12, and an auto precharge read command Rda is supplied for the bank B at a clock cycle #14. Thus, four data words are successively read from the bank B from a clock cycle #16. An active command Act is supplied for the bank A at the clock cycle #16, and an auto precharge read command Rda is supplied for the bank A at a clock cycle #18.

With respect to the SDRAM having a burst length of 4 and a latency of 2, data words can be continuously read from the banks A and B in a unit of four words by assuming that clock cycles for the active and read commands each are two clock cycles and alternately supplying these commands to the banks A and B at four clock cycle periods. The data are alternately read from the banks A and B also in case of this data reading sequence. Therefore, this access sequence is identical to that for image data (restored image data). Therefore, the data Data are alternately read from the banks A and B, the bank A is activated in reading of other data (Data) from the bank B in preparation for reading image data, and image data can be successively read from the bank A by a necessary number after completion of reading of necessary word data Data. The bank A is selected for reading other data words Data during image data reading from the bank B, and necessary word data are outputted from the bank A after completion of image data reading from the bank B. Therefore, the reading sequence of the restored image data and the necessary data words Data can be selectively accessed by alternately switching the banks A and B, thereby implementing efficient data transfer.

Modification

Figure 29A:
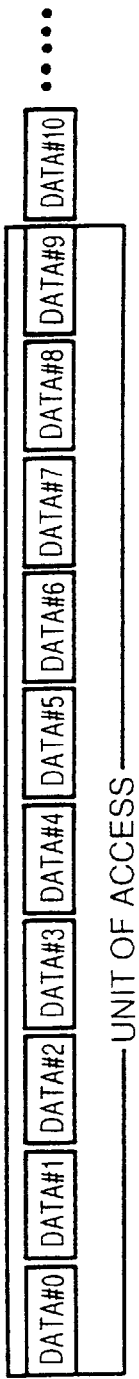
FIG. 29A illustrates an access unit in data arrangement of a modification of the embodiment 3 of the present invention.
Figure 29B:
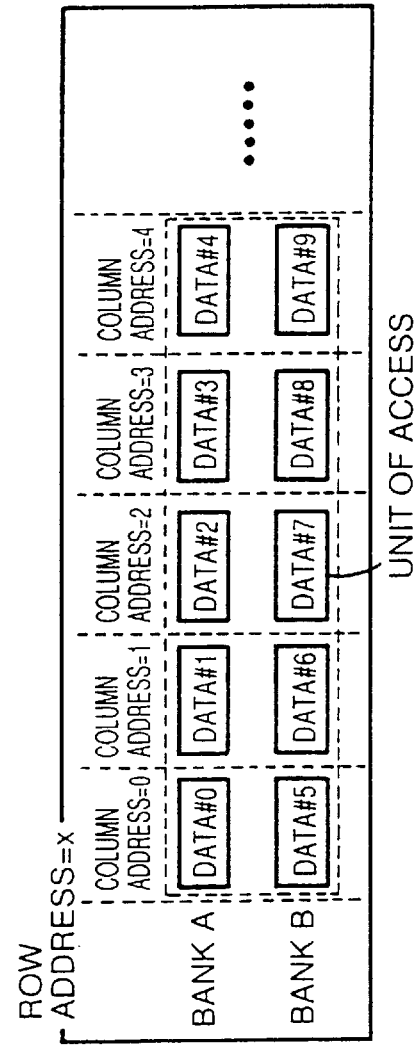
FIG. 29B illustrates a storage mode in an SDRAM thereof.
Figure 29C:
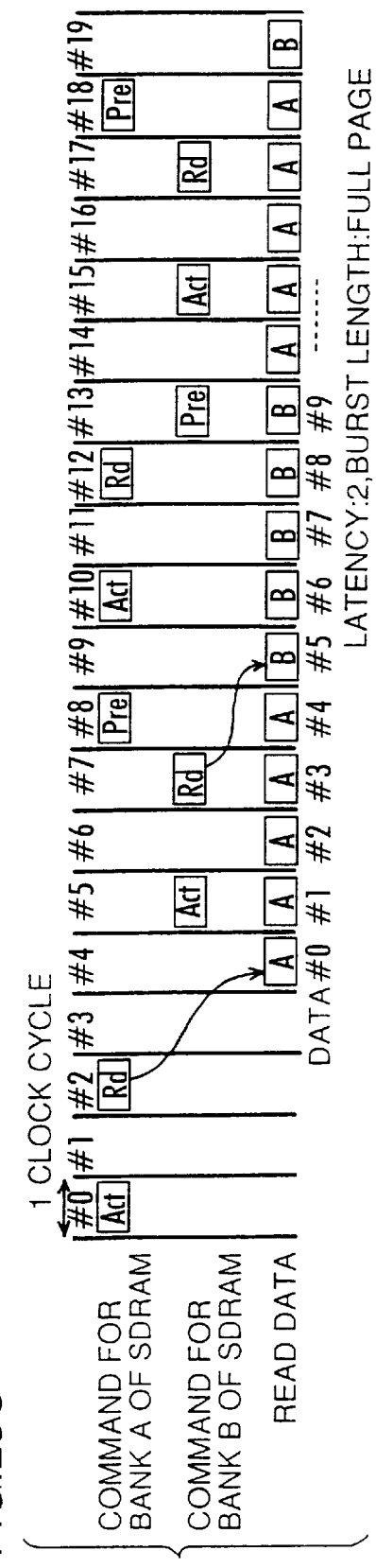
FIG. 29C is a sequence diagram representing operations in access on the SDRAM.

FIGS. 29A to 29C illustrate the structure of a modification of the embodiment 3 of the present invention. Referring to FIG. 29A, data words Data are stored in an SDRAM in an access unit of 10 words. Among data Data#0 to Data#9 of 10 words, the preceding five words Data#0 to Data#4 are stored in a bank A, and the subsequent five words Data#5 to Data#9 are stored in a bank B (refer to FIG. 29B).

With reference to a sequence diagram shown in FIG. 29C, a data reading operation is now described. In this modification, the SDRAM has a latency of 2, and its burst length is the full page.

An active command Act is supplied for the bank A at a clock cycle #0, and a read command Rd is supplied for the bank A at a clock cycle #2. Thus, the data words Data#0 to Data#4 are successively outputted from the bank A at a clock cycle #4. An active command Act is supplied for the bank B at a clock cycle #5, and a read command Rd is supplied for the bank B at a clock cycle #7. The data words Data#5 to Data#9 are successively read from the bank B from a clock cycle #9. At a clock cycle #8, a precharge command Pre is supplied for the bank A, for returning the bank A to a precharged state.

Then, an active command Act is supplied for the bank A at a clock cycle #10, and a read command Rd is supplied for the bank A at a clock cycle #12. Thus, data of five words from the bank A are successively read from a clock cycle #14. A precharge command Pre is supplied for the bank B at a clock cycle #13, and then an active command Act and a read command Rd are supplied for the bank B at clock cycles #15 and #17 respectively. Thus, reading of data of five words from the bank B is started from a clock cycle #19. A precharge command Pre is supplied for the bank A at a clock cycle #18.

Also in this access sequence, data of five words are alternately read from the banks A and B in the same access sequence. Thus, data transfer can be efficiently performed. In supplying the active command Act, the page may be changed, or the same page may be accessed again. The access sequence for image data (restored image data) and that for other image data can be made substantially identical to each other, whereby access control of the SDRAM is simplified.

Input/output control of this SDRAM for the data words other than the image data is executed under control by the control unit 6 shown in FIG. 15. The data words Data are stored in a free region of the SDRAM shown in FIG. 1. The data input/output sequence is fixed, and the addresses may be generated in FIFO manner (similarly to a first-in first-out memory). A buffer for relaxing difference between the transfer speed for the bit stream and the code processing speed in the decoding unit can be implemented by the SDRAM.

In the SDRAM, two clock cycles are required for an active command, and two clock cycles are required for a precharge command. Thus, data reading is not performed from one bank for four clock cycles in total. Therefore, data of four clock cycles at the minimum must be continuously read from the other bank. Thus, data transfer compatible with transfer of restored image data can be implemented by setting a data access unit to 2·Q words assuming that Q represents an integer of at least four and storing data in the banks A and B by Q words respectively.

According to the embodiment 3 of the present invention, as hereinabove described, data words other than image data (restored image data) are also stored by Q words by alternately accessing the banks A and B, whereby it is possible to efficiently transfer necessary data compatibly with restored image data transfer.

Embodiment 4

Figure 30A:
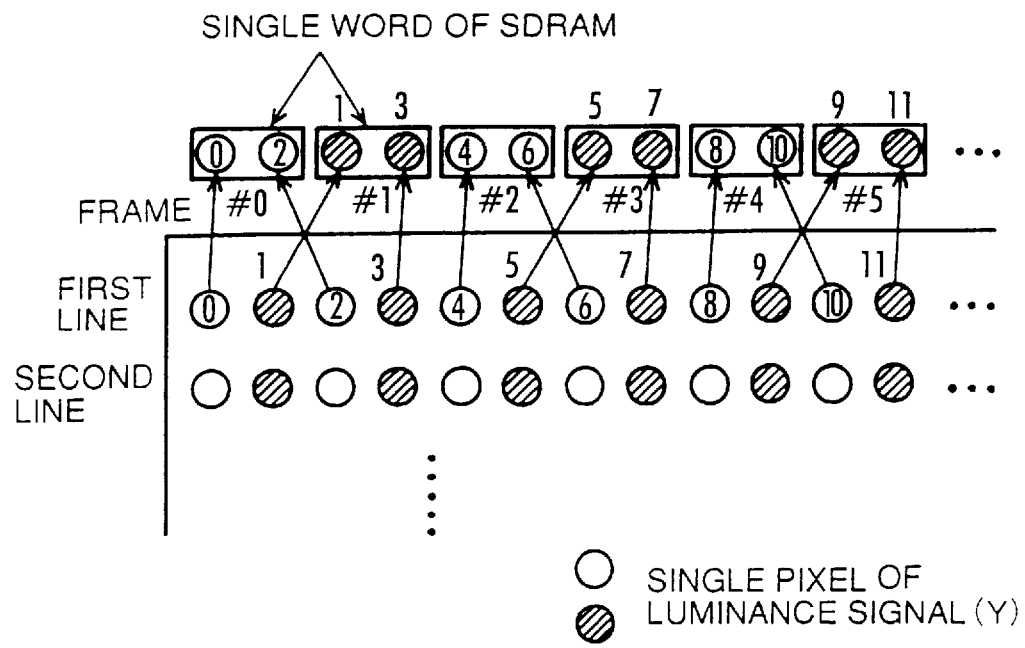
FIG. 30A illustrates the correspondence between luminance signal pixel data and single words of an SDRAM in an embodiment 4 of the present invention.
Figure 30B:
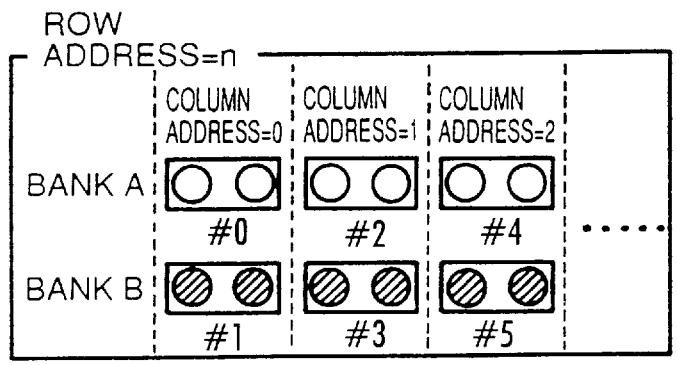
FIGS. 30B and 30C illustrate modes of the words shown in FIG. 30A stored in the SDRAM.
Figure 30C:
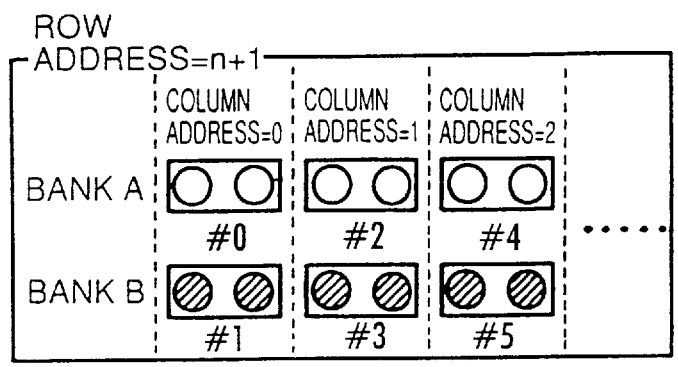

FIGS. 30A to 30C illustrate address assignment of an SDRAM in an image decoding apparatus according to an embodiment 4 of the present invention. Referring to FIG. 30A, each word of the SDRAM is formed by two pixels of alternate pixels as to a luminance signal (Y), and adjacent words are alternately stored in banks A and B respectively. Namely, each adjacent pair of even-numbered pixels are stored in the bank A as one word, and each adjacent pair of odd-numbered pixels are stored in the bank B as one word. Referring to FIG. 30A, the pixels of the numbers 0 and 2 are treated as a word #0, and those of numbers 1 and 3 are processed as a word #1. Similarly, two pixels having even numbers, n, and n+2 are treated as an even-numbered word #2n, while two pixels of adjacent odd numbers n+1 and n+3 are treated as a word #2n+1.

Referring to FIG. 30B, adjacent two words are stored in the same column address positions of the banks A and B in storage positions having SDRAM row addresses, n. For example, the word #0 is stored in the bank A and the word #1 is stored in the bank B at the storage positions of column address 0, for example. Namely, a word #2n is stored in the bank A and a word #2n+1 is stored in the bank B when the column address is, n.

Referring to FIG. 30C, even-numbered words #0, #2, . . . are stored in the bank A and odd-numbered words #1, #3, . . . are stored in the bank B also in the adjacent row address n+1. Also in this row address n+1, adjacent pairs of words are stored in the same column address positions.

As to color-difference signals, pixel data of a color-difference signal Cb are stored in the bank A, and those of a color-difference signal Cr are stored in the bank B, similarly to the case of the embodiment 1. These are stored with two pixels as one word. Also in this embodiment 4, luminance signal pixel data and color-difference signal pixel data each can be alternately read from the banks A and B to be transferred in a unit of five words.

Figure 31A:
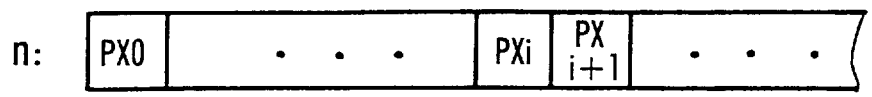
FIGS. 31A to 31D illustrate address generation with respect to luminance signal pixels in the embodiment 4 of the present invention and specific examples thereof.

FIGS. 31A to 31D illustrate addresses for luminance signal pixels. Consider luminance signal pixel data PX0 . . . . PXi, PXi+1, , , , which are arranged on a line number, n, as shown in FIG. 31A. The pixel number of the pixel PXi is, i.

Figure 31B:
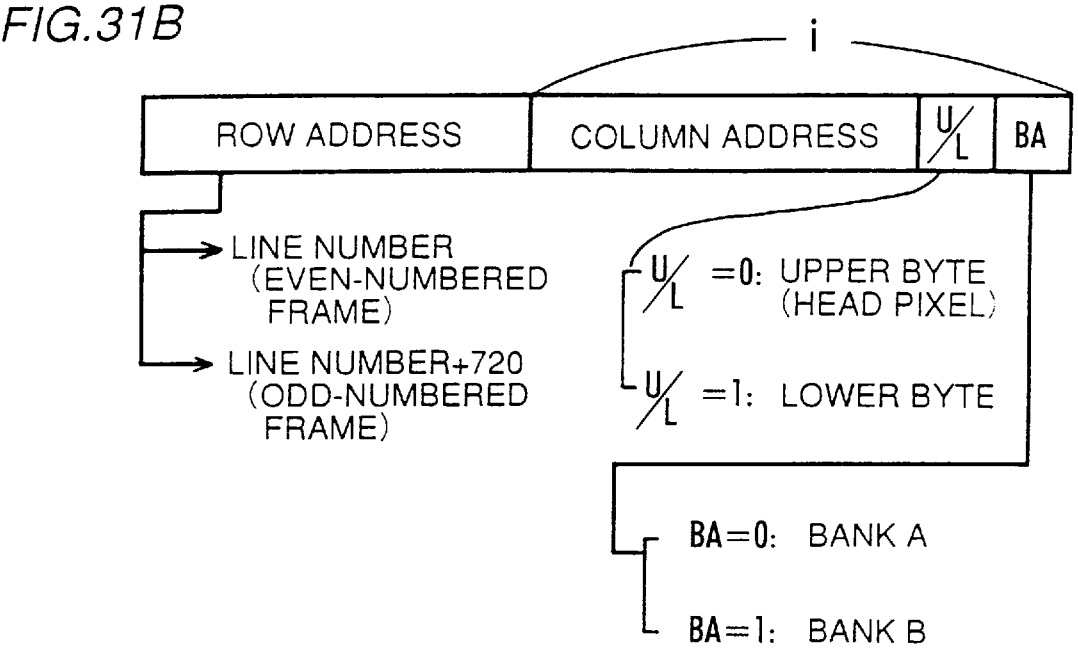

The row address for the pixel PXi is the line number, n, in case of an even-numbered frame, and a line number n +720 in case of an odd-numbered frame, as shown in FIG. 31B (refer to the frame storage addresses of FIG. 1). When the pixel number, i, is expressed in binary notation, on the other hand, the least significant bit forms a bank address bit BA, and the second least significant bit serves as an upper/lower instruction bit U/L indicating an upper/lower bit in the word. The remaining upper bits are utilized as the column address. The bank A is specified when the bank address signal bit BA is zero, while the bank B is specified when the bank address signal bit BA is 1. The upper/lower instruction bit U/L indicates a first pixel when it is zero, and is stored in an upper byte position. When the upper/lower instruction bit U/L is 1, on the other hand, it indicates that the pixel is stored in a second byte position of the word.

Figure 31C:
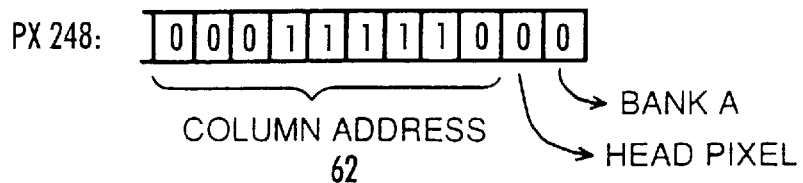

As shown in FIG. 31C, a pixel PX248 provides "00011111000" when the number "248" is expressed in binary notation. The least significant bit is "0", and it is indicated that this pixel PX248 is stored in the bank A. The second least significant bit is "0" and it is indicated that this is the first pixel of the word in this bank A. The remaining bits are utilized as the column address, and a column address 62 is specified.

Figure 31D:
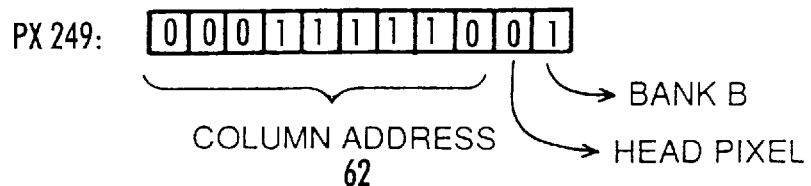

As shown in FIG. 31D, the number "249" of the adjacent pixel PX249 is expressed as "00011111001" in binary notation, the least significant bit is "1" and it is indicated that this pixel PX249 is stored in the bank B. The second least significant bit is "0" and it is indicated that the pixel PX249 is the first pixel of a word. The remaining bits are utilized as a column address. Thus, it is indicated that the pixels PX248 and PX249 are stored in the same address position of the banks A and B respectively.

The address assignment for the respective pixels in the embodiment 4 is identical to that in the embodiment 1 except that the positions of the bank address bit and the upper/lower instruction bit are exchanged. In access to the SDRAM, therefore, addresses can be generated through the structure (refer to FIGS. 16 to 19) according to the embodiment 1.

Address assignment for color-difference signals is identical to that in the embodiment 1.

In pixel data reading of the reference image block, data of five words are alternately read from the banks A and B. Therefore, pixel data words are read in accordance with either one of the methods according to the embodiments 1 and 2.

Figures 32A, 32B:
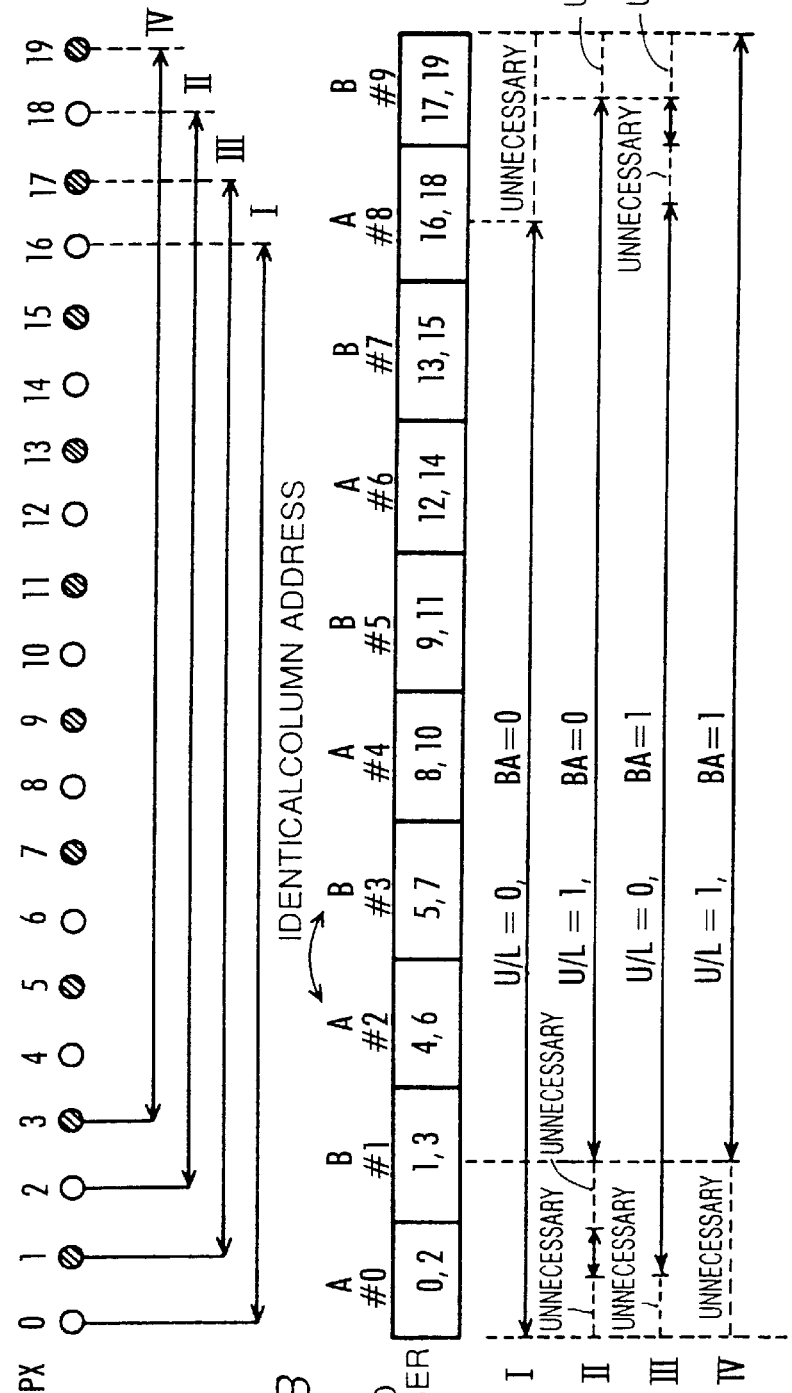
FIGS. 32A and 32B illustrate pixel data required in luminance signal reference image block pixel data reading in the embodiment 4 of the present invention.

FIGS. 32A and 32B illustrate reference pixels (predictive pixels) required for restoring pixel data prediction coded in fractional precision. Referring to FIG. 32A, consider arrangement of 20 luminance signal pixels PX0 to PX19.

In a sequence I, the head pixel is the pixel PX0, and the pixels PX0 to PX16 are required in this case. In a sequence II, the head pixel is the pixel PX2, and the pixels PX2 to PX18 are required. In a sequence III, the head pixel is the pixel PX1, and the pixels PX1 to PX17 are required. In a sequence IV, the head pixel is the pixel PX3, and the pixels PX3 to PX19 are required. As to each of the sequences I to IV, five words are alternately read from the banks A and B as shown in FIG. 32B. 20 pixels PX0 to PX19 are read in this case. Garbage pixel data are truncated in a word train conversion circuit provided in the exterior (this structure is described later).

As shown at (a) in FIG. 32B, the pixels PX17 to PX19 are rendered unnecessary in the sequence I. In this case, the upper/lower instruction bit U/L of the head pixel is zero, and a bank address bit BA is also zero.

As shown at (b) in FIG. 32B, the pixels PX0, PX1 and PX19 are rendered unnecessary in the sequence II. In this case, the upper/lower instruction bit U/L of the head pixel PX2 is 1, and the bank address bit BA is zero.

As shown at (c) in FIG. 32B, the pixels PX0, PX18 and PX19 are unnecessary in the sequence III. The upper/lower instruction bit U/L of the head pixel PX1 is zero, and the bank address bit BA is 1.

As shown at (d) in FIG. 32B, the pixels PX0 to PX2 are rendered unnecessary in the sequence IV. The upper/lower instruction bit U/L of the head pixel PX3 is 1, and the bank address bit BA is also 1. Words of Nos. #2j and #2j+1 have the same column address (refer to FIGS. 30B and 30C). In the embodiment 4, therefore, five words are alternately read from the banks A and B in accordance with the column address of the head pixel, and thereafter three pixel data rendered unnecessary are truncated in the exterior.

Figure 33:
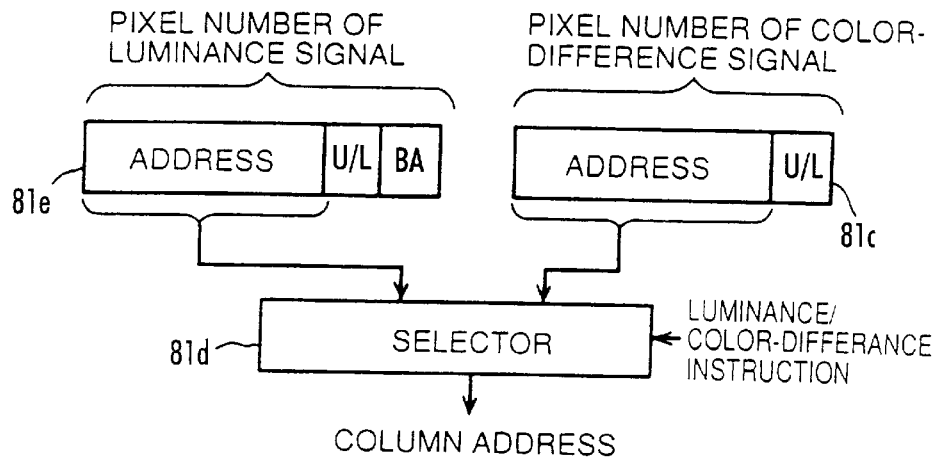
FIG. 33 schematically illustrates the structure of a column address generating part of a reference image address generator in the embodiment 4 of the present invention.

FIG. 33 illustrates the structure of a column address generating part of a reference image address generator employed in the embodiment 4 of the present invention. The structure shown in FIG. 33 corresponds to that of the column address generating part shown in FIG. 18. Referring to FIG. 33, the column address generating part of the reference image address generator includes a register 81e for storing luminance signal pixel numbers, a register 81c for storing color-difference signal pixel numbers, and a selector 81d for selecting one of a prescribed number of upper address bits of the register 81e and a prescribed number of upper address bits of the register 81c in accordance with a luminance/color-difference instruction signal. Information from the head pixel position detector 80b shown in FIG. 17 is stored in the registers 81e and 81c. Upper bits excluding two least significant bits are selected from the register 81e and supplied to the selector 81d. Upper bits excluding the least significant bit are supplied from the register 81c to the selector 81d. While the pixel data words are first read from the bank A when the head pixel is any of PX0 to PX3 as shown in FIG. 32B, while the column address remains unchanged. Therefore, it is not necessary to change the column address in accordance with the bank for storing the head pixel data. As to row addresses, the structure shown in FIG. 19 is utilized similarly to the case of the embodiment 1. Data of five words are continuously read alternately from the banks A and B through the use of the column address generating part shown in FIG. 33. Thus, data of 20 pixels including the reference image block are read.

Figure 34:
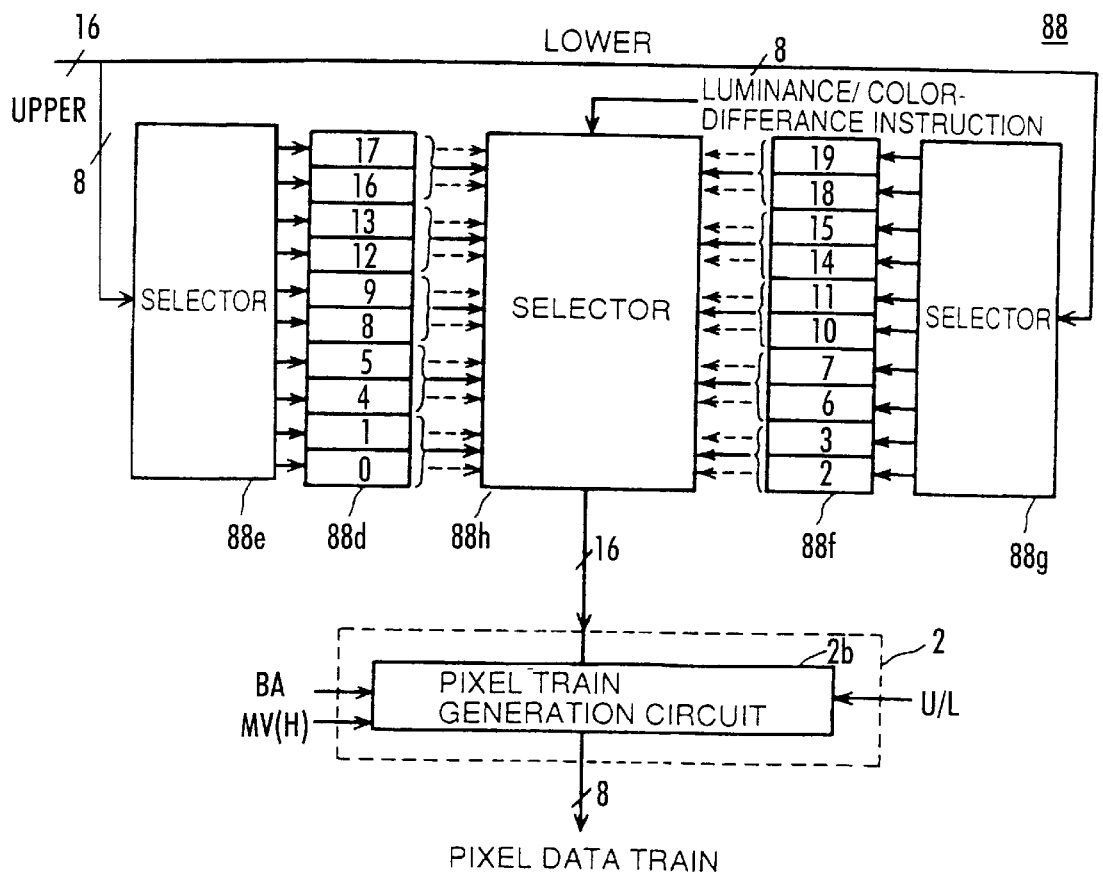
FIG. 34 schematically illustrates the structure of a word train conversion circuit in the embodiment 4 of the present invention.

FIG. 34 schematically illustrates the structure of the word train conversion circuit 88. In this word train conversion circuit 88, arrangement of the pixels of the read 20 words is converted.

FIG. 34 schematically illustrates the structure of the word train conversion circuit 88. Referring to FIG. 34, the word train conversion circuit 88 (refer to FIG. 16) includes a register 88d for successively storing upper eight bits of pixel data words of 16 bits read from the SDRAM through a selector 88e, a register 88f for successively storing lower eight bits of the pixel data words of 16 bits through a selector 88g, and a selector 88h for successively reading the pixel data words stored in the registers 88d and 88f as pixel data words of 16 bits.

Each of the register 88d and 88f has capacity of storing 10 pixel data words. The selector 88e successively stores pixel data of upper eight bits in the register 88d. The selector 88g successively stores pixel data of lower eight bits in storage positions of the register 88f. Therefore, selected positions of the selectors 88e and 88g are simply shifted every clock cycle. FIG. 34 shows luminance signal pixel numbers stored in the registers 88d and 88f. The register 88d stores pixel data PX0, PX1, PX4, PX5, PX8, PX9, PX12, PX13, PX16 and PX17. On the other hand, the register 88f stores pixels PX2, PX3, PX6, PX7, PX8, PX11, PX14, PX15, PX18 and PX19.

The selector 88h alternately reads pairs of pixel data from the registers 88d and 88f in luminance signal pixel data reading, as shown by solid lines. Namely, the pixel data PX0 and PX1 are read from the register 88d, and then the pixel data PX2 and PX3 are read from the register 88f. Thereafter the pixel data PX4 and PX5 are read from the register 88d. Thus, the luminance signal pixel data read from the banks A and B in a unit of five words are converted to 16-bit data along arrangement order on pixel lines and outputted.

In case of color-difference signals, operations of the selectors 88e and 88g are identical to those for storing the luminance signal pixel data, and hence the color-difference signals Cb and Cr are successively stored in storage positions of the registers 88d and 88f respectively. In this case, the selector 88h first reads the color-difference signal Cb by five words from the registers 88d and 88f similarly to the case of storing in accordance with a luminance/color-difference instruction signal, and then reads pixel data words of the color-difference signal Cr from the registers 88d and 88f as shown by broken lines. In this case, the selector 88h may alternatively be formed to alternately read the words of the color-difference signals Cb and Cr. Such a structure that sequences of a sequence controller for controlling on/off operations of a switching device connecting respective storage positions of the registers to a 16-bit data bus are switched in accordance with the luminance/color-difference instruction signal may be employed for the selector 88h.

The pixel data words whose arrangement order is converted by the selector 88h are supplied to a pixel train generation circuit 2b included in a decoding unit 2. In case of luminance signal pixel data, the pixel train generation circuit 2b truncates data of three pixels rendered unnecessary in accordance with a bank address bit BA and an upper/lower instruction bit U/L and selects data of necessary 17 pixels for forming an 8-bit pixel data train. In this pixel train generation circuit 2b, data of final three pixels (sequence I), head two pixels and a single final pixel (sequence II), a single head pixel and final two pixels (sequence III), and head three pixels (sequence IV) are truncated in accordance with the values of the bank address bits BA and the upper/lower instruction bits U/L (17 pixels are selected starting from the head valid pixel). In case of color-difference signal pixel data, a selecting operation similar to that in the embodiment 1 is performed.

When reading of pixel data words from the SDRAM and word train conversion are simultaneously performed in a pipeline manner in the word train conversion circuit 88 shown in FIG. 34, two structures shown in FIGS. 30A to 30C may be provided in parallel with each other for alternately writing and reading data in and from the two pixel train conversion circuits.

Also in the embodiment 4, as hereinabove described, the addresses are assigned to the respective pixel data such that the data are alternately stored in the banks A and B while forming each word by alternately adjacent pixels, whereby five words can be continuously read alternately from the banks A and B similarly to the embodiment 1, overhead upon page change can be suppressed to the minimum, and data transfer can be efficiently performed.

Embodiment 5

Figures 35, 36A, 36B, 36C:
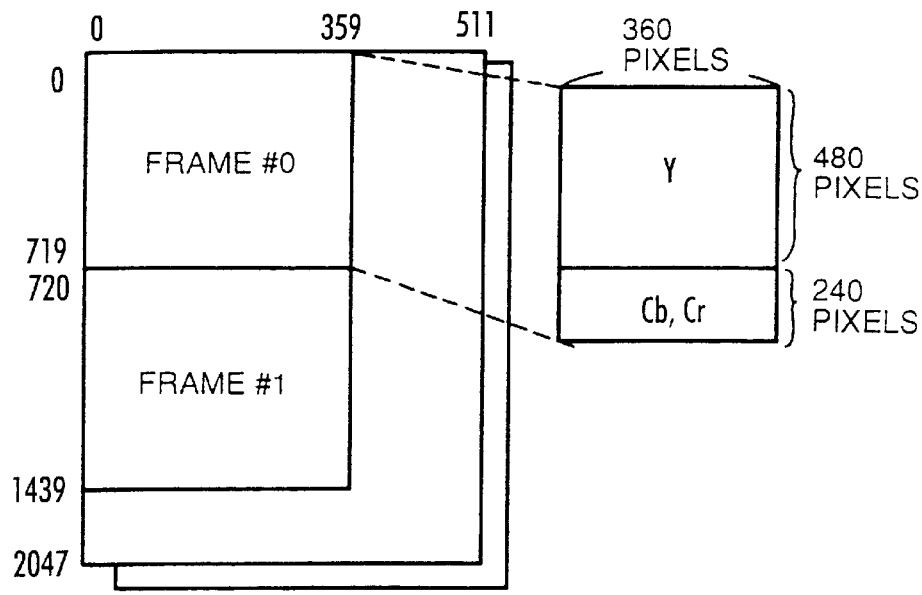
FIG. 35 illustrates an image data storage region in an SDRAM in an embodiment 5 of the present invention.
FIG. 36A illustrates pixel data aligned with each other in the embodiment 5 of the present invention.
FIG. 36B illustrates a storage mode of luminance signal pixel data in an SDRAM.
FIG. 36C illustrates a storage mode of color-difference signal pixel data in the SDRAM.

FIG. 35 illustrates address assignment of an SDRAM according to an embodiment 5 of the present invention. Referring to FIG. 35, the SDRAM performs input/output of 8-bit data, and includes row addresses 0 to 2047 and column addresses 0 to 511. This SDRAM has storage capacity of 16 Mbits. A frame #0 of an even number is stored in a storage region of the row addresses 0 to 719 and the column addresses 0 to 359, and a frame #1 of an odd number is stored in a storage region of the row addresses 720 to 1439 and the column addresses 0 to 359. Each of the frames #0 and #1 includes luminance signal pixel data (Y) arranged in 480 pixel rows by 720 pixel columns and color-difference signal pixel data (Cb, Cr) arranged in 240 pixel rows by 360 pixel columns.

FIGS. 36A and 36B illustrate address assignment of the pixel data in the SDRAM. Referring to FIG. 36A, 8-bit luminance signal pixel data aligned on one line (row address: page) are alternately stored in banks A and B.

Namely, data of luminance signal pixels of even numbers 0, 2 and 4 are stored at column addresses #0, #1 and #2 of the bank A, and data of luminance signal pixels 1, 3 and 5 of odd numbers are stored at column addresses #0, #1 and #2 of the bank B, as shown in FIG. 36B. As to the color-difference signals, pixel data of a color-difference signal Cb are stored at the column addresses #0, #1 and #2 of the bank A respectively, while pixel data of a color-difference signal Cr are stored at column addresses #0, #1 and #2 respectively, as shown in FIG. 36C. Thus, data of the same pixels are stored at the same addresses of the banks A and B. The number of pixel data arranged on one line of each of the banks A and B is 360, similarly to the embodiments 1, 2 and 4. With reference to a reading sequence diagram shown in FIG. 37, a luminance signal pixel data reading operation from the SDRAM is now described.

Referring to FIG. 37, the SDRAM has a latency of 2, and its burst length is set at the full page. An active command Act is supplied for a bank A at a clock cycle #0 and a page is selected in the bank A, and a read command Rd is supplied at a clock cycle #2. 8-bit luminance signal pixel data are successively read from the bank A from a clock cycle #4.

An active command Act is supplied for the bank B at a clock cycle #9, for selecting the same page of the bank B. Then, a read command Rd is supplied for the bank B at a clock cycle #11. In accordance with the read command Rd at the clock cycle #11, 8-bit luminance signal pixel data from the bank B are successively read from a clock cycle #13. A precharge command Pre is supplied for the bank A at a clock cycle #12 for bringing the bank A into a precharged state, in preparation for page change.

An active command Act is supplied for the bank A at a clock cycle #18, for selecting the next page. Then, a read command Rd is supplied for the bank A at a clock cycle #20, and 8-bit luminance signal pixel data from the bank A are successively read from a clock cycle #22. A precharge command Pre is supplied for the bank B at a clock cycle #21.

In the reading sequence shown in FIG. 37, the luminance signal pixel data are alternately read from the banks A and B in a unit of nine words. In order to read pixel data of a reference image block, 17 pixels are required at the maximum. When 17 pixels are necessary, pixel data of one word among 18 words is rendered unnecessary depending on whether the head pixel is included in the bank A or in the bank B by a device provided in the exterior. When the head pixel is included in the bank B, the head 8-bit pixel data among 8-bit pixel data of nine words read from the bank A is rendered unnecessary. When the head pixel is included in the bank A, on the other hand, the final 8-bit pixel data among 8-bit pixel data of nine words read from the bank B is rendered unnecessary.

Also in reading of color-difference signals, pixel data are alternately read from the banks A and B in a unit of nine words in the same sequence. In case of the color-difference signals, the size of a reference subblock is eight or nine pixels in the horizontal direction. In accordance with the value of a horizontal component MV(H) of a motion vector, the final color-difference pixel data is rendered valid or invalid among color-difference signal pixel data of nine words. This valid/invalid processing is performed by a device provided in the exterior. Thus, necessary pixel data can be read in the same sequence for both of luminance and color-difference signals.

Also in reading of image data for displaying and in writing restored image pixel data in the SDRAM, pixel data of nine words are alternately read from the banks A and B in the same sequence.

Figure 38A:
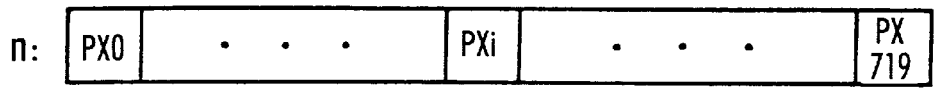
FIGS. 38A to 38C illustrate address generation with respect to pixels in the embodiment 5 of the present invention and specific examples thereof.
Figure 38B:
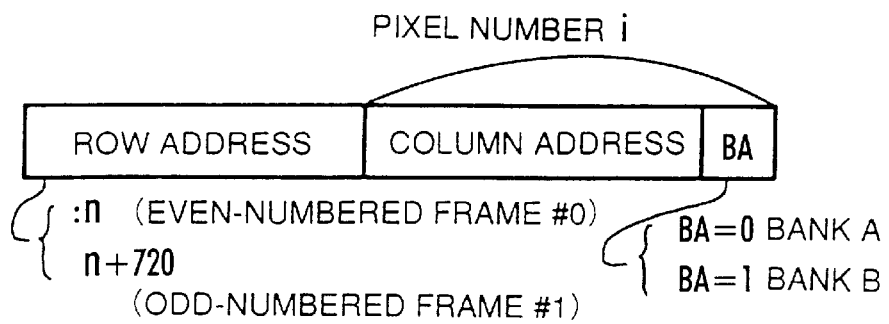
Figure 38C:
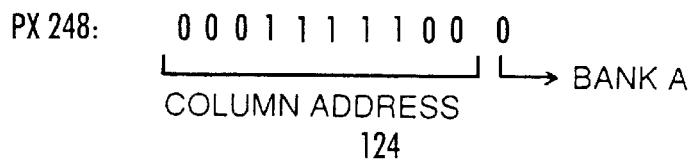

FIGS. 38A to 38C illustrate methods of generating column and row addresses with respect to 8-bit luminance signal pixel data in the embodiment 5 of the present invention. As shown in FIG. 38A, 720 luminance signal pixel data PX0 to PX719 are arranged on a line number, n. The row address is generated from the line number, n, as shown in FIG. 38B, similarly to the embodiments 1, 2 and 4. The row address is equal to the line number, n, in case of an odd-numbered frame #1, while the same is n+720 in case of an odd-numbered frame #1. On the other hand, the column address is generated from a pixel number i, as shown in FIG. 38B. As to the pixel number, i, the least significant bit in binary notation is utilized as a bank address signal bit BA, and the remaining upper bits are utilized as the column address. The bank A is specified when the bank address bit BA is zero, while the bank B is specified when the bank address signal bit BA is 1.

Referring to FIG. 38C, the column address for the pixel PX248 is now calculated. The pixel number "248"of the pixel PX248 is expressed as "00011111000" in binary notation. The least significant bit is "0"and the bank A is specified. The remaining upper bits are employed as the column address, and a column address 124 is obtained. Namely, the pixel PX248 is stored at the column address 124 of the bank A.

In case of the color-difference signals, the bank address signal bit BA is employed for identifying the color-difference signals Cb and Cr, and the pixel number, i, is utilized as the column address.

Figure 39:
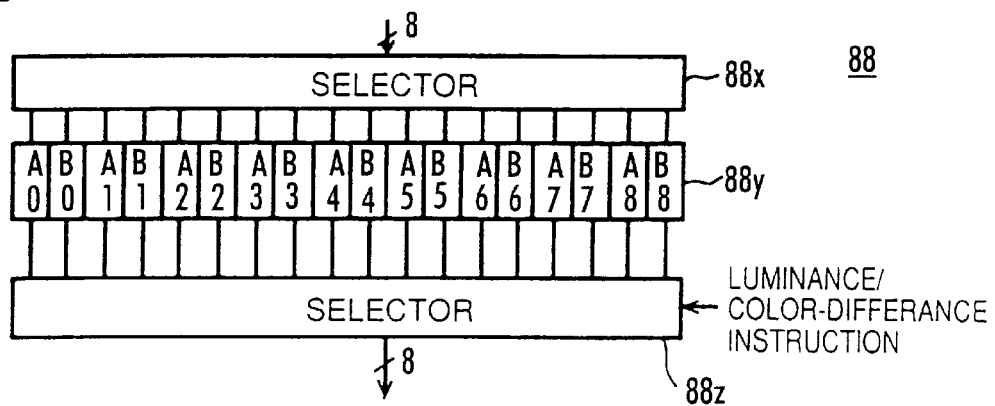
FIG. 39 schematically illustrates the structure of a word train conversion circuit for reference image block pixel data in the embodiment 5 of the present invention.

FIG. 39 illustrates the structure of a word train conversion circuit 88. The word train conversion circuit 88 shown in FIG. 39 corresponds to that shown in FIG. 16. Referring to FIG. 39, the word train conversion circuit 88 includes a register 88*y* for receiving 8-bit pixel data through a selector 88*x* and successively storing the same, and a selector 88*z* for successively selecting and reading the 8-bit pixel data stored in the register 88*y* in a prescribed sequence.

The selector 88*x* receives the 8-bit pixel data successively read from the SDRAM and successively stores the pixel data read from the bank A in even-numbered storage positions of the register 88*y*, while successively storing the 8-bit pixel data read from the bank B in odd-numbered storage positions of the register 88*y*. The selector 88*y* successively reads the 8-bit pixel data stored in the register 88*y* starting from the first storage position and outputs the same when a luminance/color-difference instruction signal indicates a luminance signal. On the other hand, the selector 88*z* successively reads the pixel data stored in the even-numbered storage positions of the register 88*y* and then successively read the pixel data stored in the odd-numbered storage positions when the luminance/color-difference instruction signal indicates the color-difference signal. Thus, pixel data A0 to A8 of nine words read from the bank A and 8-bit pixel data B0 to B8 read from the bank B in the register 88*y* are outputted in accordance with sampled pixel data arrangement order.

In pixel data reading of a reference image block, only necessary pixel data are selected in the pixel train generating circuit included in the decoding unit 2, as shown in FIG. 34. In case of luminance signal pixel data, pixel data of 17 words are selected depending on whether the head pixel is included in the bank A or in the bank B. Then, validness/invalidness of the final 8-bit pixel data among the selected 8-bit pixel data of 17 words is decided in accordance with the horizontal component MV(H) of the motion vector. When the motion vector horizontal component XV(H) is an integer, only 16 pixels are necessary and the final 8-bit pixel data is truncated. When the motion vector horizontal component MV(H) is a fractional component, on the other hand, the final 8-bit pixel data is rendered valid.

In case of a color-difference signal component, validness/invalidness of the final 8-bit color-difference signal data is decided in accordance with the motion vector horizontal component MV(H) among the pixel data of nine words supplied from the word train conversion circuit 88 shown in FIG. 39, similarly to the case of the luminance signal pixel data. Thus, all necessary pixel data can be transferred.

In case of reading pixel data from the SDRAM for display on a display unit, 360 pixels are arranged on one line and all pixel data of one line can be continuously read by reading the pixel data alternately from the banks A and B in a unit of nine words. Also as to the color-difference signal, 360 pixels are present on one line, and necessary pixel data can be efficiently and continuously read by alternately reading the pixel data from the banks A and B in a unit of nine words, similarly to the above.

In writing of restored image pixel data, a buffer memory is provided in the decoding unit, even-numbered luminance signal pixel data are written in the bank A in advance through the buffer memory by eight words, and then luminance signal pixel data of odd-numbered eight words are written in the bank B. In place of the buffer memory, a structure of delaying odd-numbered pixel data by eight words may be employed. This operation is repeated. As to the restored image addresses, the column address is incremented by 8 every 18 access cycles. This is because writing of image data is performed in units of macro blocks in writing of the restored image pixel data. The head pixel address of the macro block can be readily recognized also in the embodiment 1. Thus, the structure shown in the embodiment 1 can be utilized. As to column addresses of restored image pixel data, the restored image pixel data are alternately written in the banks A and B in a unit of eight words by masking a pixel data writing of the ninth clock cycle with respect to the luminance and color-difference signal pixel data.

According to the embodiment 5 of the present invention, as hereinabove described, addresses are so assigned that pixels on one line are alternately stored in the banks A and B and the banks A and B are alternately accessed in a unit of plural words, whereby overhead in page change can be suppressed to the minimum and efficient data transfer can be performed.

Embodiment 6

Figure 40A:
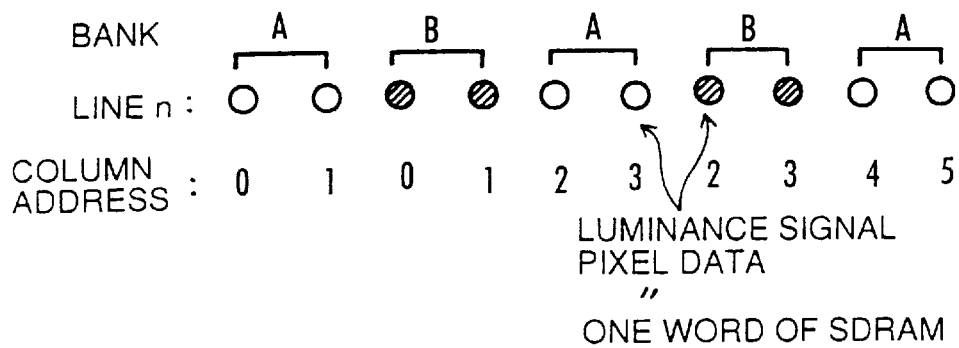
FIGS. 40A to 40D illustrate a storage mode of pixel data in an SDRAM in an embodiment 6 of the present invention and address generation and concrete examples thereof.

FIG. 40A illustrates address assignment of 8-bit luminance signal pixel data with respect to an SDRAM of ×8 configuration in an embodiment 6 of the present invention. Referring to FIG. 40A, 8-bit pixel data aligned on a line, n, are alternately stored in banks A and B in a unit of two pixels. The first two pixels are stored in column addresses 0 and 1 of the bank A respectively, while the next two pixels are stored in column addresses 0 and 1 of the bank B respectively. Thereafter the 8-bit pixel data are stored in the SDRAM by similar address assignment.

Figure 40B:
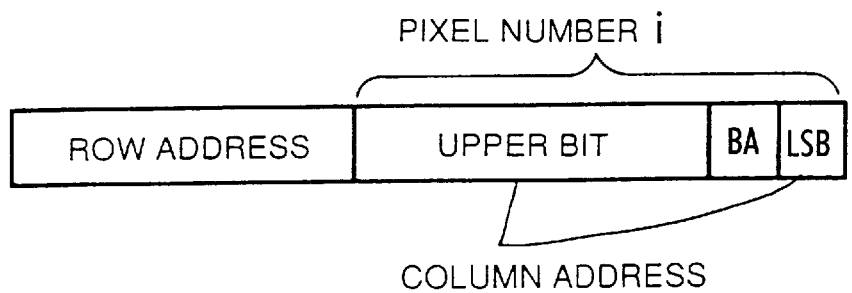

FIG. 40B illustrates the addresses of each pixel in the arrangement shown in FIG. 40A. Referring to FIG. 40B, the row address of the pixel is provided by a line number, n,(in case of an even-numbered frame #0) or n+720 (odd-numbered frame #1), similarly to that shown in FIG. 38B. The column address is provided by bits (upper bits and the least significant bit (LSB)) of binary notation of a pixel number, i, excluding the second least significant bit. The second least significant bit is utilized as a bank address bit BA.

Figure 40C:
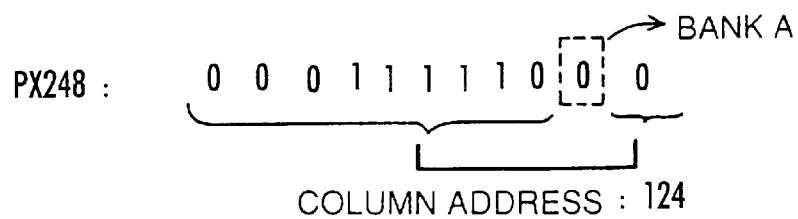

The column address of a pixel PX248 is calculated as shown in FIG. 40C. In this case, the second least significant bit is "0"and the pixel PX248 is stored in the bank A. The remaining bits form the column address, and the pixel PX248 has a column address 124.

Figure 40D:
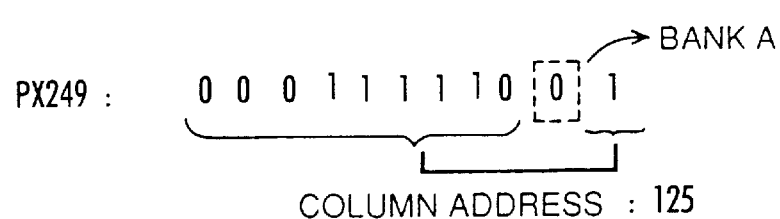
Figure 41:
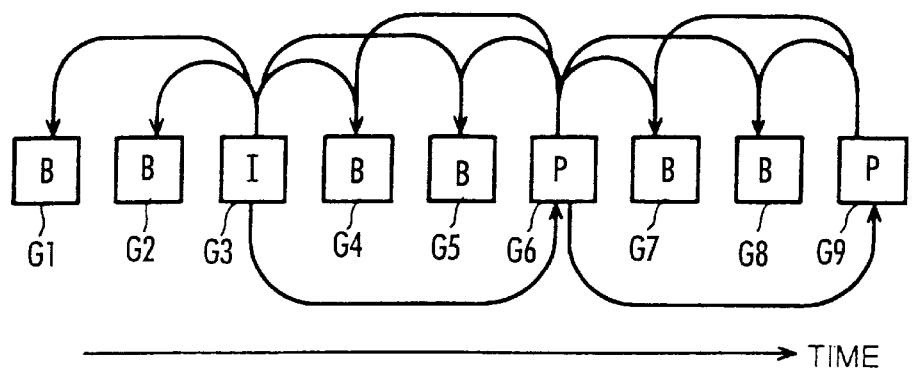
FIG. 41 illustrates an operation of decoding image data in accordance with MPEG 2 standards.
Figure 42:
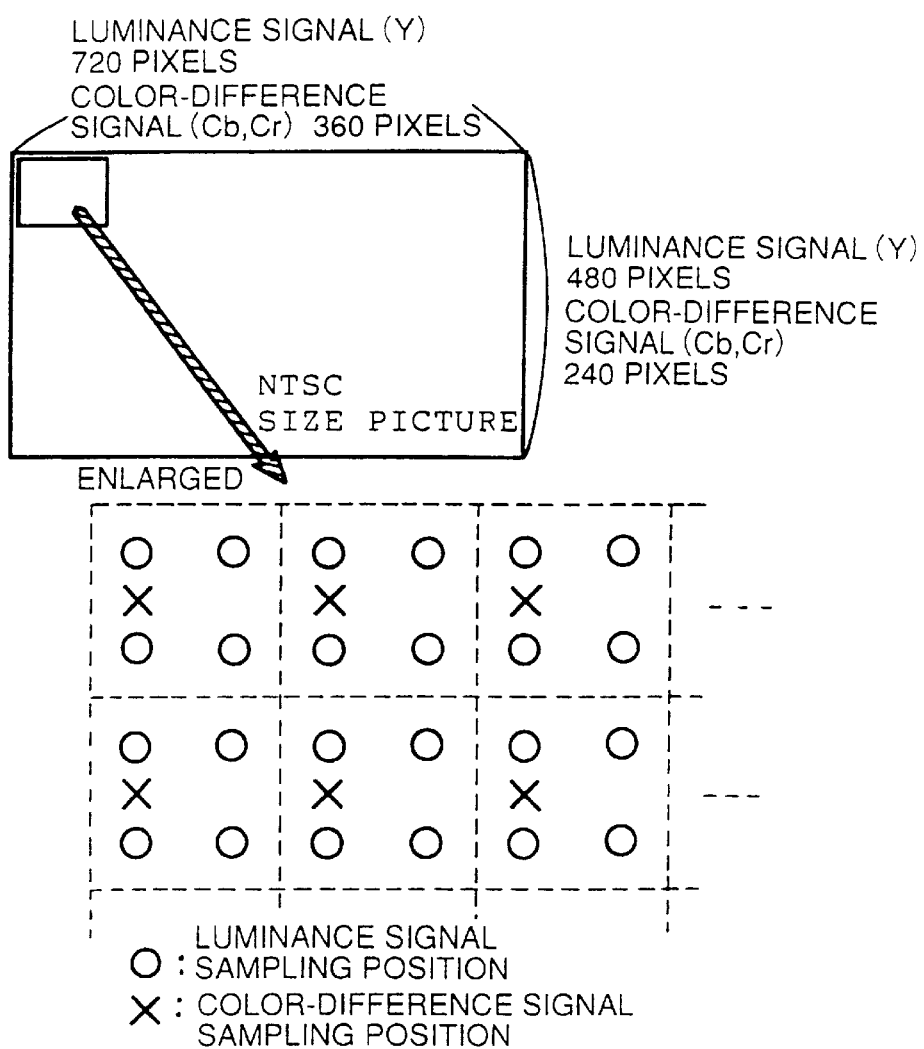
FIG. 42 schematically illustrates the structure of image data.
Figure 43A:
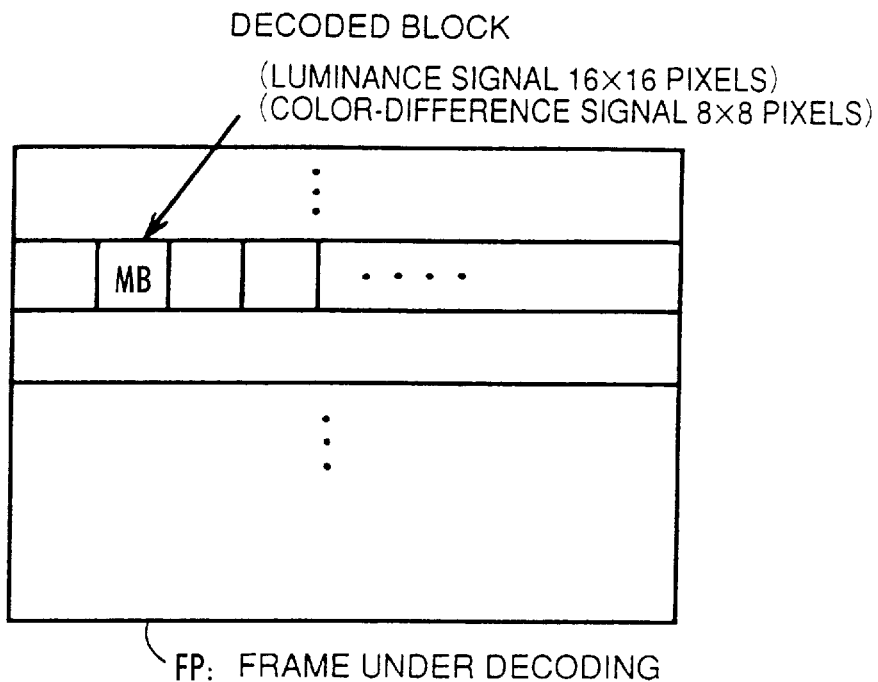
FIGS. 43A and 43B illustrate a block serving as a unit for image data decoding and a motion vector employed in the decoding operation.
Figure 43B:
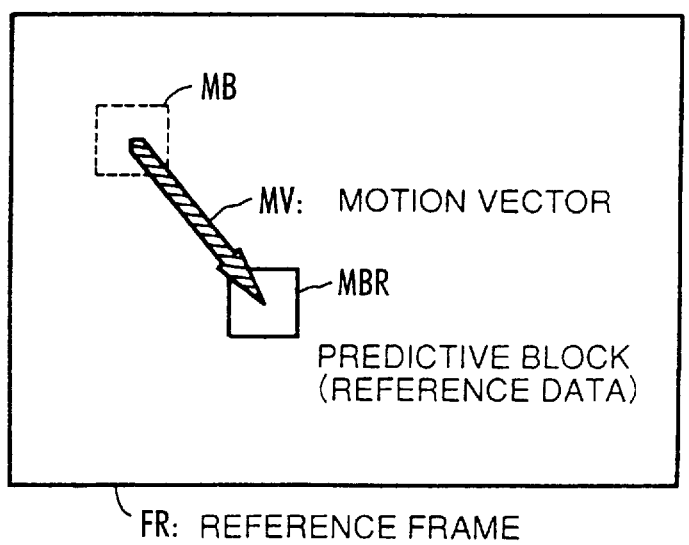
Figure 44:
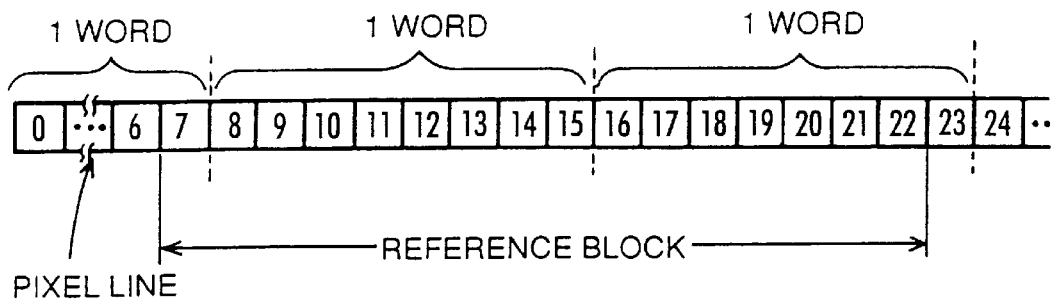
FIG. 44 illustrates a problem in data transfer utilizing a 64-bit data bus of a conventional image decoding processor.
Figure 45:
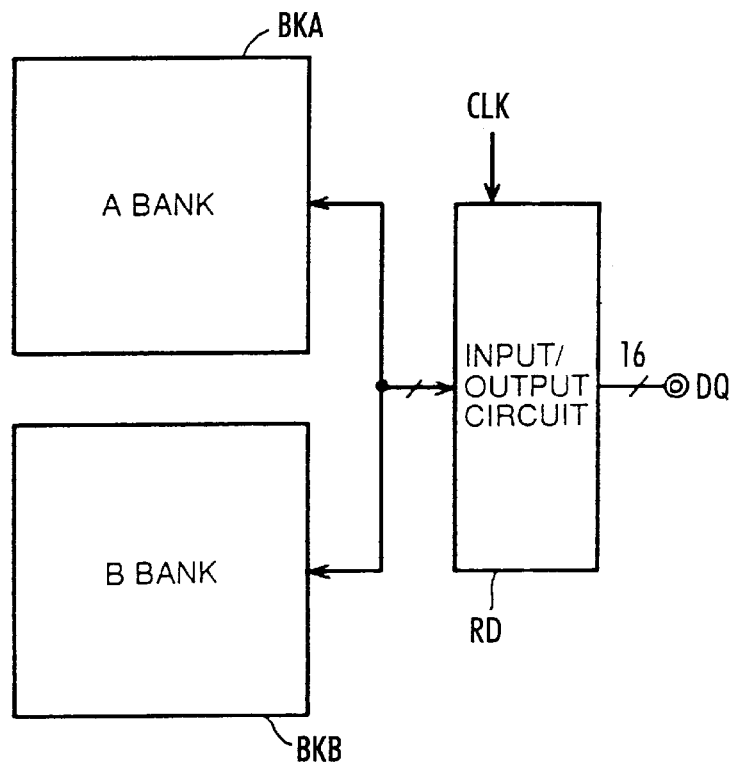
FIG. 45 schematically illustrates a general structure of a conventional SDRAM.

As shown in FIG. 40D, on the other hand, the second least significant bit is "0" in binary notation of an adjacent pixel PX249, and this pixel is stored in the bank A. The remaining bits are employed as the column address, and hence this pixel PX249 is stored in the memory position of a column address 125 of the bank A.

In the structure of alternately storing the data in the banks A and B in a unit of adjacent two pixels, the operation is substantially similar to the case of the embodiment 1 storing adjacent two pixels as one word, except that the number of bits of the column address is increased by 1, and the column addresses of the unit pixels are different. Therefore, addresses in reading of a reference image block can be generated similarly to the embodiment 1. The pixel data reading sequence is alternately executed for the banks A and B in a unit of nine words, as shown in FIG. 37. For identification of garbage pixel data, the least significant bit LSB is employed in place of the upper/lower instruction bit U/L.

Also in the structure of alternately storing the data in the banks A and B in a unit of two pixels and alternately reading the pixel data from the banks A and B in a unit of nine words (nine pixels) as shown in FIGS. 40A to 40D, therefore, overhead in page change can be suppressed to the minimum and efficient data transfer can be performed, particularly in reference image block pixel data transfer.

Writing of restored image pixel data and reading of display image pixel data can be performed similarly to the embodiment 1, except that the banks A and B are alternately accessed in a unit of nine words (nine pixels).

According to the embodiment 6 of the present invention, as hereinabove described, the addresses are so assigned that pairs of adjacent pixels are alternately stored in the banks A and B, whereby overhead in page change can be suppressed to the minimum and efficient data transfer can be performed.

Other Structure

In each of the aforementioned structures, the SDRAM performs input/output of 16-bit data or 8-bit data, and the basic unit of the minimum image block is 16 pixels by 16 pixels as to the luminance signal, and 8 pixels by 8 pixels as to the color-difference signal. Further, each pixel data is formed of eight bits. When the pixel data are N-bit data and the SDRAM inputs/outputs M-bit words and the size of a reference image block is L or L+1 in the horizontal direction, the banks A and B may be alternately accessed in units of an integer P of at least (L+1)/(2·M/N) in general, assuming that one word is formed by a luminance pixel. Alternatively, the banks A and B may be alternately accessed in a unit of an integer P of at least (L+1)/(M/N) in case of a color-difference signal. The SDRAM may be formed by a synchronous memory performing input/output of data and incorporation of a control signal in synchronization with a clock signal.

The image decoding apparatus may have no display function.

According to the present invention, as hereinabove described, the addresses of the pixel data are so assigned that the pixel data are alternately stored in the banks A and B in a unit of pixels of a prescribed number of at most 2, whereby overhead in page change can be suppressed to the minimum, efficient data transfer can be performed, and control is simplified.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image decoding apparatus for restoring original image data from coded image data including a plurality of sampled pixel data, comprising:

a synchronous memory device including a plurality of banks each being capable of performing memory cell selecting operations independently of others for inputting or outputting data in synchronization with a clock signal;

decoding means for receiving sampled pixel data included in said coded image data and performing a prescribed decoding processing for restoring said original image data; and control means for storing the image data restored by said decoding means in said synchronous memory device, said control means including means for writing pixel data included in said image data from said decoding means in said synchronous memory device such that sampled pixel data aligned with each other on an image screen in a horizontal direction as to a first signal component are cyclically stored in said plurality of banks in a unit of a prescribed number of horizontally adjacent pixels, said prescribed number being no greater than two.

2. The image decoding apparatus in accordance with claim 1, wherein said synchronous memory device inputs and outputs data in a unit of M bit word, the first signal component of said pixel data is M/2-bit data, and said prescribed number is 2.

3. The image decoding apparatus in accordance with claim 1, wherein said synchronous memory device inputs and outputs data in a unit of M bit word, the first signal component of said pixel data is M/2-bit data, and said prescribed number is 1.

4. The image decoding apparatus in accordance with claim 1, wherein said synchronous memory device inputs and outputs M-bit words in units of words, said pixel data is N-bit data, and said decoding means includes means for restoring said original image data regarding a pixel block having a horizontal size of L or L+1 as a reference block, and said plurality of banks includes a first bank and a second bank, and said control means includes means for reading said pixel data by alternately accessing said first and second banks in a unit of P times, said P being an integer of at least (L+1)/(2·M/N) and indicating the number of words being continuously accessed with respect to one bank.

5. The image decoding apparatus in accordance with claim 4, wherein said plurality of banks includes a first bank and a second bank, and wherein said control means further comprises means for reading said pixel data by alternately accessing said first and second banks in a unit of said P times for display on a display unit.

6. The image decoding apparatus in accordance with claim 1, wherein said synchronous memory device inputs and outputs data in units of words, each of the words being formed by 16-bit data, said plurality of banks include first and second banks, said pixel data are 8-bit data, and said control means includes means alternately accessing said first and second banks in a unit of five words.

7. The image decoding apparatus in accordance with claim 1, wherein said synchronous memory device inputs and outputs data in units of words, each of the words being formed by 8-bit data, said plurality of banks include first and second banks, said pixel data are 8-bit data, and said control means includes means for alternately accessing said first and second banks in a unit of nine words.

8. The image decoding apparatus in accordance with claim 1, wherein said control means includes means for generating addresses for respective pixel data for storing all the pixel data arranged at least on one horizontal line on said image screen in storage positions of one row address of said synchronous memory device.

9. The image decoding apparatus in accordance with claim 1, further including means for storing data other than the image data cyclically in said plurality of banks by Q words in a unit of 2Q words in accordance with a data arrangement order.

10. The image decoding apparatus in accordance with claim 1, wherein said control means includes means for generating addresses for each respective pixel data from a pixel number indicting a position of the pixel on a related horizontal line in binary notation such that each word of pixel data has a column address having the least significant bit position as a bank specifying address bit position and upper bits as a column specifying address indicating a column position in a bank as an address of each of said words to said synchronous memory device.

11. The image decoding apparatus in accordance with claim 1, wherein said control means includes means for generating a column address, for each respective pixel data from a pixel number indicating a position of the pixel on a related horizontal line in binary notation, with a bit position next to the least significant position as a bank specifying address position and the remaining bits as column specifying address bits.

12. An image decoding apparatus for restoring original image data from sampled, coded image data, comprising:

a synchronous memory device including banks being capable of performing memory cell selecting operations independently of each other for inputting or outputting data in synchronization with a clock signal;

decoding means for receiving sampled pixel data being included in said coded image data and performing a prescribed decoding processing for restoring said original image data, the image data including first and second signal components of different types having a common sample number; and control means for storing the image data restored by said decoding means in said synchronous memory device, said control means including means for writing the sampled image data included in the restored image data in said synchronous memory device so as to store first and second signal components of a same common sampled pixel in a same common address position of first and second banks of said plurality of banks respectively.

13. The image decoding apparatus in accordance with claim 12, wherein said synchronous memory device inputs and outputs M-bit words in units of words, said pixel data are N-bit data, and said decoding means includes means for restoring said original image data with a reference block being defined by a pixel block having a horizontal size of L or L+1, and said control means includes means for alternately accessing said first and second banks in a unit of P times, reading the pixel data for supplying to said decoding means, said P being an integer of at least (L+1)/(M/N) and indicating the number of times for continuously accessing one bank.

14. The image decoding apparatus in accordance with claim 13, wherein said control means further comprises means for alternately accessing said first and second banks in a unit of said P times for reading the pixel data for display on a display unit.

15. The image decoding apparatus in accordance with claim 12, wherein said synchronous memory device inputs and outputs data in units of words, each of the words being formed by 16-bit data, said pixel data are 8-bit data, and said control means includes means for alternately accessing said first and second banks in a unit of five words.

16. The image decoding apparatus in accordance with claim 12, wherein said synchronous memory device inputs and outputs data in units of words, each of the words being formed by 8-bit data, said pixel data are 8-bit data, and said control means includes means for alternately accessing said first and second banks in a unit of nine words.

17. The image decoding apparatus in accordance with claim 12, wherein said control means includes means for generating addresses for the respective pixel data so as to store all pixel data being arranged on at least one horizontal line on an image screen in storage positions of one row address of said synchronous memory device.

18. The image decoding apparatus in accordance with claim 12, further including means for alternately storing data other than the image data in said first and second banks by Q words in a unit of 2Q words in accordance with an arrangement order of said data.

19. The image decoding apparatus in accordance with claim 12, wherein said control means includes means for generating an address signal for each respective pixel data including a bank specifying bit as a signal component specifying signal specifying either the first signal component or the second signal component as addresses for respective words of said synchronous memory device.

* * * * *